(12) United States Patent
Flood et al.

(10) Patent No.: US 12,391,832 B2
(45) Date of Patent: Aug. 19, 2025

(54) COLOR MATCHED AND BRIGHT FLUORESCENT MATERIALS COMPOSED OF SMALL-MOLECULE IONIC LATTICES

(71) Applicants: INDIANA UNIVERSITY RESEARCH AND TECHNOLOGY CORPORATION, Indianapolis, IN (US); UNIVERSITY OF COPENHAGEN, Copenhagen (DK)

(72) Inventors: Amar H. Flood, Bloomington, IN (US); Bo Wegge Laursen, Copenhagen (DK)

(73) Assignees: INDIANA UNIVERSITY RESEARCH AND TECHNOLOGY CORPORATION, Indianapolis, IN (US); UNIVERSITY OF COPENHAGEN, Copenhagen (DK)

( * ) Notice: Subject to any disclaimer, the term of this patent is extended or adjusted under 35 U.S.C. 154(b) by 131 days.

(21) Appl. No.: 17/942,127

(22) Filed: Sep. 10, 2022

(65) Prior Publication Data
US 2023/0167303 A1    Jun. 1, 2023

Related U.S. Application Data

(63) Continuation-in-part of application No. 16/762,628, filed as application No. PCT/US2019/021518 on Mar. 10, 2019.

(60) Provisional application No. 62/641,281, filed on Mar. 10, 2018.

(51) Int. Cl.
| | |
|---|---|
| *C09B 11/24* | (2006.01) |
| *C09B 19/00* | (2006.01) |
| *C09B 23/01* | (2006.01) |
| *C09B 57/00* | (2006.01) |
| *C09K 11/02* | (2006.01) |
| *C09K 11/06* | (2006.01) |
| *G01N 1/30* | (2006.01) |

(52) U.S. Cl.
CPC .............. *C09B 11/24* (2013.01); *C09B 19/00* (2013.01); *C09B 23/0075* (2013.01); *C09B 23/0091* (2013.01); *C09B 57/00* (2013.01); *C09K 11/02* (2013.01); *C09K 11/06* (2013.01); *G01N 1/30* (2013.01); *C09K 2211/1007* (2013.01); *C09K 2211/1018* (2013.01); *G01N 2001/302* (2013.01)

(58) Field of Classification Search
None
See application file for complete search history.

(56) References Cited

U.S. PATENT DOCUMENTS

| | | |
|---|---|---|
| 2016/0034775 A1 | 2/2016 | Meadow et al. |
| 2020/0407628 A1 | 12/2020 | Flood et al. |

OTHER PUBLICATIONS

Buldini. Analytica Chimica Acta, 1976, 82, 187-201 (Year: 1976).*

(Continued)

*Primary Examiner* — Noble E Jarrell
(74) *Attorney, Agent, or Firm* — Quarles & Brady, LLP

(57) ABSTRACT

The present disclosure concerns the design, formulations, preparations and optical properties of compounds of Formulas (I) and (VI):

$$(\text{charged dye}^{m+})_x \cdot (\text{counterion}^{n-})_y \cdot (\text{counterion receptor})_z \quad \text{(I) and}$$

$$(\text{charged dye}^{m-})_x \cdot (\text{counterion}^{n+})_y \cdot (\text{counterion receptor})_z \quad \text{(VI)}.$$

The charged dye$^{m+}$ is a cationic dye, counterion$^{n-}$ is an anion, and counterion receptor is a binding ligand for the counterion$^{n-}$, wherein m, n, x and y are integers greater than or equal to 1, and products of x·n and m·y are identical for formula (I).

The charged dye$^{m-}$ is a anionic dye, counterion$^{n+}$ is a cation, and counterion receptor is a binding ligand for the counterion$^{n+}$, wherein m, n, x and y are integers greater than or equal to 1, and products of x·n and m·y are identical for formula (VI).

20 Claims, 47 Drawing Sheets

(56) References Cited

OTHER PUBLICATIONS

Havel. ChemPlusChem, 2015, 80, 1601-1606 (Year: 2015).*
Bo Qiao et al., "Ion-Pair Oligomerization for Chromogenic Triangulenium Cations with Cyanostar-Modified Anions That Controls Emission in Hierarchiacal Materials," Journal of the American Chemical Society vol. 139, No. 17, 2017, 8 pages.
Bosson et al., "Cationic triangulenes and helicenes: synthesis, chemical stability, optical properties and extended applications of these unusual dyes," Chem. Soc. Rev. 2014, 43:2824-40.
Eisele et al., "Uniform Exciton Fluroescence from Individual Molecular Nanotubes Immobilized on Solid Substrates," Nature Nanotechnoloty, vol. 4, No. 10, 2009, 6 pages.
Haketa et al., "Dimension-controlled Ion-pairing Assemblies based on [pi]-elecronic Charged Species," Chemical Communications, vol. 53, No. 20, 2017, 16 pages.
Haketa et al., "Oriented Salts: Dimension-Controlled Charge-by-Charge Assemblies from Planar Receptor-Anion Complexes," Angew. Chem. Int. Ed. 2010, 49: 10079-83.
International Search Report and Written Opinion for related International Patent Application Serial No. PCT/US2019/021518 dated Jul. 15, 2019, 20 pages.
Lee et al., "A pentagonal Cyanostar Macrocycle With Cyanostilbene CH Donors binds Anions and Forms Dialkyphosphate [3]rotaxanes," Naturally Chemistry, vol. 5, No. 8, 2013, 7 pages.

* cited by examiner

Cationic Dye   Spacer

Anion, X⁻

Cyanostar 2　　　Cyanostar 3　　　Cyanostar 4

FL-SMILES
(cyanostar)₂(BF₄)
(DAOTA)

Fluorescence

Polystyrene with Rhodamine 3B Perchlorate (5% w/w)

Polystyrene with FL-SMILES (CS)2(ClO4)(R3B) (5% w/w)

FL-SMILES
(cyanostar)₂(ClO₄)
(rhodamine 3B)

FL-SMILES
(cyanostar)₂(ClO₄)
(oxazine 720)

FL-SMILES
(cyanostar)₂(PF₆)
(DIOC₂)

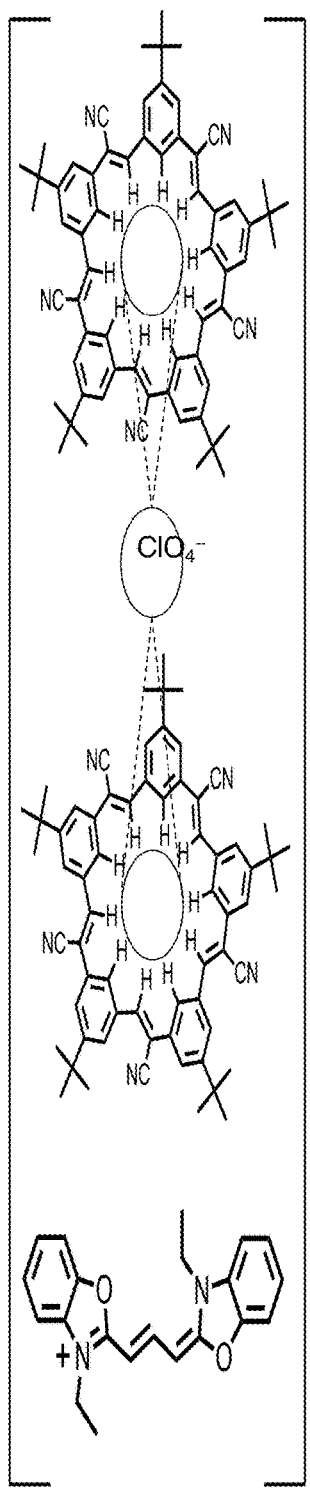
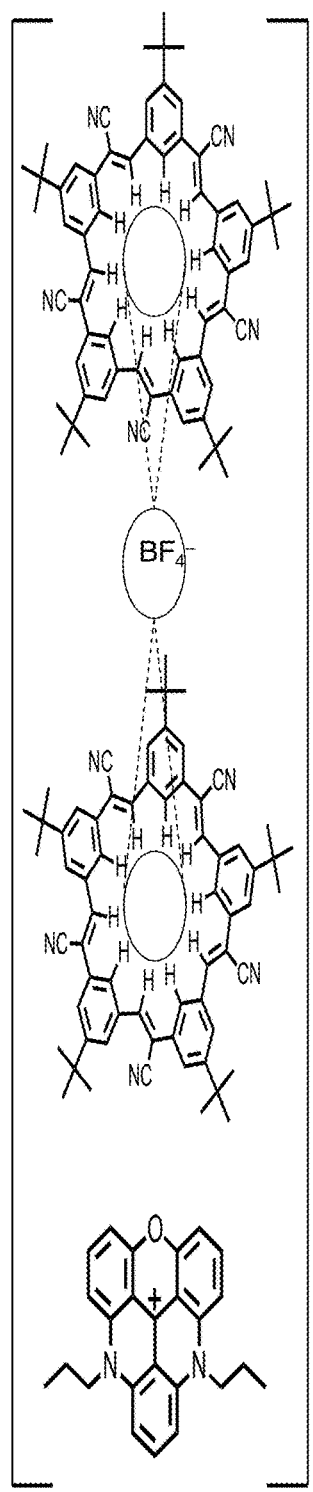
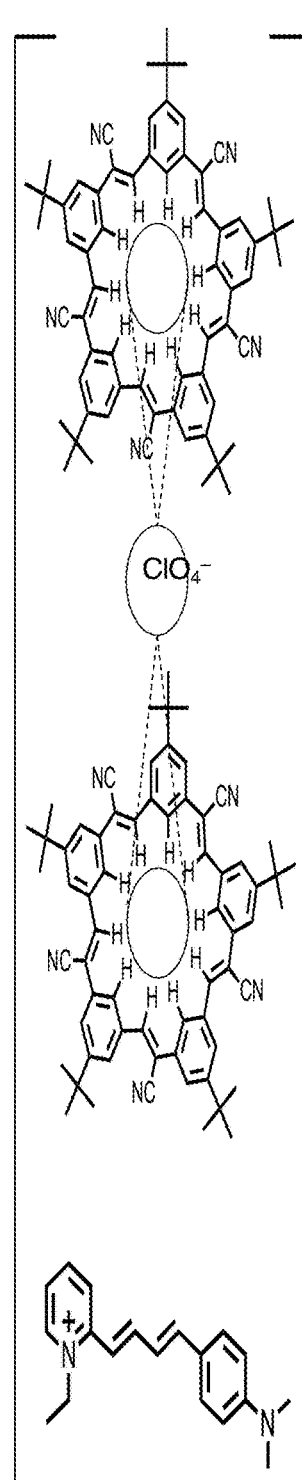
FL-SMILES
(cyanostar)₂(ClO₄)
(DIOC₂)
FL-SMILES
(cyanostar)₂(BF₄)
(DAOTA)
FL-SMILES
(cyanostar)₂(ClO₄)
(Pyridin 1)
FIGURE 13 (Con't)

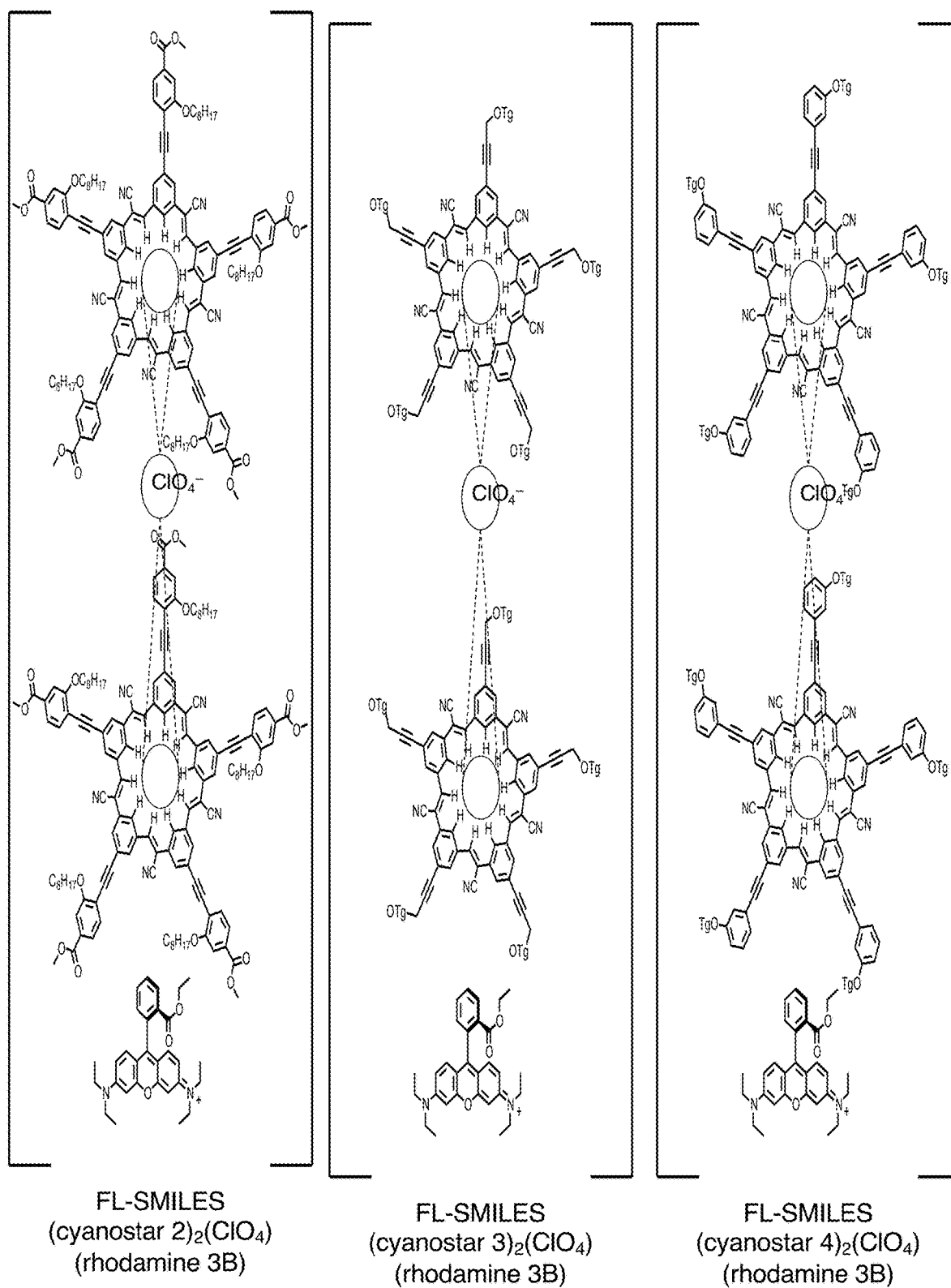
FL-SMILES
(cyanostar 2)$_2$(ClO$_4$)
(rhodamine 3B)
FL-SMILES
(cyanostar 3)$_2$(ClO$_4$)
(rhodamine 3B)
FL-SMILES
(cyanostar 4)$_2$(ClO$_4$)
(rhodamine 3B)
FIGURE 13 (Con't)

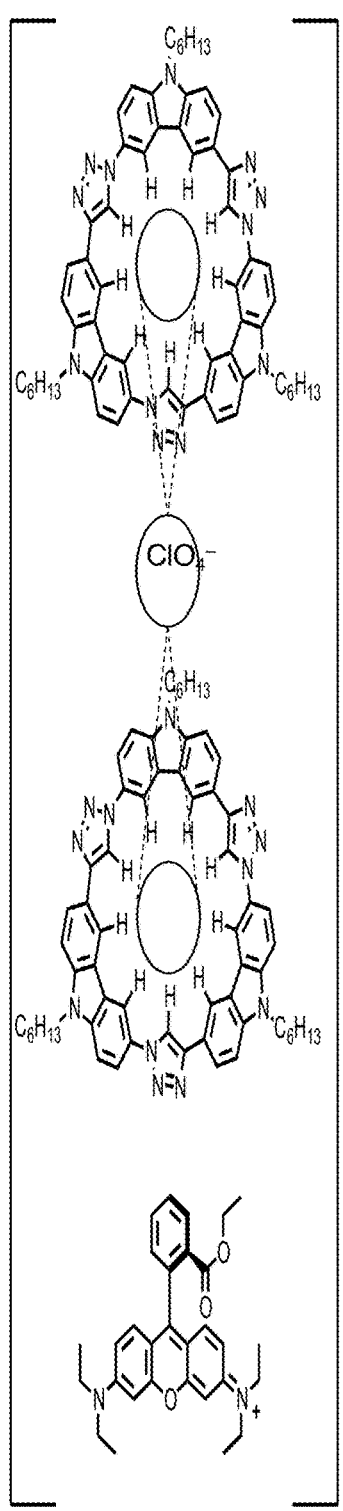 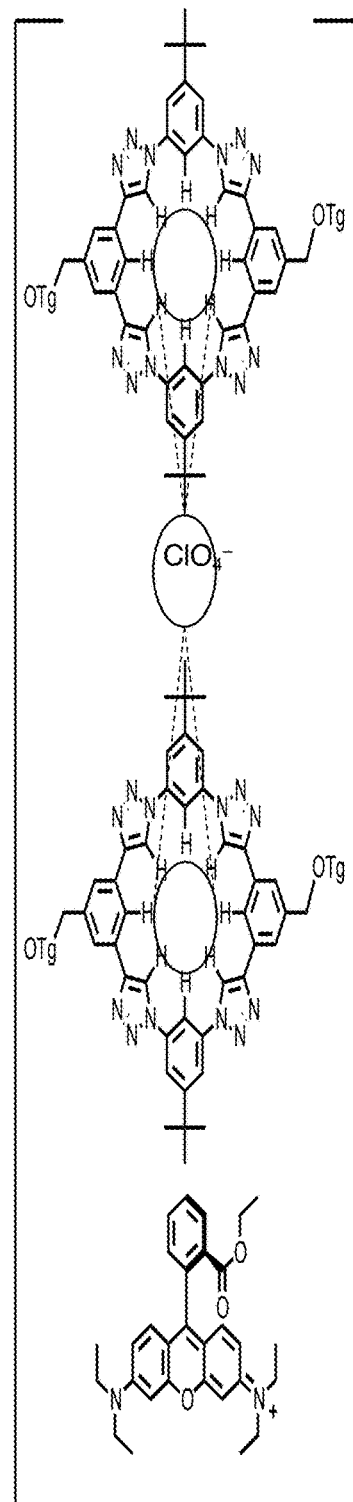
AB-SMILES
(tricarb-C6)₂(ClO₄)
(rhodamine 3B)
AB-SMILES
(triazolophane)₂(ClO₄)
(rhodamine 3B)
Figure 14 (Con't)

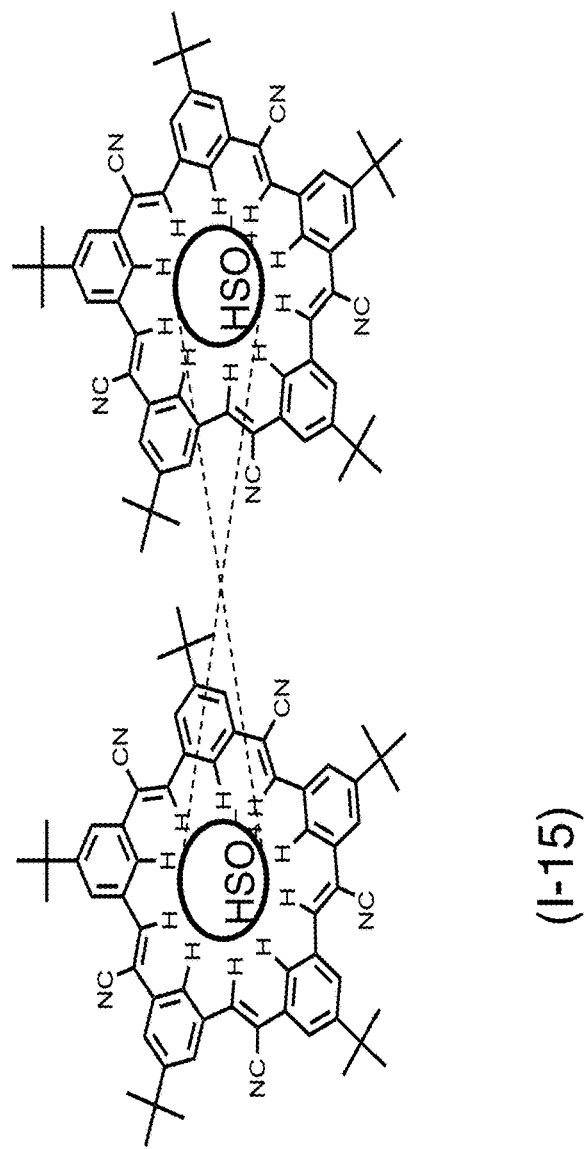
(I-15)
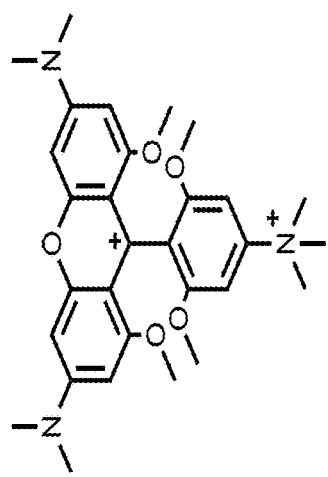
Figure 14 (Con't)

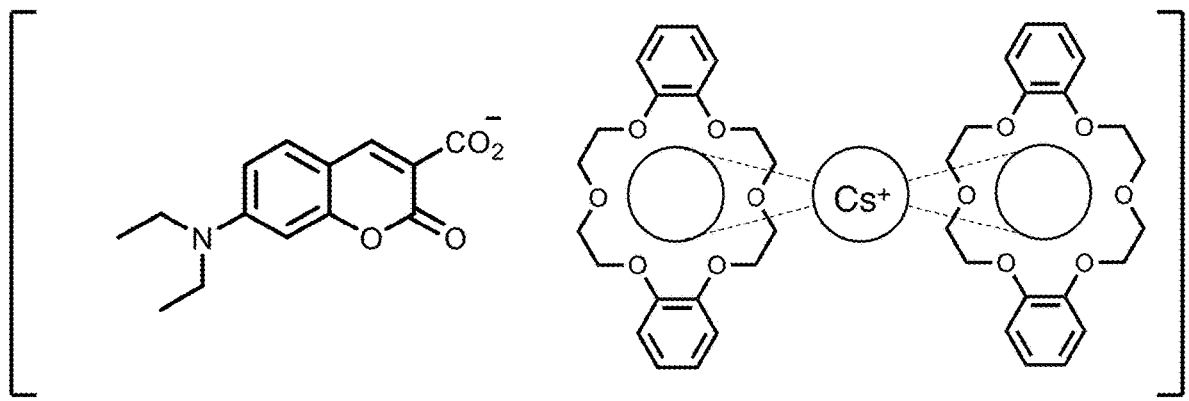
(VI-4)
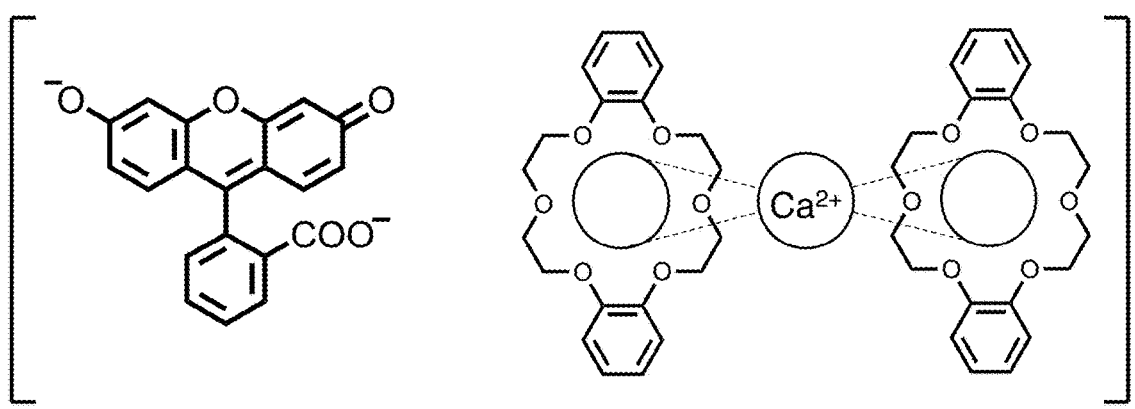
(VI-5)
Figure 19 (Con't)

(a)

(b)

COLOR MATCHED AND BRIGHT FLUORESCENT MATERIALS COMPOSED OF SMALL-MOLECULE IONIC LATTICES

CROSS-REFERENCE TO RELATED APPLICATIONS

This application is a continuation-in-part of U.S. patent application Ser. No. 16/762,628, filed May 8, 2020, which is entitled "COLOR MATCHED AND BRIGHT FLUORESCENT MATERIALS COMPOSED OF SMALL-MOLECULE IONIC LATTICES, which is the national stage entry of PCT/US2019/021518, filed Mar. 10, 2019, which claims benefit of priority under 35 U.S.C. 119 to U.S. Provisional Patent Application Ser. No. 62/641,281, filed Mar. 10, 2018, which is entitled "COLOR MATCHED AND BRIGHT FLUORESCENT MATERIALS COMPOSED OF SMALL-MOLECULE IONIC LATTICES," the contents of each of which are herein incorporated by reference in their entireties.

STATEMENT REGARDING FEDERALLY SPONSORED RESEARCH OR DEVELOPMENT

This invention was made with government support under 1412401 and 2118423 awarded by National Science Foundation. The Government has certain rights in the invention.

FIELD OF THE INVENTION

This invention pertains to the design and preparation of materials containing ionic dyes with their counter-ions bound in a counterion-receptor complex and their use in optical materials.

BACKGROUND OF THE INVENTION

Organic dyes having color and brightness were discovered in 1848. Ever since their discovery, those skilled in the art have been making paints and pigments in an attempt to reproduce the color and bright emission of those dyes in solution. Despite their color and brightness properties in solution, the ability to prepare solid state forms of organic dyes retaining these properties have met with technical challenges and unpredictability.

Thus, there is a need for compositions and formulations that enable one to prepare solid state forms of organic dyes that reproduce the bright color and fluorescence attributes of their solution state.

BRIEF SUMMARY OF THE INVENTION

In a first aspect, a compound of Formula (I) is provided:

$$(\text{charged dye}^{m+})_x \cdot (\text{counterion}^{n-})_y \cdot (\text{counterion receptor})_z \quad (I).$$

The charged dye$^{m+}$, is a cationic dye, the counterion$^{n-}$ is an anion and the counterion receptor is a binding ligand for the counterion$^{n-}$. The values of m, n, x and y are integers greater than or equal to 1 and products of x·n and m·y are identical.

In a second aspect, a formulation is provided. The formation includes a compound of Formula (I) is provided:

$$(\text{charged dye}^{m+})_x \cdot (\text{counterion}^{n-})_y \cdot (\text{counterion receptor})_z \quad (I).$$

The charged dye$^{m+}$ is a cationic dye the counterion$^{n-}$ is an anion and the counterion receptor is a binding ligand for the counterion$^{n-}$. The values of m, n, x and y are integers greater than or equal to 1 and products of x·n and m·y are identical.

In a third aspect, a method of producing a material having bright emission properties is provided. The method includes the following steps. A first step includes mixing a solution of cationic dye and counter anion with an anion receptor to form a first mixture that includes a compound of Formula (I):

$$(\text{charged dye}^{m+})_x \cdot (\text{counterion}^{n-})_y \cdot (\text{counterion receptor})_z \quad (I).$$

The charged dye$^{m+}$ is a cationic dye, the counterion$^{n-}$ is an anion and the counterion receptor is a binding ligand for the counterion$^{n-}$. The values of m, n, x and y are integers greater than or equal to 1 and products of x·n and m·y are identical. A second step is condensing the first mixture to form a material having an emissive unit in a solid state. The material produced in this way can be a powders, amorphous solids, thin films, crystals, microparticles, polymer composites, nanoparticles, and colloid of microparticles and nanoparticles.

In a fourth aspect, a compound of Formula (VI) is provided:

$$(\text{charged dye}^{m-})_x \cdot (\text{counterion}^{n+})_y \cdot (\text{counterion receptor})_z \quad (VI).$$

The charged dye$^{m-}$ is an anionic dye, counterion$^{n+}$ is a cation, and counterion receptor is a binding ligand for counterion$^{n+}$. The m, n, x and y are integers greater than or equal to 1 and products of x·n and m·y are identical.

In a fifth aspect, a formulation comprising a compound of Formula (VI) is disclosed:

$$(\text{charged dye}^{m-})_x \cdot (\text{counterion}^{n+})_y \cdot (\text{counterion receptor})_z \quad (VI).$$

The charged dye$^{m-}$ is an anionic dye, counterion$^{n+}$ is a cation, and counterion receptor is a binding ligand for counterion$^{n+}$. The m, n, x and y are integers greater than or equal to 1 and products of x·n and m·y are identical.

In a sixth aspect, a method of producing a material having bright emission properties is disclosed. The method includes several steps. A first step includes preparing a first mixture comprising a compound according to the fourth aspect or a formulation according to the fifth aspect. A second step includes condensing the first mixture to form a material having an emissive unit in a solid state.

In a seventh aspect, a method of detecting a substance is disclosed. The method includes several steps. A first step includes contacting the substance with any of the compounds, formulations or materials according to any of the foregoing aspects. A second step includes measuring a change in at least one spectral property in any of the compounds, formulations or materials of the mixture as a result of the contacting step relative to the substance alone or the compounds, formulations or materials alone. The substance is detected by the change in at least one spectral property in any of the compounds, formulations or materials as a result of the measuring step with the mixture.

In an eighth aspect, a method of adding light absorption and emission to a polymer is disclosed. The method includes several steps. A first step includes providing the polymer. A second step includes contacting the polymer with a SMILES material.

In a ninth aspect, a method of staining a biological material is provided. The method includes several steps. A first step includes providing the biological material. A second step includes contacting the biological material with a microparticle or nanoparticle comprising a SMILES material.

In a tenth aspect, a method of increasing the photostability of an ionic dye is provided. The method includes several steps. A first step includes providing the ionic dye. A second step includes converting the ionic dye into a SMILES material.

In an eleventh aspect, a method of increasing the solubility and mixability of an ionic dye with polymers and non-polar solvents is provided. The method includes several steps. A first step includes providing the ionic dye. A second step includes converting the ionic dye into a SMILES material.

In a twelfth aspect, a method of generating a SMILES material with a programmable light absorption and emission properties is provided. The method includes several steps. A first step includes providing an ionic dye. The ionic dye includes specific light absorption and emission properties. A second step includes converting the ionic dye into the SMILES material.

In a thirteenth aspect, a method of generating a SMILES material with programmable Stokes shifts is provided. The method includes several steps. A first step includes providing a first ionic dye and a second ionic dye. A second step includes mixing first ionic dye and the second ionic dye together to form a first mixture. A third step includes converting the first mixture into the SMILES material. The first ionic dye is an energy donor and the second ionic dye is an energy acceptor in the SMILES material to allow light emission by the first ionic dye and light absorption by the second ionic dye.

In a fourteenth aspect, a method of generating a SMILES material with programmable absorption and emission at different wavelengths with different relative intensities is provided. The method includes several steps. A first step includes providing at least two ionic dyes. A second step includes mixing the least two ionic dyes together to form a first mixture. A third step includes converting the first mixture into the SMILES material. The at least two ionic dyes comprise programmable absorption and emission at different wavelengths with different relative intensities.

In a fifteenth aspect, a method of generating a SMILES material with programmable emission decay rate is provided. The method includes several steps. A first step includes providing a plurality of ionic dyes. A second step includes mixing the plurality of ionic dyes together to form a first mixture. A third step includes converting the mixture into a SMILES material. The plurality of ionic dyes comprises a first ionic dye that acts as a light absorbing energy donor, any intermediate dyes that acts simultaneously as an energy acceptor and energy donor and a final ionic dye that acts as an energy accepting emitter in the SMILES material to allow light absorption by the first ionic dye, pass energy through any intermediate dyes, and light emission by the final ionic dye.

DETAILED DESCRIPTION

Figure 3A:
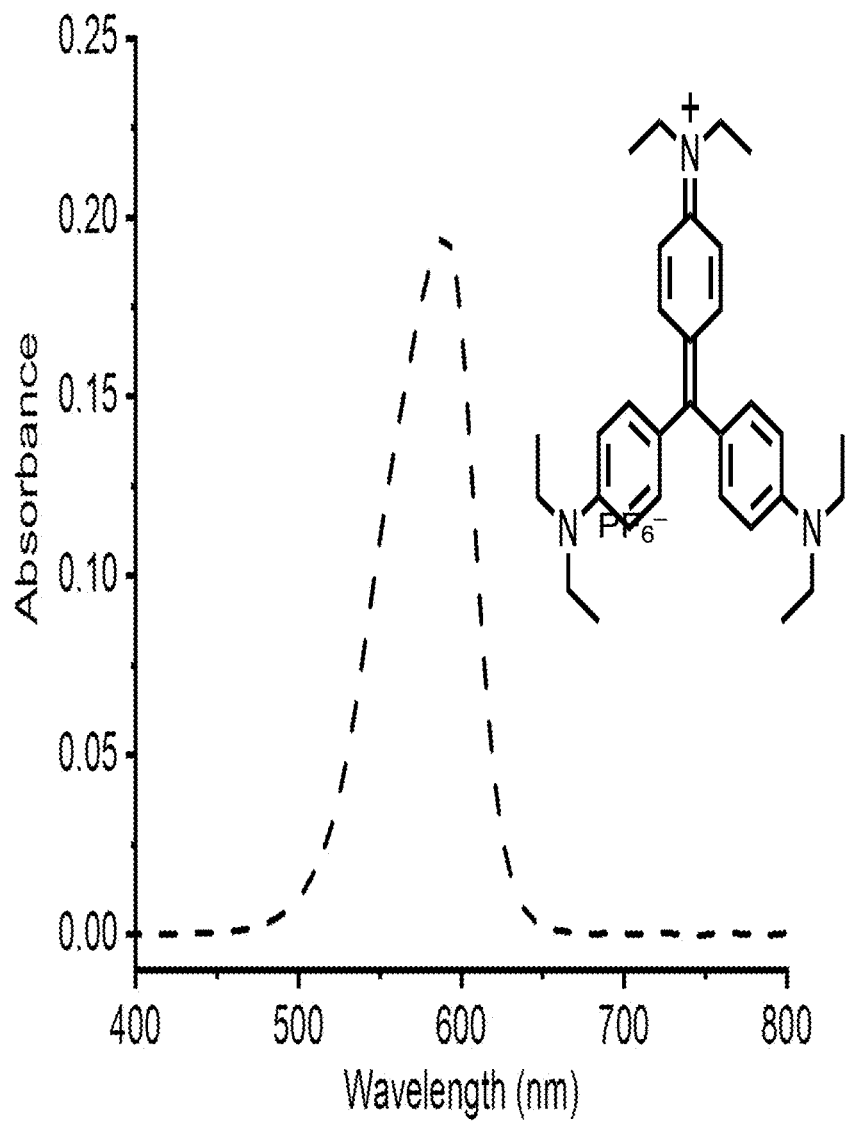
FIG. 3A illustrates a solution absorption spectrum of ethyl violet ($CH_2Cl_2$).
Figure 3B:
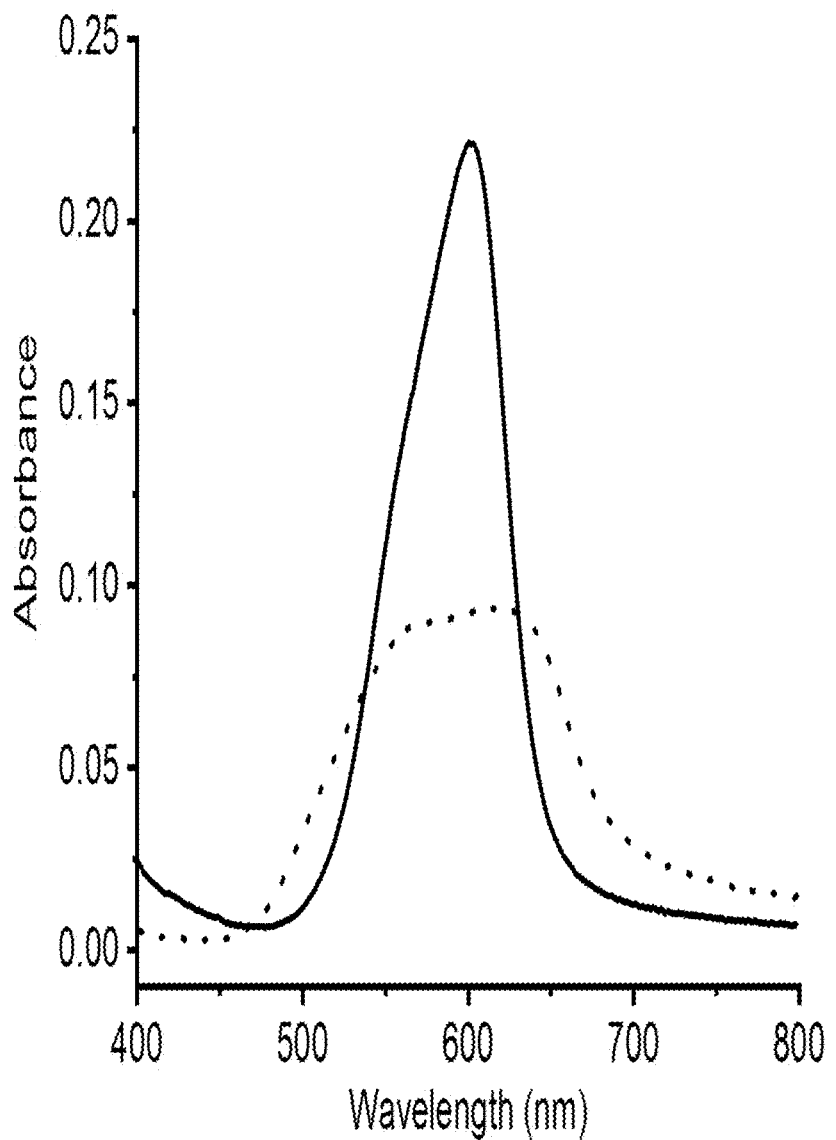
FIG. 3B illustrates a absorption spectrum of ethyl violet in a thin film (dotted line) and inside an AB-SMILES material (solid line).
Figure 3C:
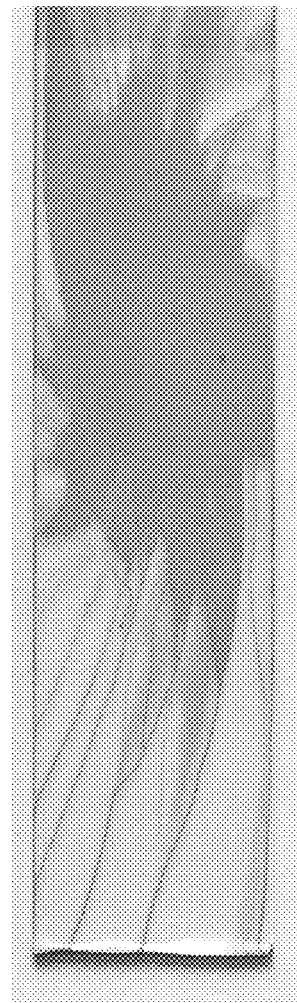
FIG. 3C depicts a thin film of ethyl violet in a AB-SMILES having spatially homogeneous coloring.
Figure 3D:
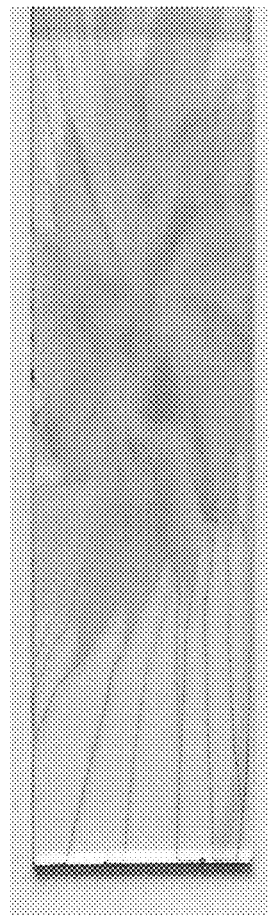
FIG. 3D depicts a thin film of the ethyl violet alone.
Figure 4:
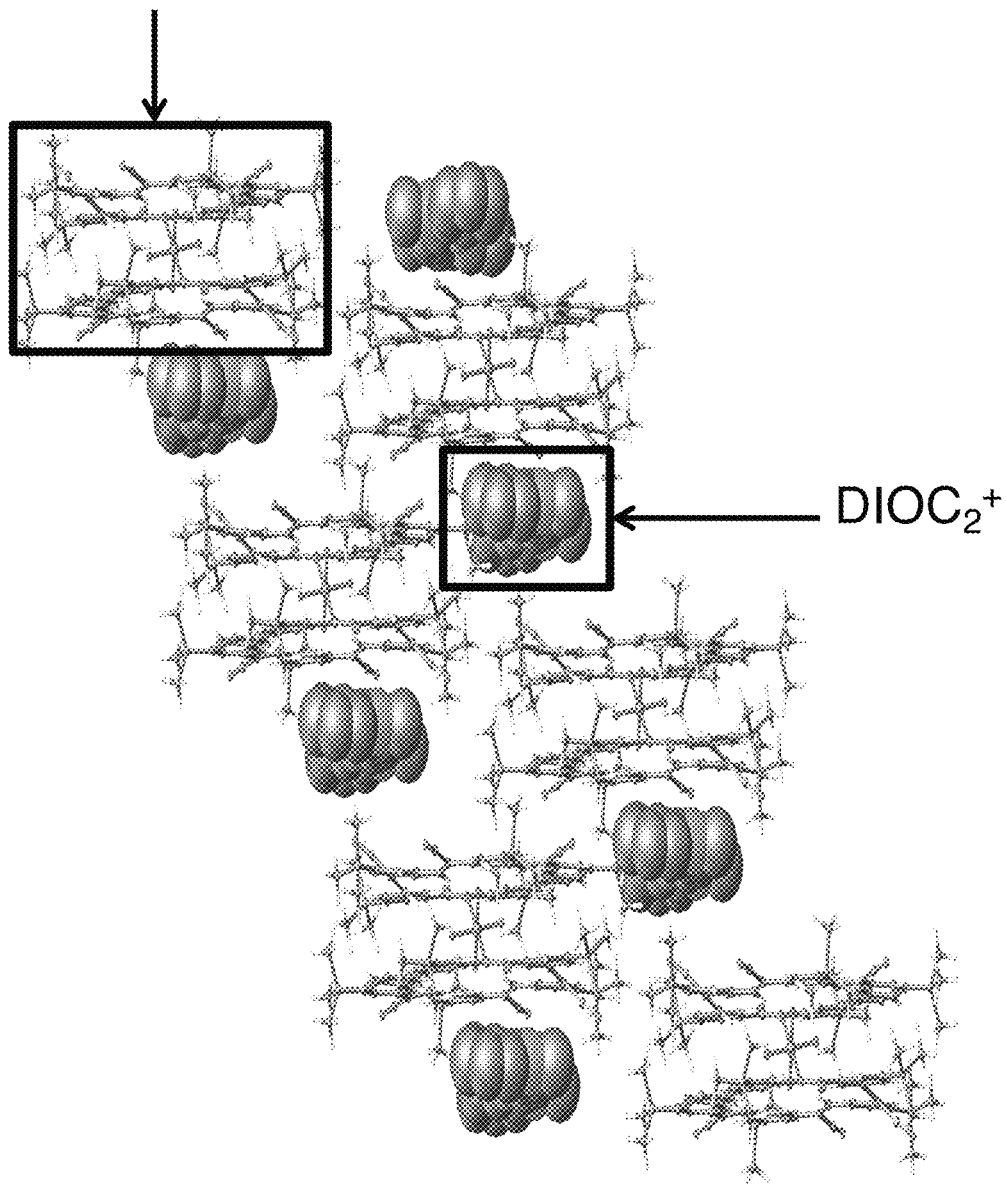
FIG. 4 depicts a charge-by-charge packing seen in the crystal structure of the FL-SMILES compound [(cyanostar)$_2$(PF$_6$)(DIOC$_2$)]. Crystals grown from solution containing the cyanostar and DIOC$_2$·PF$_6$ in a 2:1 ratio.
Figure 5:
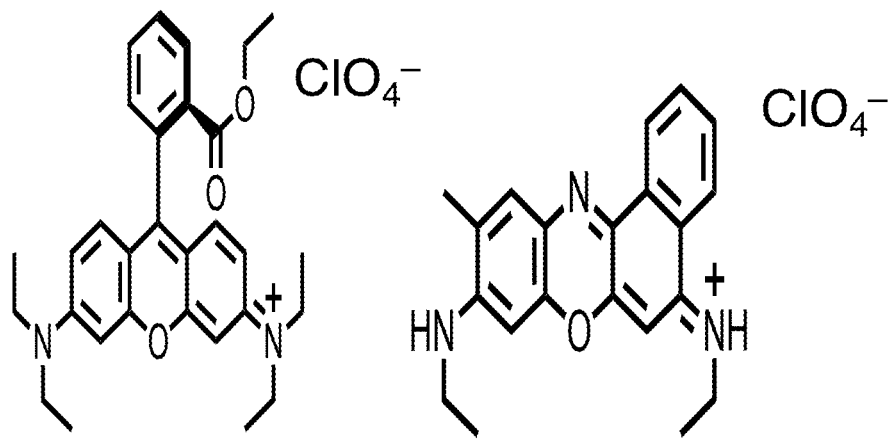
FIG. 5 depicts exemplary fluorophores used to make SMILES materials with cyanostar.
Figure 5:
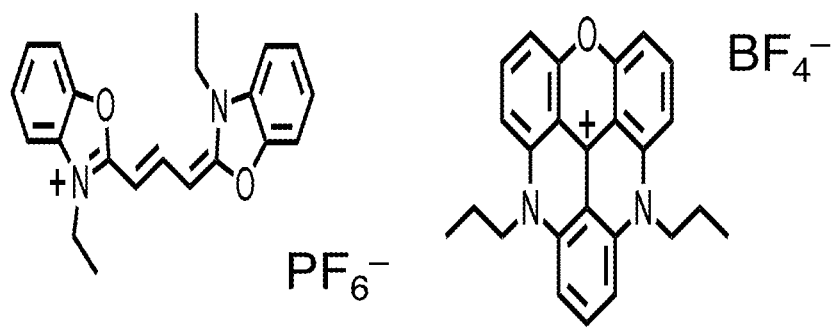
Figure 6:
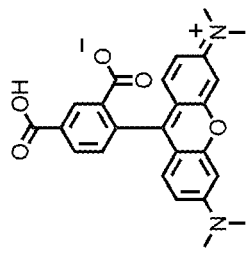
FIG. 6 depicts exemplary control compounds.
Figure 6:
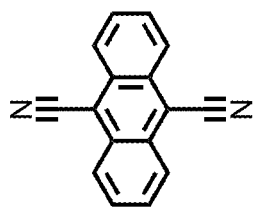
Figure 6:
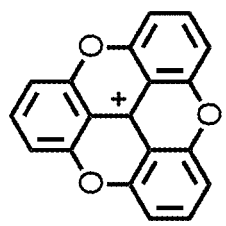
Figure 6:
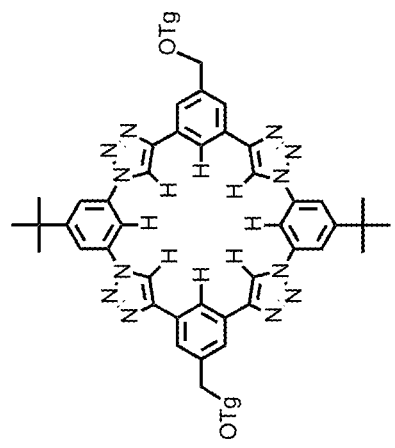
Figure 6:
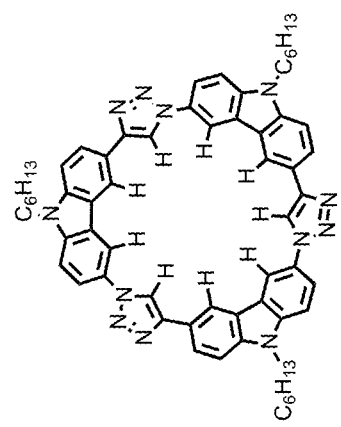
Figure 7:
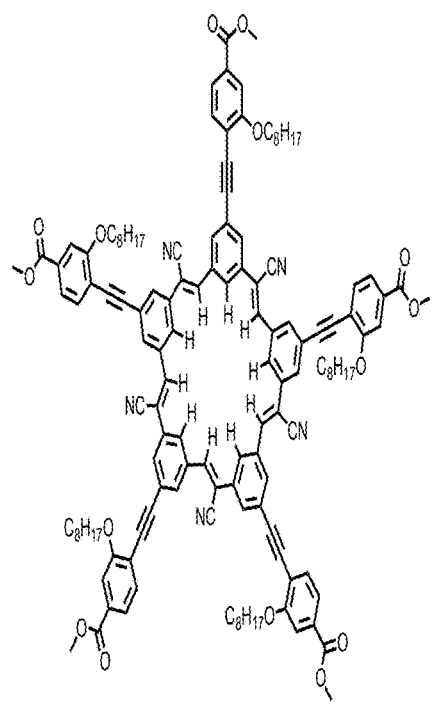
FIG. 7 depicts exemplary cyanostar analogs that also form FL-SMILES materials with rhodamine 3B·ClO$_4$
Figure 7:
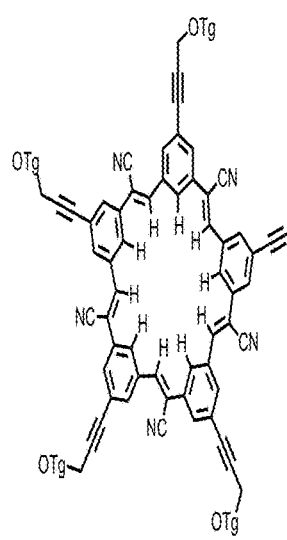
Figure 7:
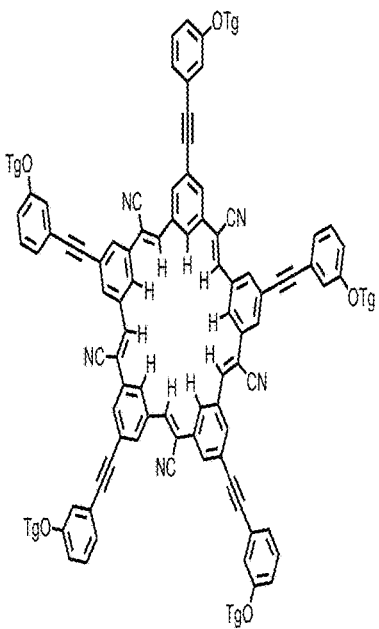
Figure 8:
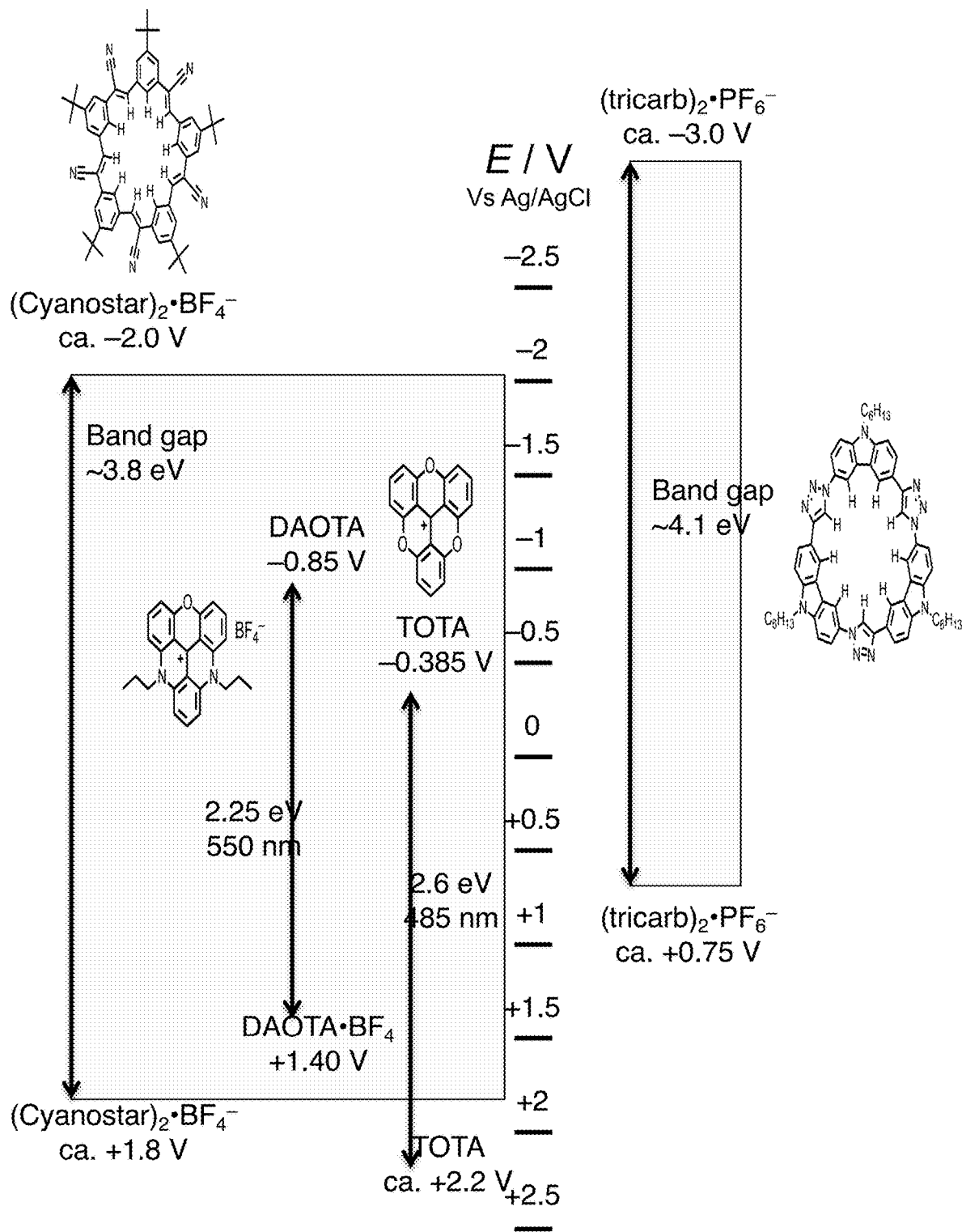
FIG. 8 depicts an energy level diagram outlining the electronic windows prescribed by the various anion receptor complexes. Energies are estimated from redox potentials and optical band gaps.
Figure 9A:
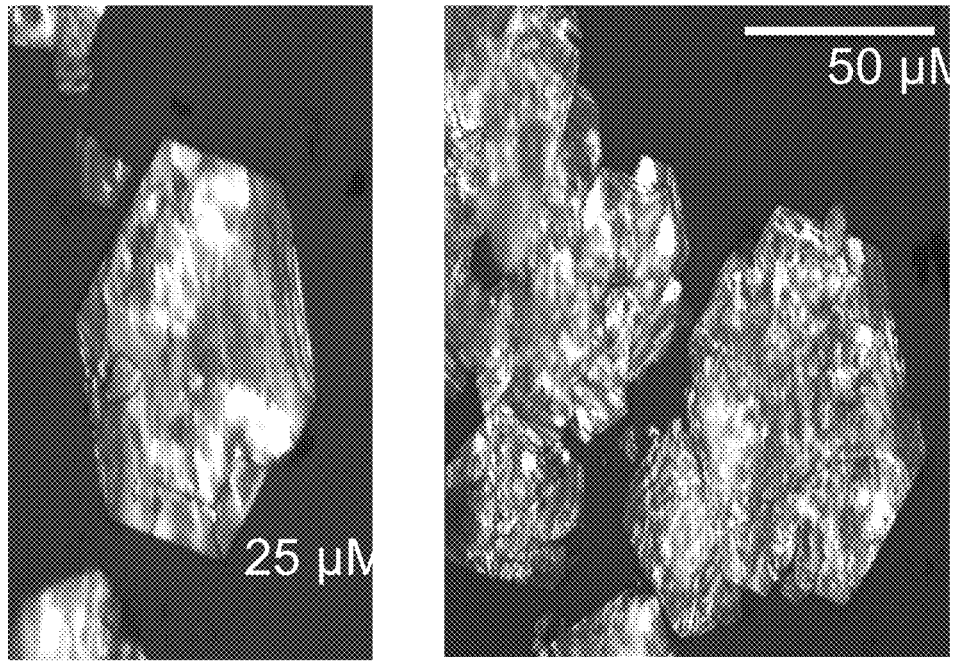
FIG. 9A depicts exemplary micrograph of microparticles of FL-SMILES [(cyanostar)$_2$(BF$_4$)(DAOTA)].
Figure 9B:
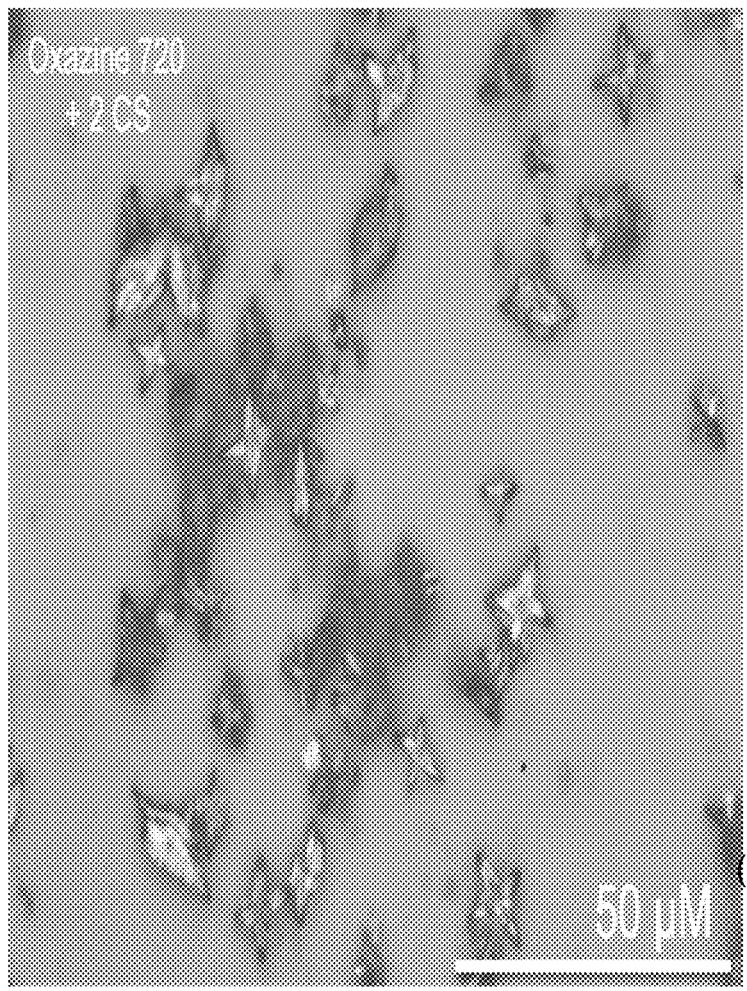
FIG. 9B depicts exemplary micrograph of microparticles of FL-SMILES [(cyanostar)$_2$(BF$_4$)(oxazine 720)].
Figure 10A:
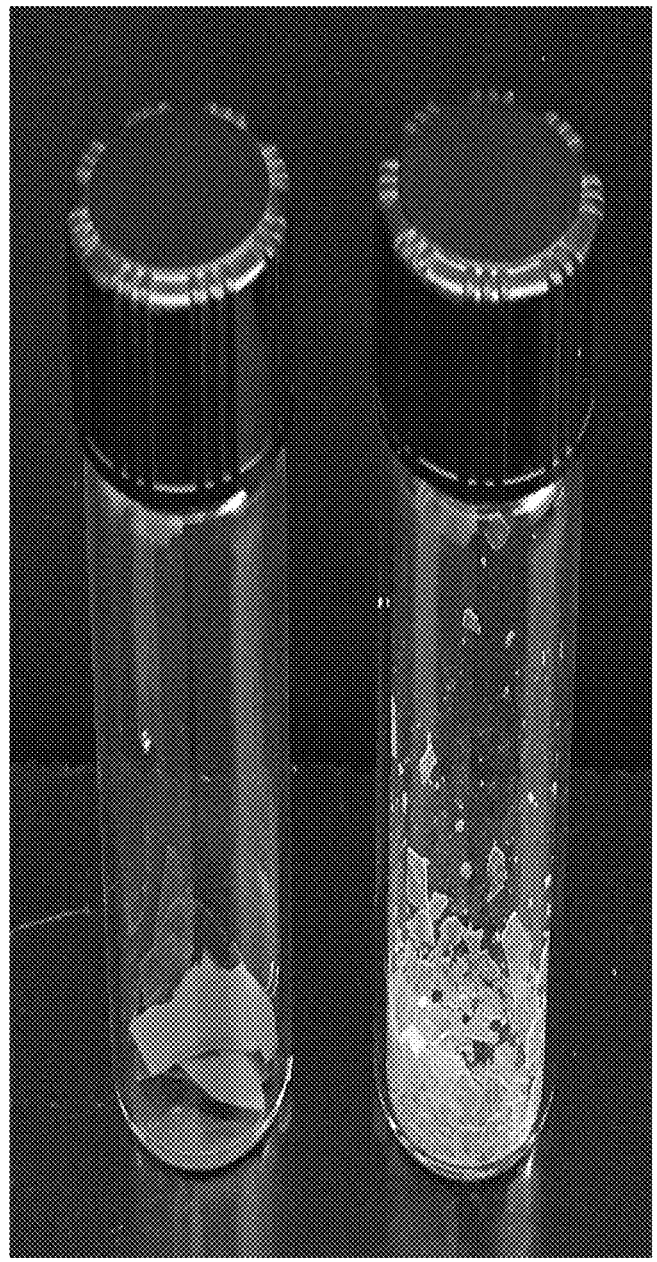
FIG. 10A depicts exemplary photographic images showing polystyrene materials stained with rhodamine 3B perchlorate and with the corresponding FL-SMILES [(cyanostar)$_2$(ClO$_4$)(rhodamine 3B)].
Figure 10B:
FIG. 10B depicts exemplary photographic images under UV light irradiation showing fluorescence only emerges from the sample stained (right) with FL-SMILES [(cyanostar)$_2$(ClO$_4$)(rhodamine 3B)].
Figure 11:
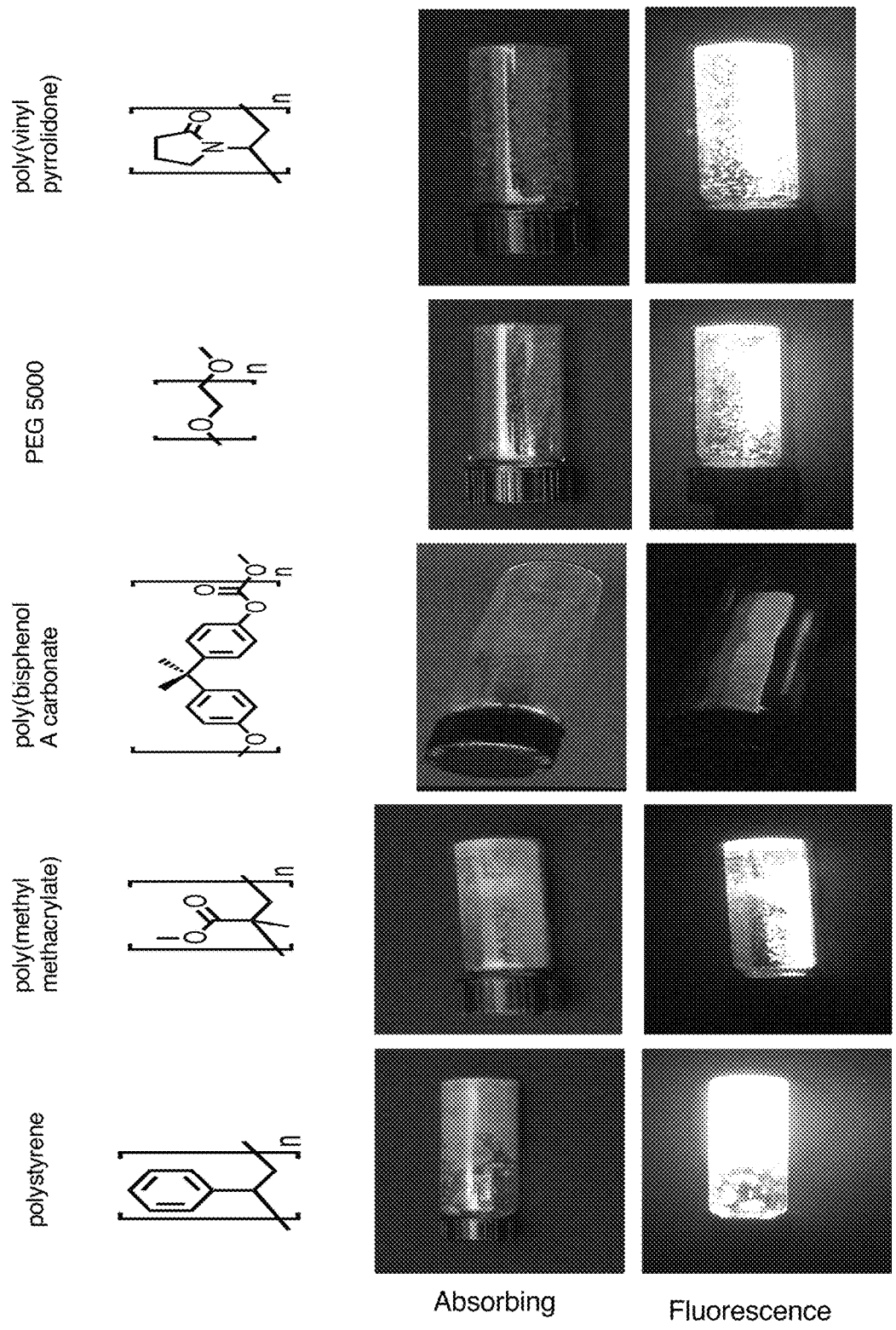
FIG. 11 depicts polymers stained with FL-SMILES [(cyanostar)$_2$(ClO$_4$)(rhodamine 3B)] that were prepared according to method I in the Examples.
Figure 12:
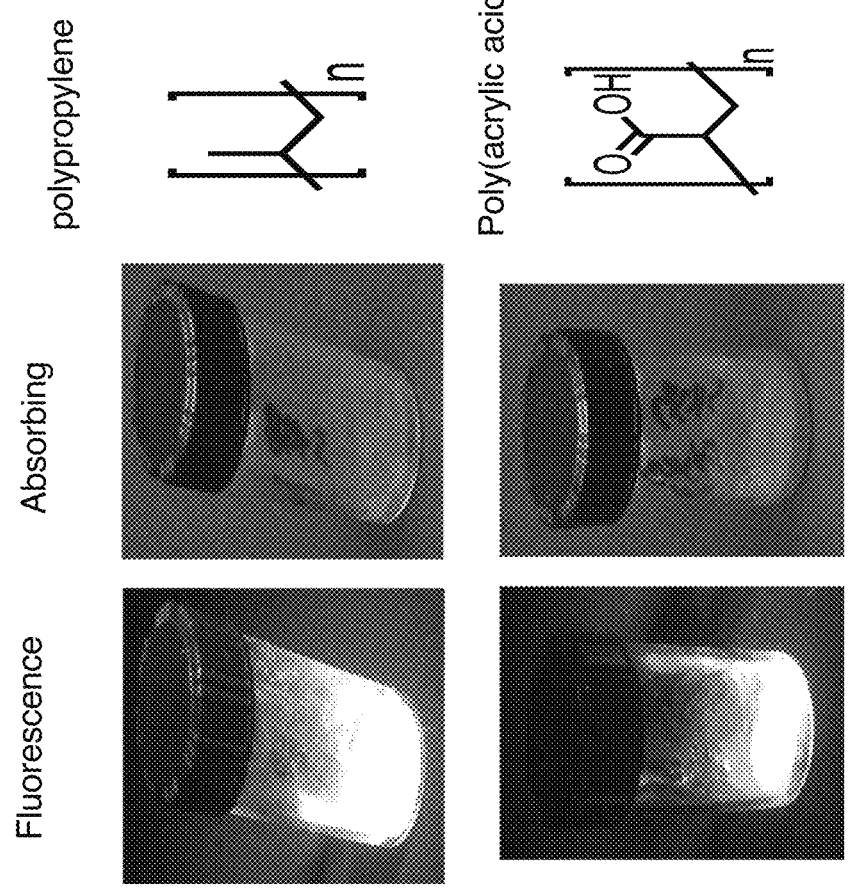
FIG. 12 depicts polymers stained with FL-SMILES [(cyanostar)$_2$(ClO$_4$)(rhodamine 3B)] that were prepared by method II in the Examples.
Figure 13:
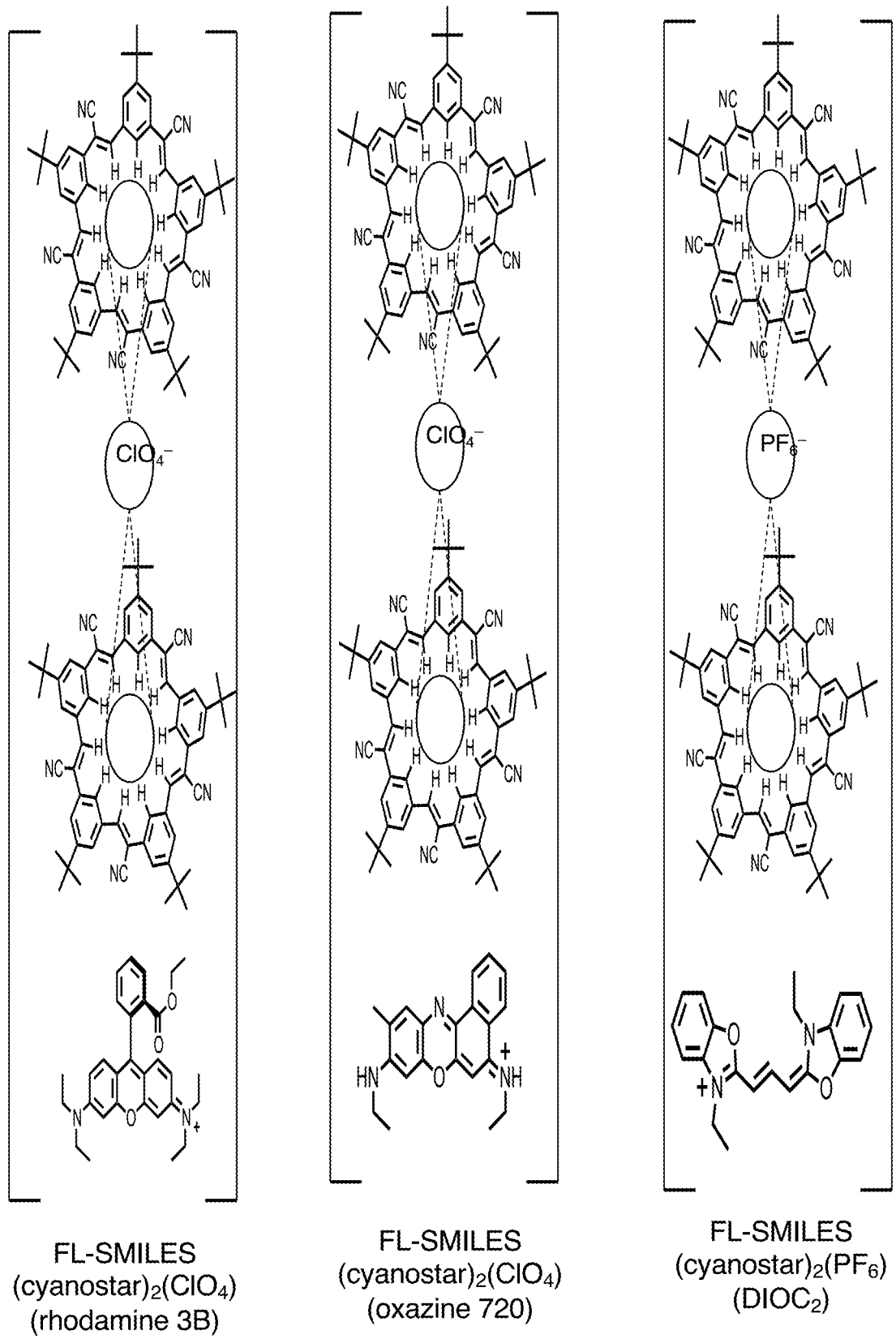
FIG. 13 depicts a summary of FL-SMILES materials.
Figure 14:
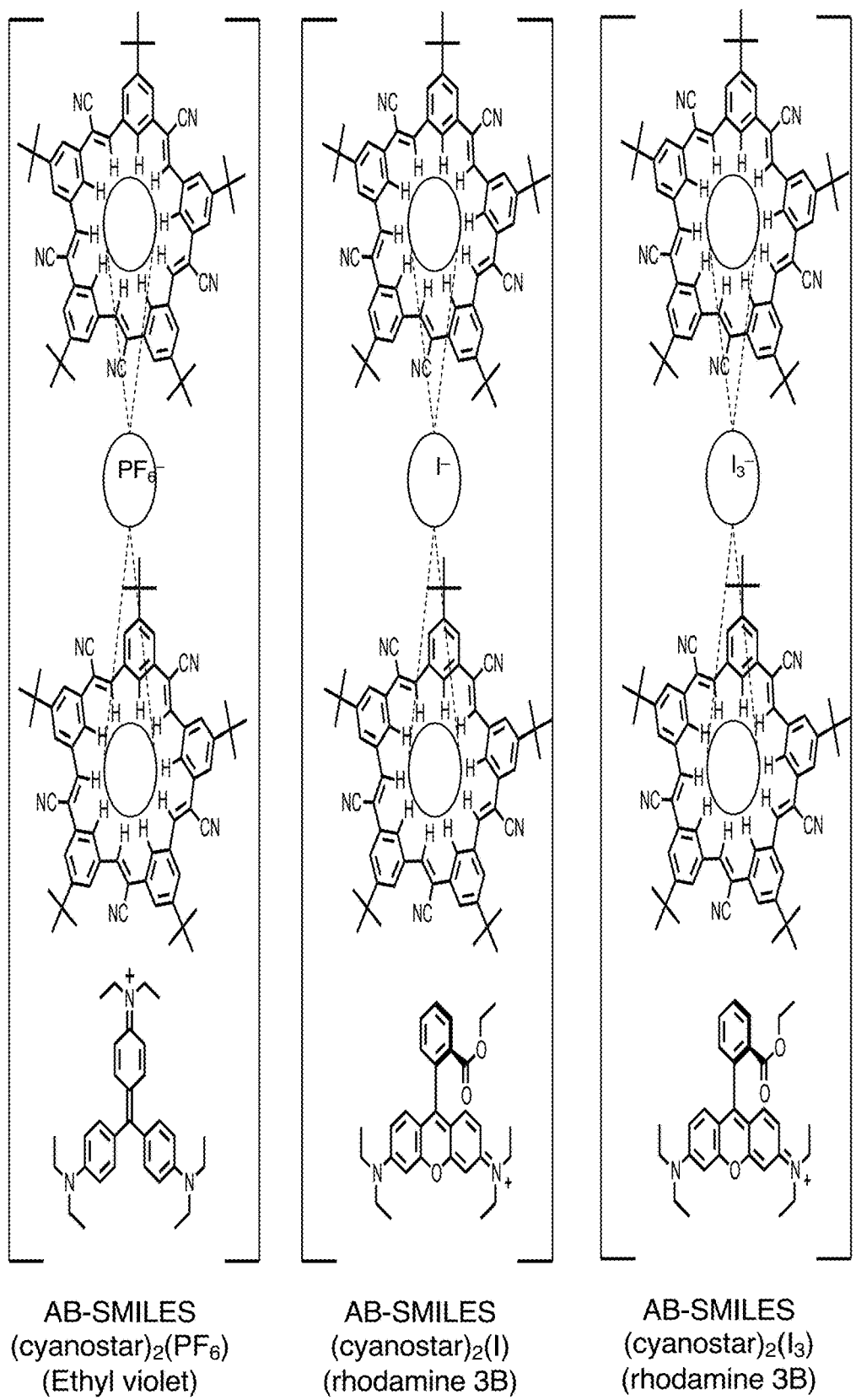
FIG. 14 depicts a summary of AB-SMILES materials; note that Formula (I-15) is a SMILES material that includes a dicationic dye ([(cyanostar)$_2$(HSO$_4$)$_2$(tetramethoxy-aminorhodamine))]).
Figure 15:
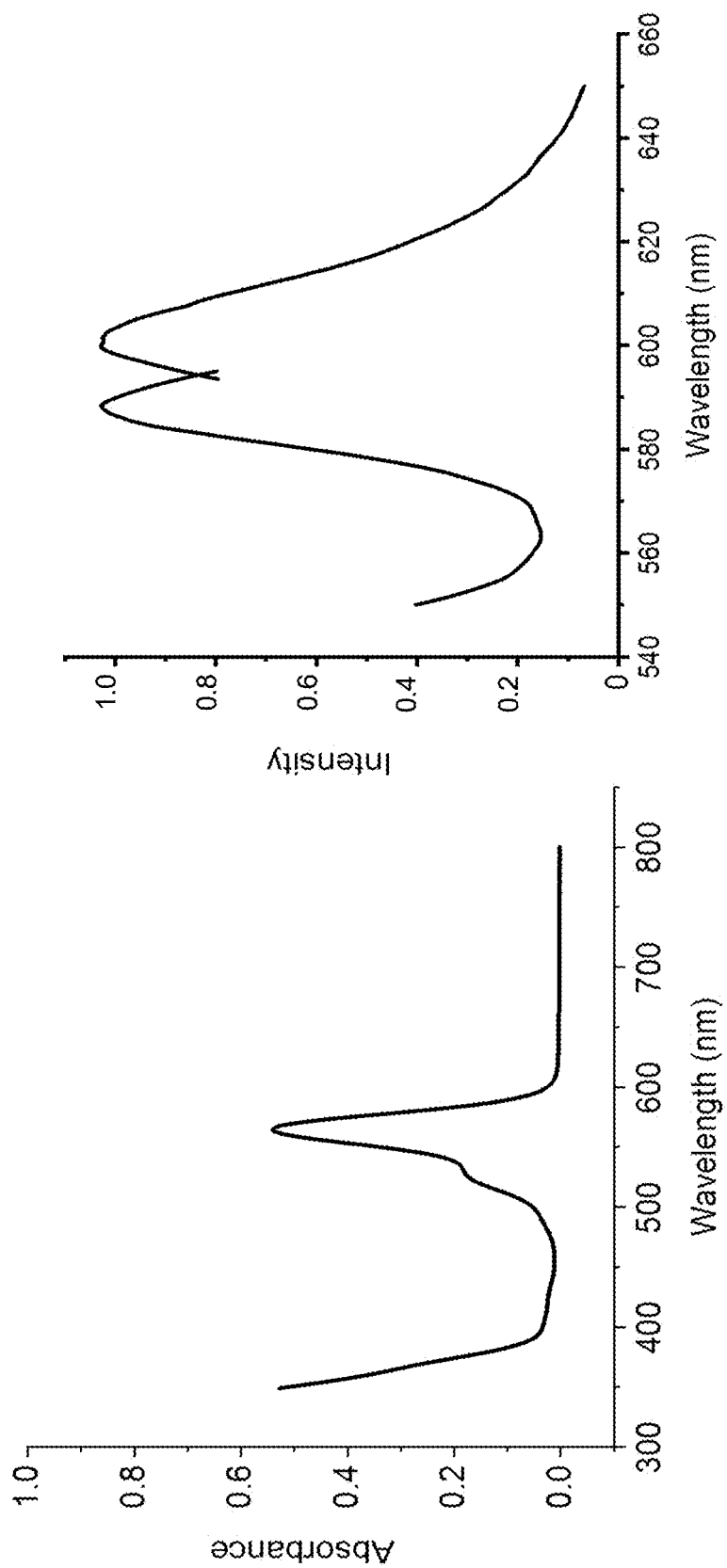
FIG. 15 depicts the absorption (left), and the excitation and emission (right) spectra of FL-SMILES nanoparticles of [(cyanostar)$_2$(ClO$_4$)(rhodamine 3B)] present as a colloid in an aqueous solution stabilized by TritonX.
Figure 17A:
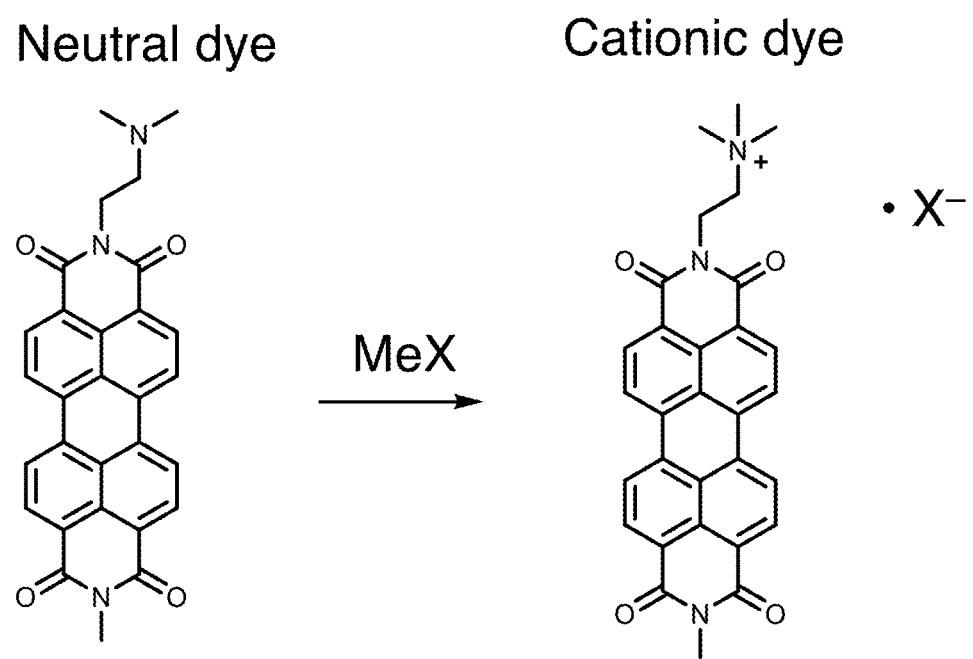
FIG. 17A depicts an exemplary reaction to convert a neutral dye into a cationic dye having one positive charge by alkylation.
Figure 17B:
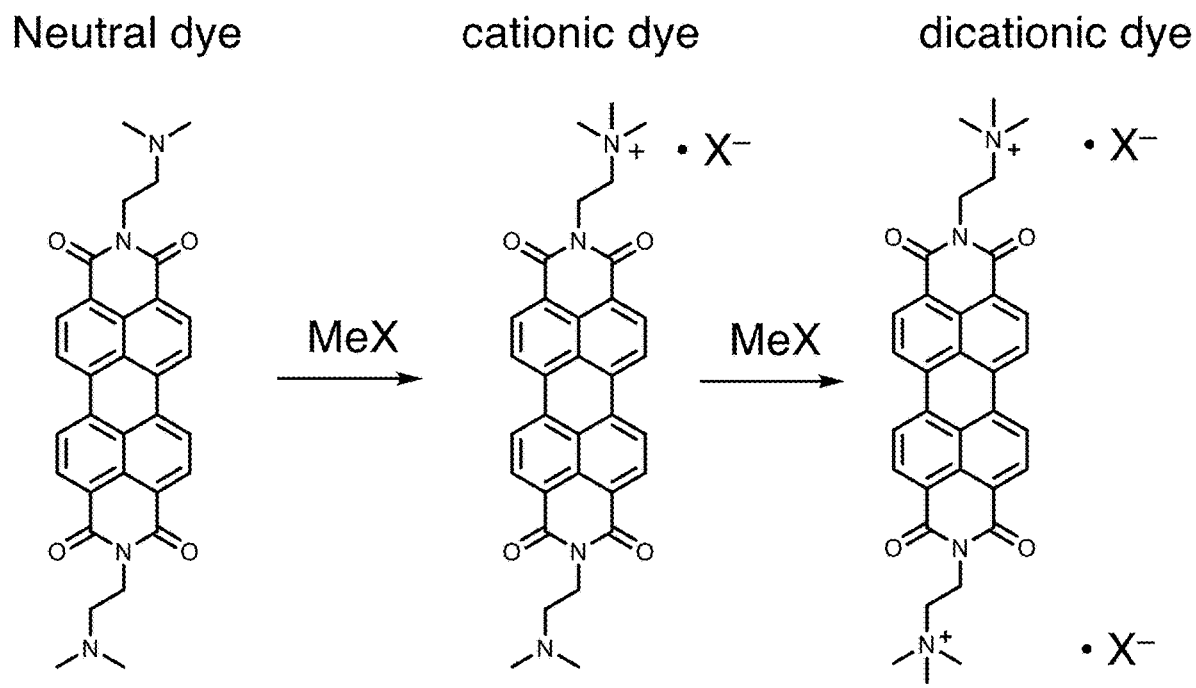
FIG. 17B depicts an exemplary reaction to convert a neutral dye into a cationic dye having one and two positive charges by alkylation.
Figure 18:
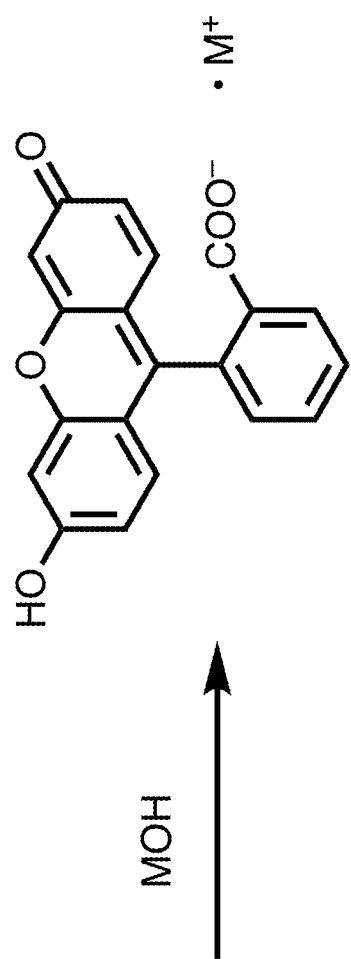
FIG. 18 depicts an exemplary reaction to convert a neutral dye into an anionic dye by addition of base (MOH).
Figure 18:
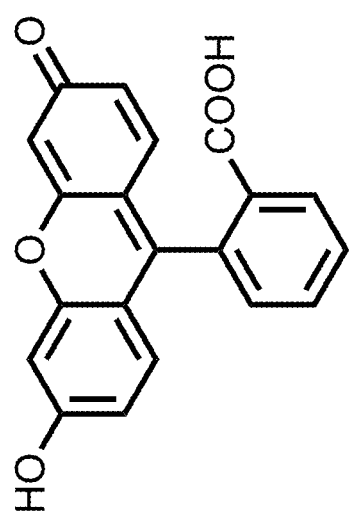
Figure 19:
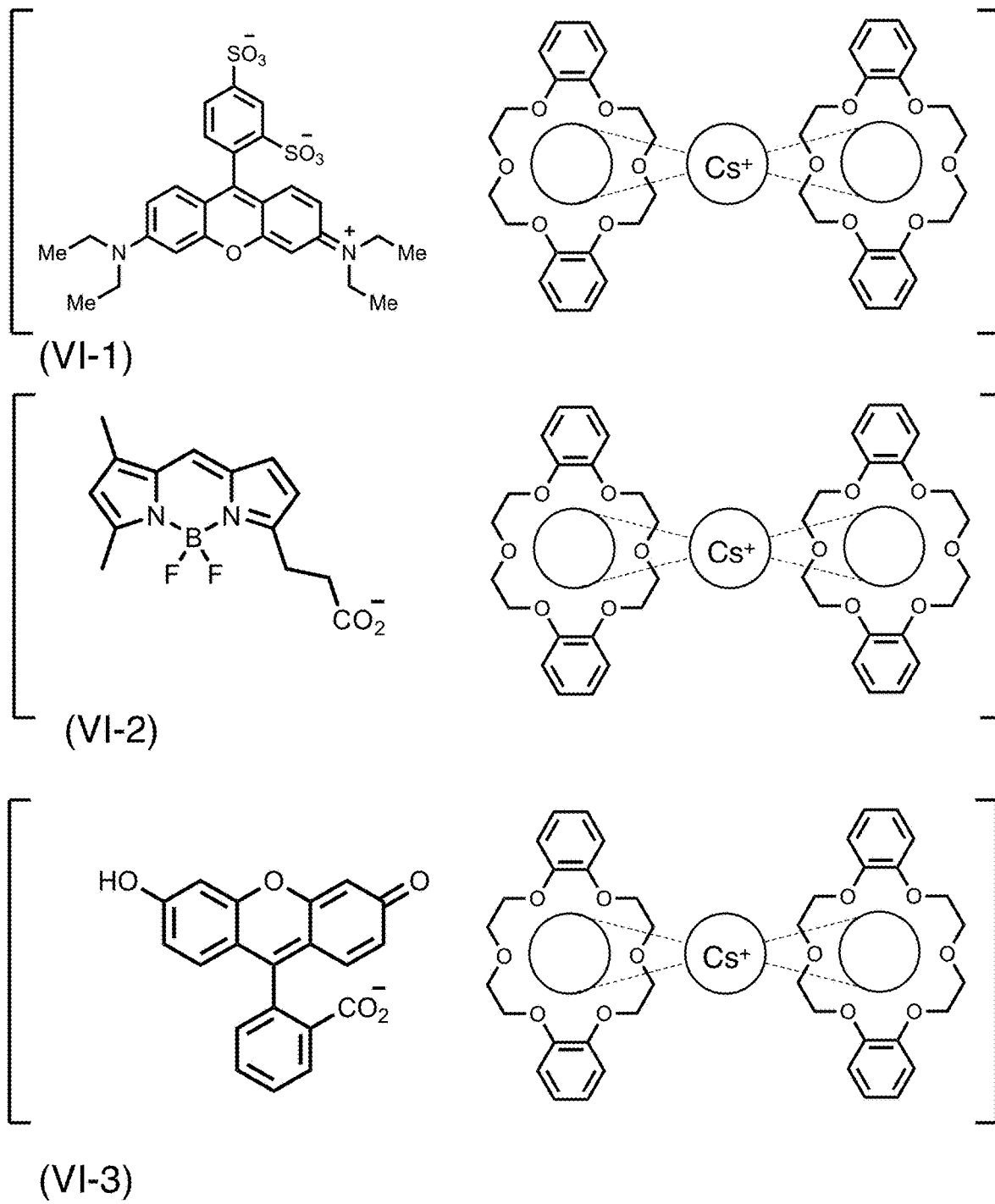
FIG. 19 depicts exemplary SMILES materials with anionic dyes; (VI-1) ([(dibenzo-18-crown-6)$_2$(Cs+)(sulforhodamine B)]); (VI-2) ([(dibenzo-18-crown-6)$_2$(Cs$^+$)(BODIPY FL)]); (VI-3) ([(dibenzo-18-crown-6)$_2$(Cs$^+$)(fluorescein)]); (VI-4) ([(dibenzo-18-crown-6)$_2$(Cs$^+$)(7-(Diethylamino) coumarin-3-carboxylate)]); and (VI-5) ([(dibenzo-18-crown-6)$_2$(Ca$^{2+}$)(uranine)]); note that (VI-5) is a SMILES material that includes a dianionic dye.
Figure 20:
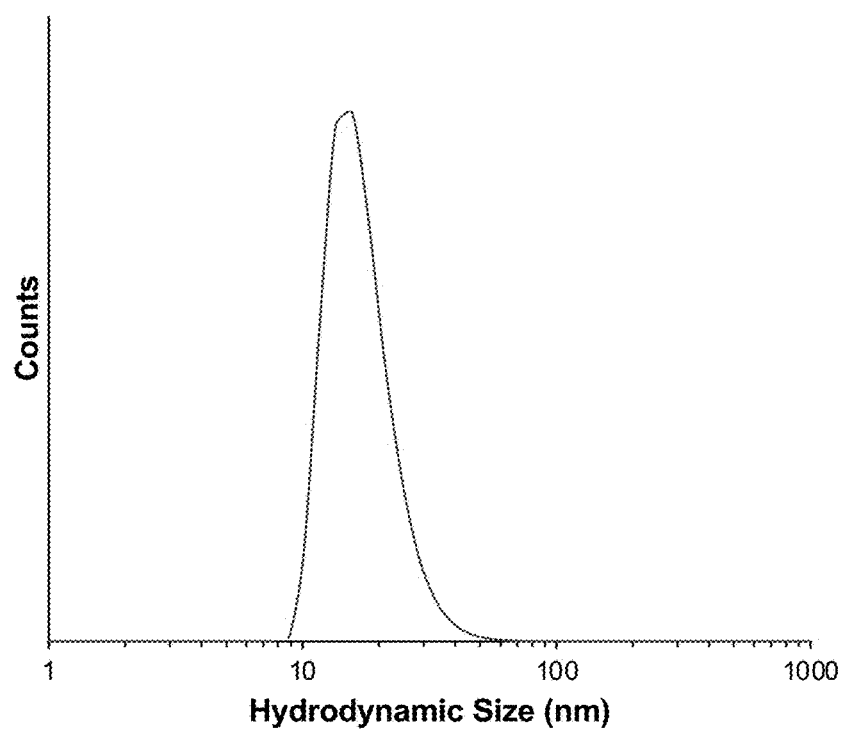
FIG. 20 depicts an exemplary dynamic light scattering plot showing hydrodynamic size distribution of SMILES nanoparticles using the cationic dye R12, counterion P$_6^-$ with two equivalents of cyanostar.
Figure 20:
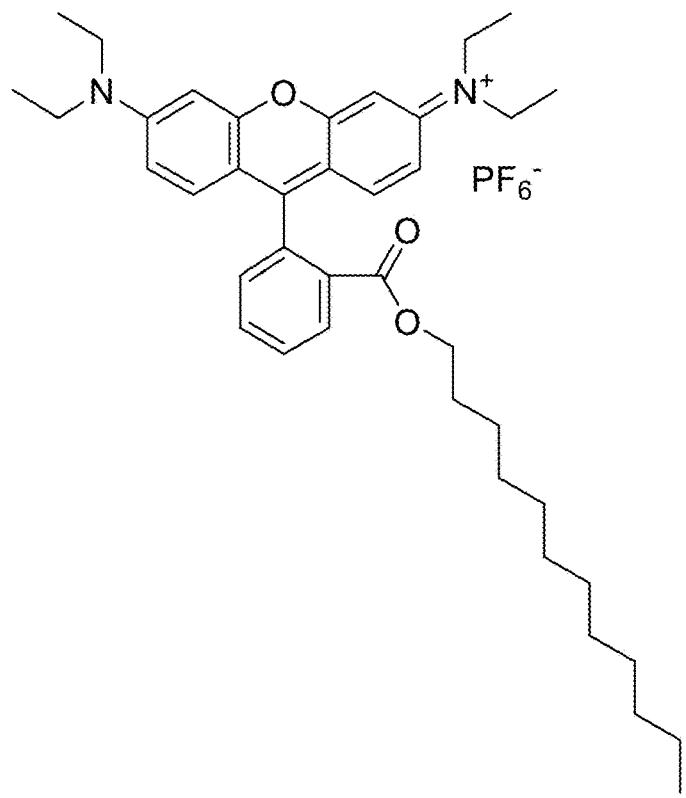
Figure 21:
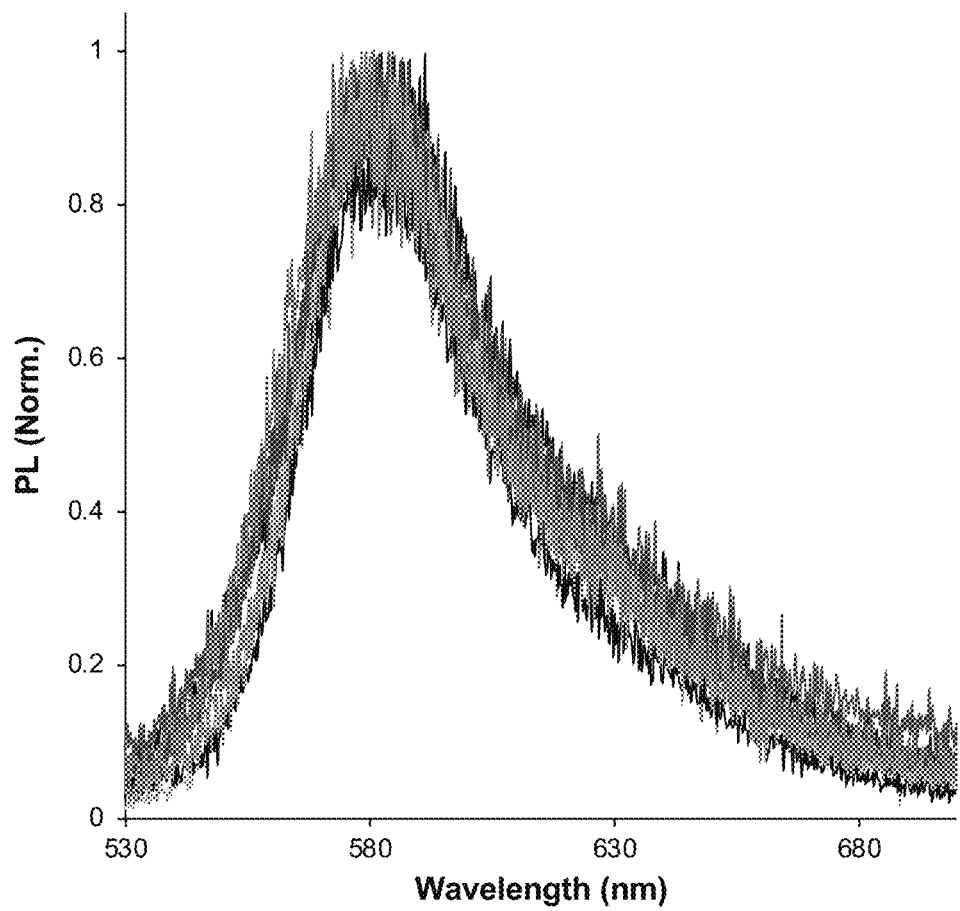
FIG. 21 depicts exemplary fluorescence spectra of SMILES nanoparticles comprising cationic dye R12 and its PF$_6^-$ counteranion mixed with two equivalents of cyanostar.
Figure 22:
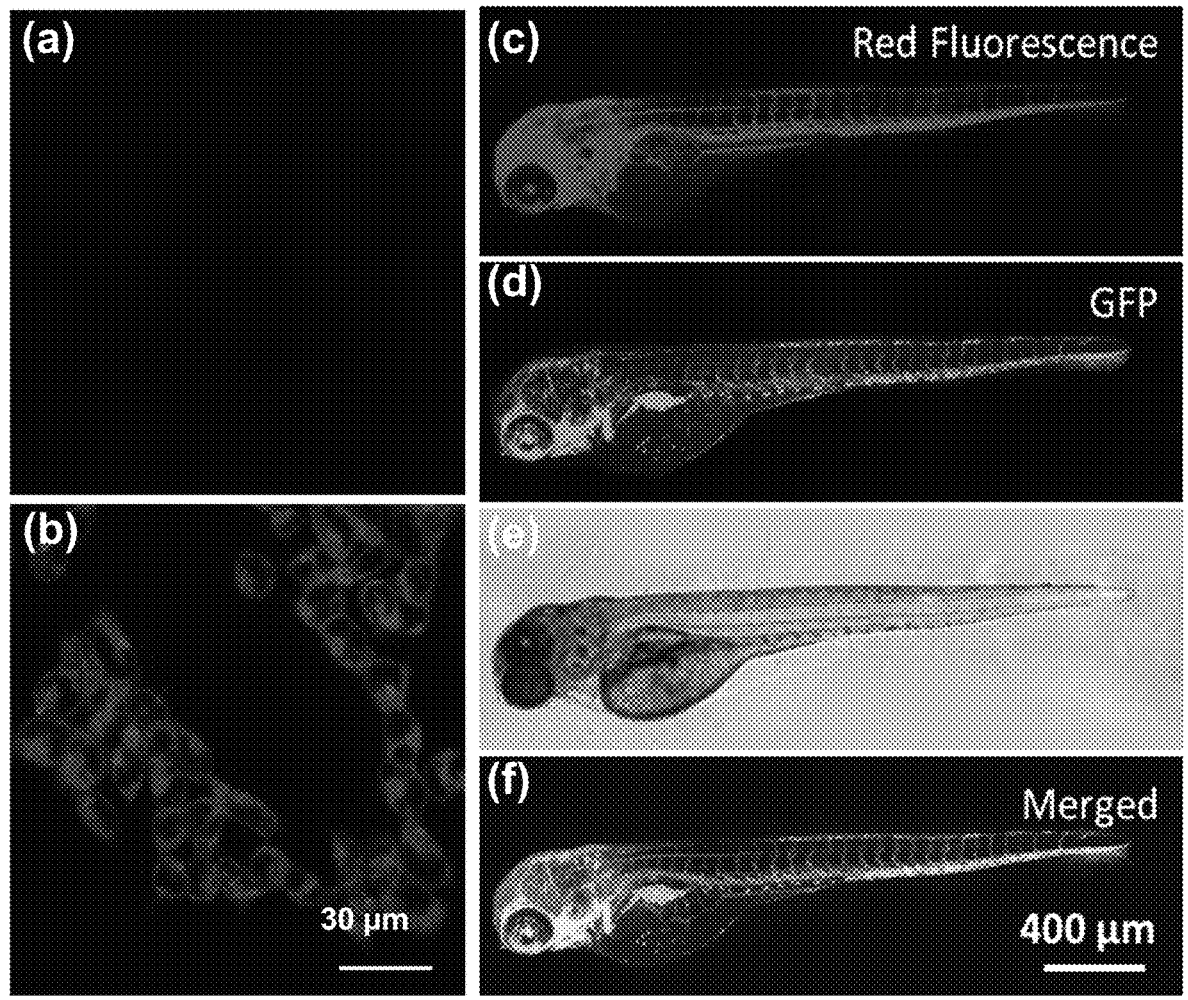
FIG. 22 depicts exemplary biological imaging with SMILES nanoparticles as follows: fluorescence microscopy images of HeLa cells incubated with R12 nanoparticles (panel (a)); fluorescence microscopy images of HeLa cells incubated with R12-based SMILES nanoparticles (panel (b)); blood vasculature imaging of Zebra fish larva with R12-based SMILES nanoparticles (panel (c)); blood vasculature imaging of Zebra fish larva with GFP fluorescence (panel (d)); white field image of Zebra fish larva (panel (e)); and blood vasculature imaging of Zebra fish larva with R12-based SMILES nanoparticles and GFP fluorescence overlay (panel (f)).
Figure 23:
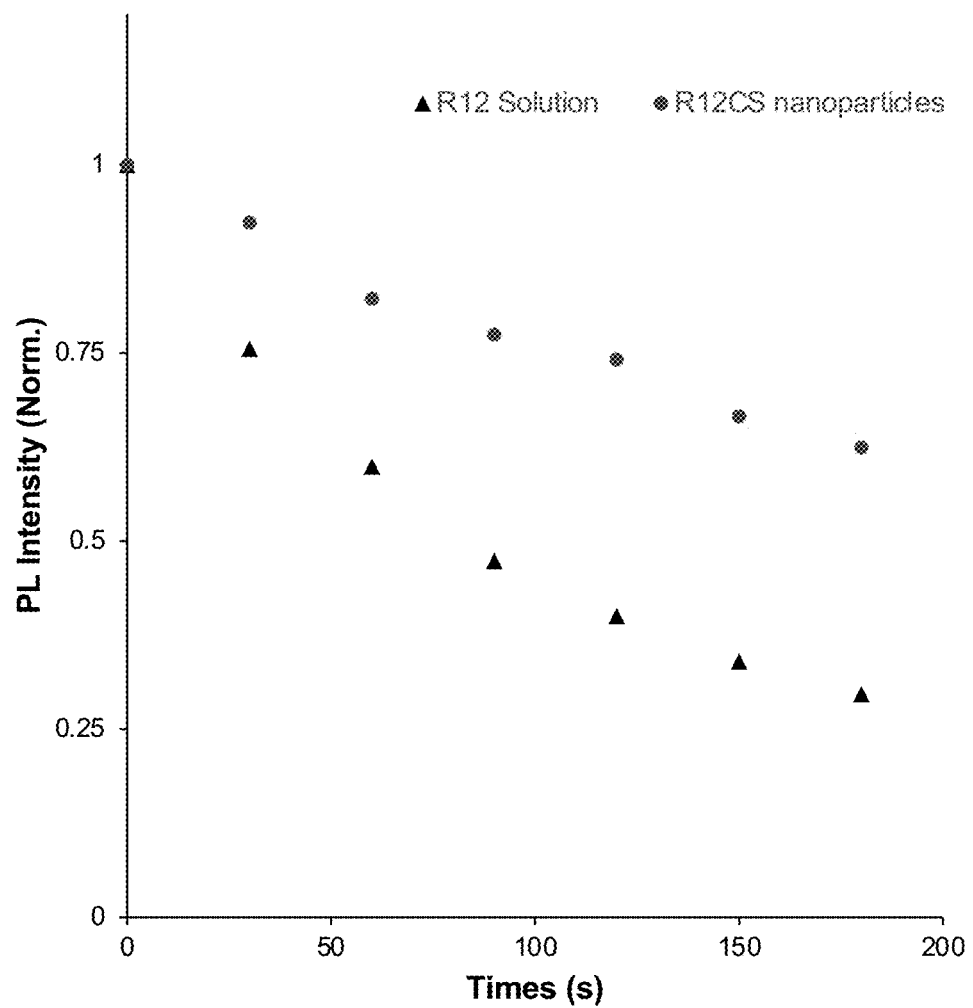
FIG. 23 depicts exemplary spectral data demonstrating that the photostability of the dye is increased once the dye is incorporated in to the SMILES material.

The present disclosure is based on the discovery of a new type of optical material, termed SMILES materials (Small Molecule Isolation LatticES), as exemplified in FIG. 1. The SMILES materials include a formulation having high fluorescence intensity and/or color matched properties of isolated ionic organic dyes measured under dilute conditions, for example, in the solution state or at low concentrations in polymer composites. When the SMILES materials display high fluorescence intensity and the color matched properties of isolated organic dyes, these are designated as fluorescent SMILES (FL-SMILES), as exemplified in FIG. 2. When the SMILES materials only display the color matched properties of isolated organic dyes, they are designated as light absorbing SMILES (AB-SMILES), as exemplified in FIG. 3. The SMILES materials are obtained by mixing an ionic dye and its counterion with an appropriate chelator ligand to form an ionic lattice (FIG. 4). SMILES materials can be rapidly prepared from a large collection of cationic dyes (FIG. 5) and dye classes with known solution-state spectral color and/or emission properties to provide formulations having color-matched solid-state materials and/or fluorescent solid-state materials. In the resulting ionic lattice of the materials (FIG. 4), the ionic dyes are spatially isolated from each other. Without being limited by any particular theory of operation or mechanism of action, use of control compounds (FIG. 6) suggest that this spatial isolation in the material formulation is believed to help to generate materials with color-matched light absorption and/or enhanced emission. SMILES materials can be from a range of appropriate chelator ligands (FIG. 6 and FIG. 7). Without being limited by any particular theory of operation or mechanism of action, electronic isolation of the ionic dyes defined by energy levels is believed to help generate materials with color-matched light absorption and/or enhanced emission (FIG. 8). Emission in FL-SMILES materials is seen to be orders of magnitude higher than for a solid-state preparation of the ionic dye alone, as exemplified by the 25-fold increase in intensity seen in FL-SMILES composed of cationic dye rhodamine 3B (FIG. 2D). SMILES materials can be a powder (FIG. 9), amorphous solid (FIG. 2E and FIG. 2F), thin films (FIG. 3C), crystals (FIG. 4), microparticles (FIG. 9), polymer composites (FIG. 10, FIG. 11, and FIG. 12), nanoparticles, and colloid of microparticles and nanoparticles (FIG. 15). A range series of materials display the properties of FL-SMILES (FIG. 13) and AB-SMILES (FIG. 14). Ionic dyes can be generated for the purpose of making SMILES materials including by addition of acid (FIG. 16) and by alkylation (FIG. 17) to make cationic dyes, and by addition of a base to make anionic dyes (FIG. 18). The anionic dyes can be used to make SMILES materials (FIG. 19) by mixing an anionic dye and its counterion with an appropriate chelator ligand. These and other preferred embodiments are disclosed herein that provide robust SMILES materials having high fluorescence intensity and/or color matched properties. SMILES materials in any form can be used to add color to polymers (FIG. 10, FIG. 11, and FIG. 12) simply by dissolving the SMILES material and the polymer to be colored into a good solvent and then removing the solvent. Another simple way for SMILES materials to add color to polymers (FIG. 10, FIG. 11, and FIG. 12) simply by dissolving the SMILES material into heated polymer melt and allowing the resulting colored polymer to cool. SMILES nanoparticles made using cationic dyes mixed with two equivalents of cyanostar can be made on order 20 nm in size (FIG. 20) and to display fluorescence spectra (FIG. 21) that can be used for biological imaging (FIG. 22). Incorporation of dyes into SMILES materials is seen to increase the photostability of the dye (FIG. 23).

Bambusuril-Based SMILES Compounds

Figure 24:
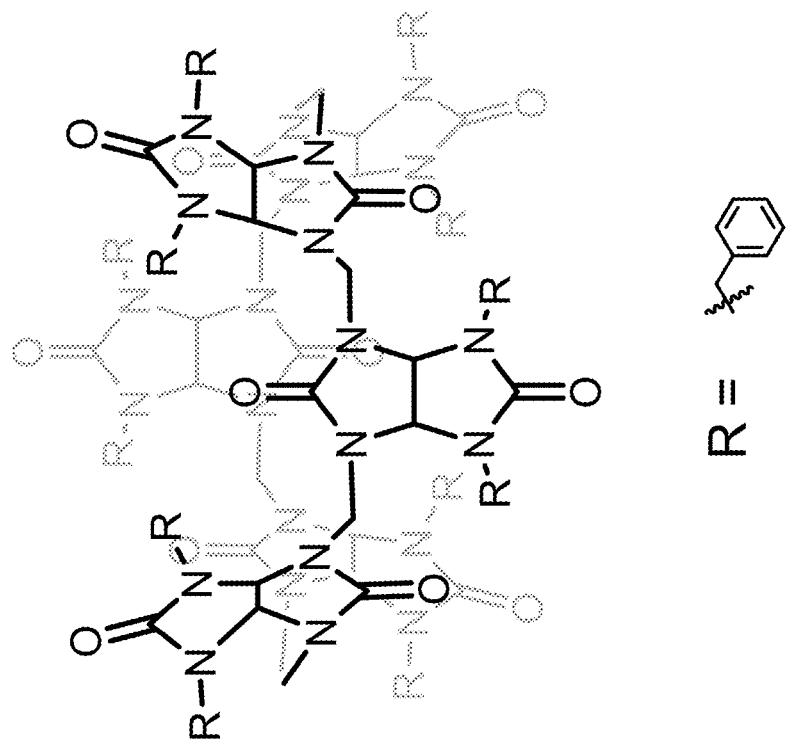
FIG. 24 depicts two exemplary bambusuril heteromacrocycles, Dodecamethylbambus[6]uril hydrate, BU[6](denoted as "B.1" (R is methyl)) and Dodecabenzylbambus[6]uril, Bn-BU[6](denoted as "B.2" (R is benzyl)).
Figure 24:
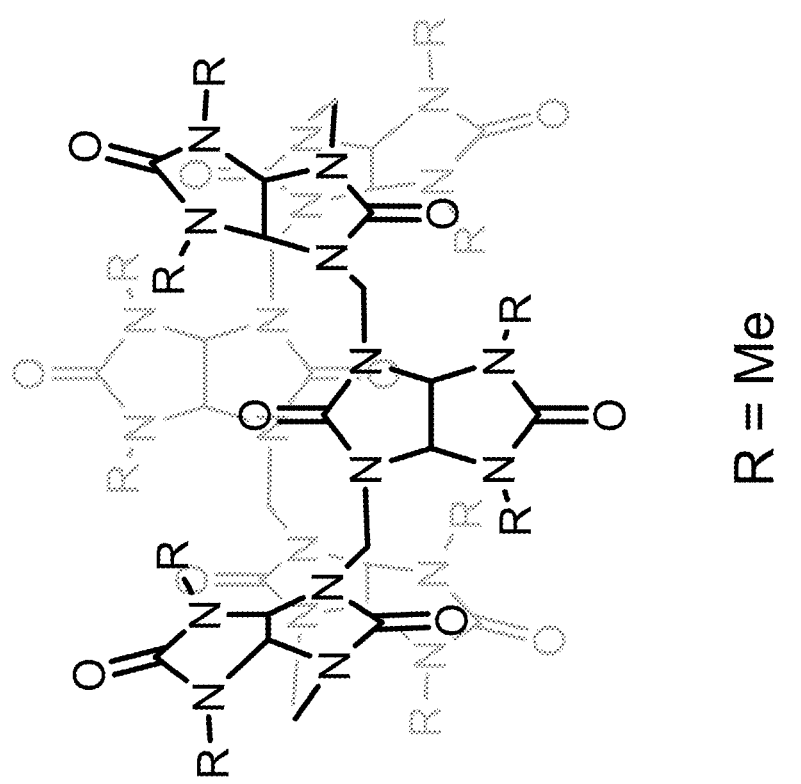

A new example of a SMILES material fulfilling this composition has been demonstrated by using bambusuril as a new counterion receptor. This is the first case using a counterion receptor called bambusuril, or bambus[6]uril. The bambusuril is another example of a heteromacrocycle. The SMILES materials made using bambusuril was demonstrated using two charged dyes that fulfil the criteria of having both a light absorbing and emitting unit. The two dyes used for this example are a styryl and a xanthene. Specifically, the dyes were Pyridin 1 and Rhodamine 3B. The anions used include those used previously. For the demonstration, two bambusuril heteromacrocycles were used (FIG. 24). They differ in the identity of the side chains. One is named dodecamethylbambus[6]uril hydrate, BU[6] and has the structure of compound denoted as B.1. One is named dodecabenzylbambus[6]uril, Bn-BU[6] and has the structure of compound denoted as B.2.

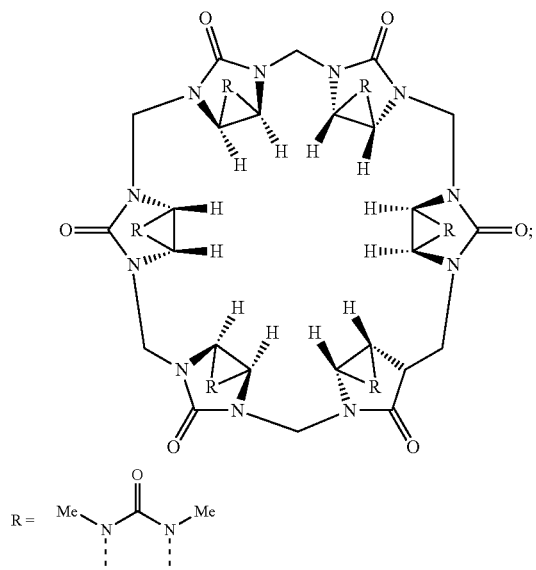

(B.1)

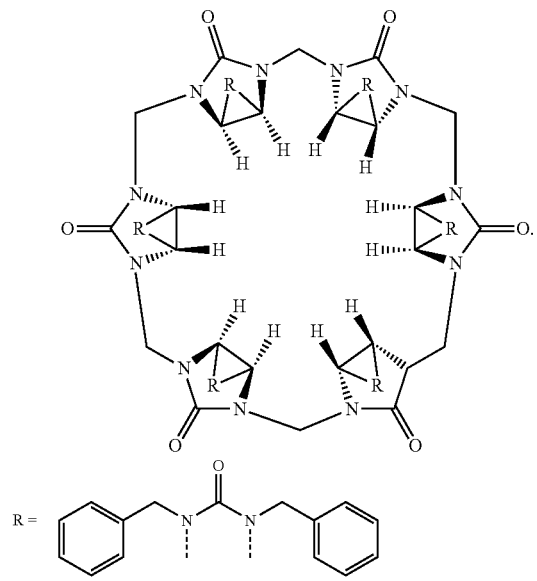

(B.2)

A genus of such bambusuril heteromacrocycles include preferably those compounds having Formula (B.3), as depicted below:

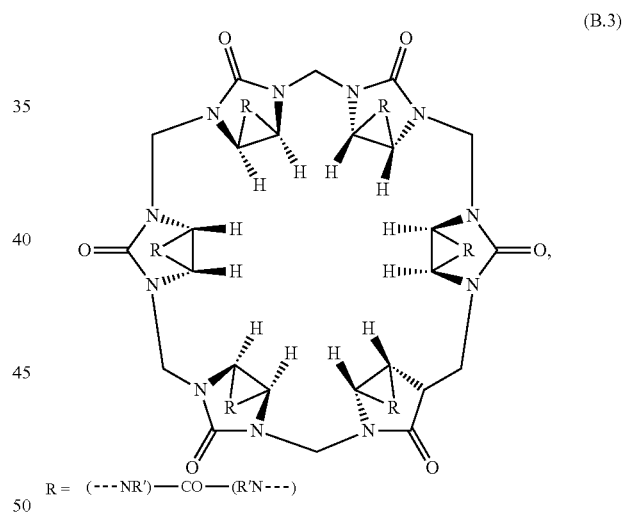

(B.3)

R = (---NR')—CO—(R'N---)

wherein R' of Formula (B.3) are identical and are selected from a group consisting of alkyl (for example, $C_1$-$C_{18}$), alkyl-substituted phenyl derivatives, alkenyl, alkoxy, aryl, heteroaryl, heterocycle, and substituted forms of alkenyl, alkoxy, aryl, heteroaryl, and heterocycle groups.

Figure 25:
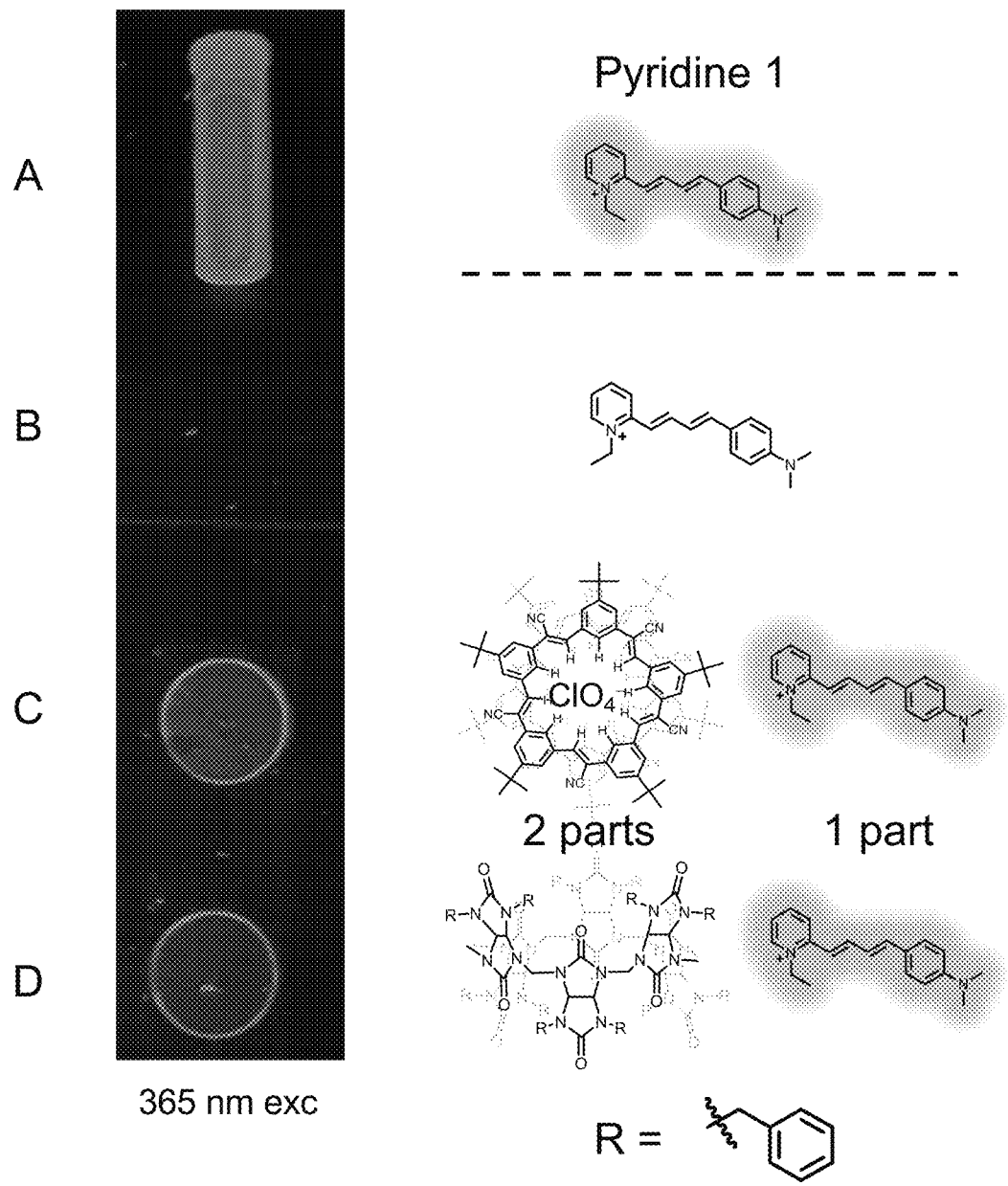
FIG. 25 depicts UV light illumination of various materials. Panel A: Pyridin 1 dye in solution; Panel B: a thin film of the Pyridin 1 dye; Panel C: a thin film of the Pyridin 1 dye composed using cyanostar; and Panel D: a thin film of the Pyridin 1 dye composed using bambusuril B.2.
Figure 26:
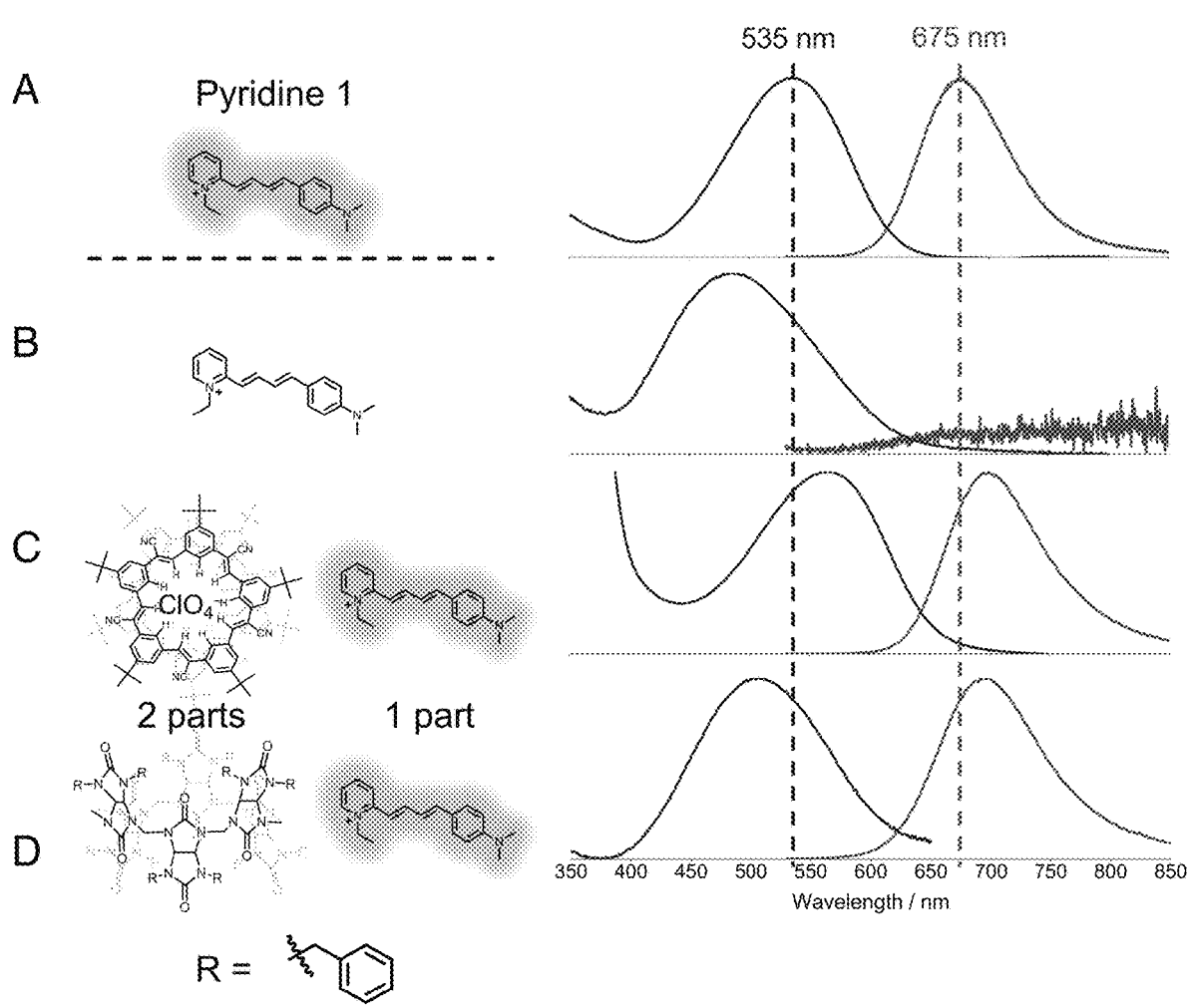
FIG. 26 depicts absorption and emission spectra of various materials, including Pyridin 1 dye in solution (Panel A); a thin film of the Pyridin 1 dye (Panel B); a thin film of the Pyridin 1 dye composed using cyanostar (Panel C;) and a thin film of the Pyridin 1 dye composed using bambusuril B.2 (Panel D).

The resultant compounds display the same types of behavior observed when making SMILES materials composed using cyanostar, but this time using bambusuril. The data for the Pyridin 1 dye are shown in FIGS. 25 and 26. In FIG. 25, we see photographs taken with UV light illumination of various materials, including Pyridin 1 dye in solution (Panel A); a thin film of the Pyridin 1 dye (Panel B); a thin film of the Pyridin 1 dye composed using cyanostar (Panel C;) and a thin film of the Pyridin 1 dye composed using the bambusuril B.2 (Panel D). The brightness of the Pyridin 1 dye is lost when transferred from solution to the solid thin film. We see the brightness restored when mixed with 2 parts cyanostar or 2 parts bambusuril. FIG. 26 shows the same outcome using emission spectral intensity (red traces). In all cases, SMILES materials were made by mixing 2 parts of the heteromacrocycle with 1 part of the cationic dye.

Figure 27:
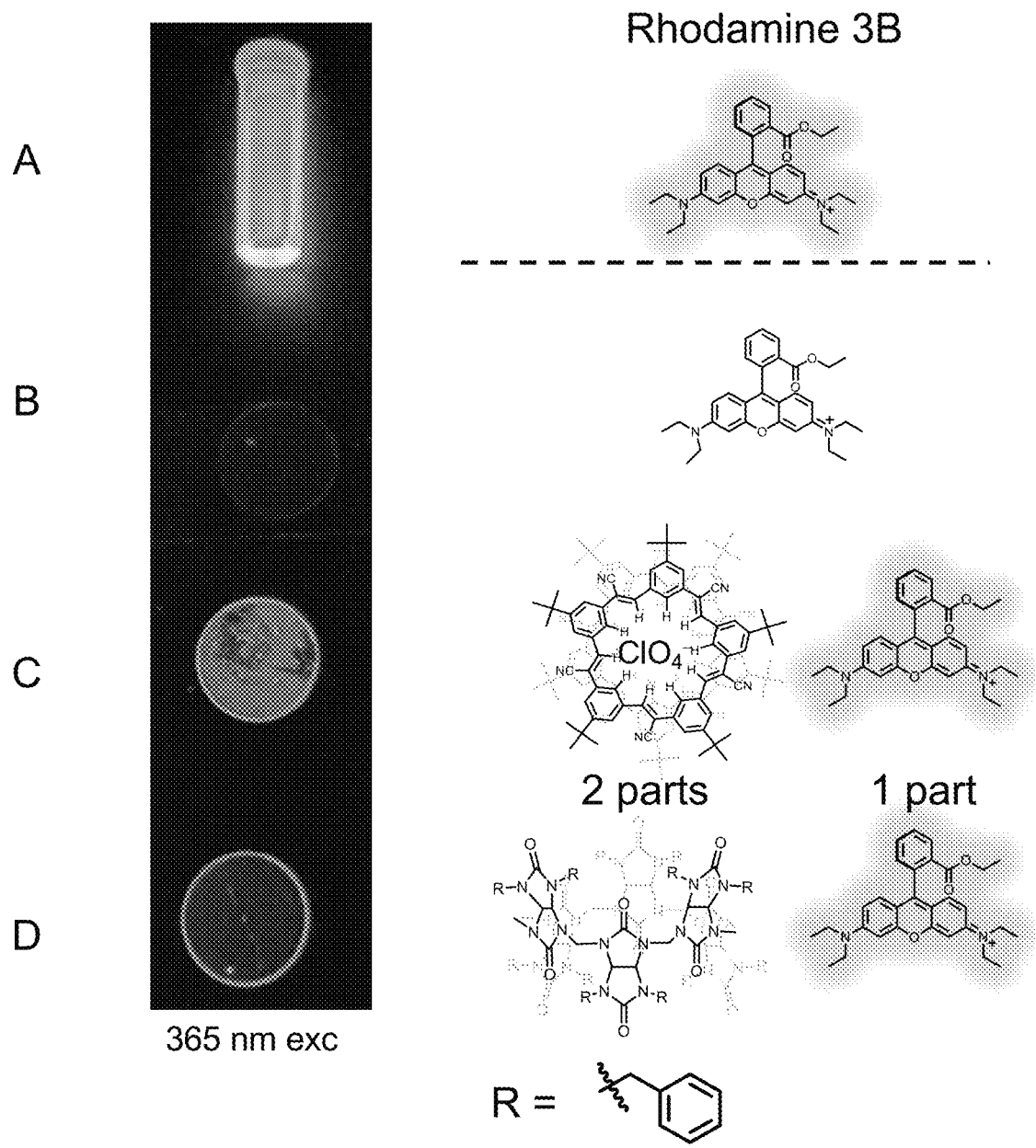
FIG. 27 depicts UV light illumination of various materials. Panel A: Rhodamine 3B dye in solution; Panel B: a thin film of the Rhodamine 3B dye; Panel C: a thin film of the Rhodamine 3B dye composed using cyanostar; and Panel D: a thin film of the Rhodamine 3B dye composed using bambusuril B.2.
Figure 28:
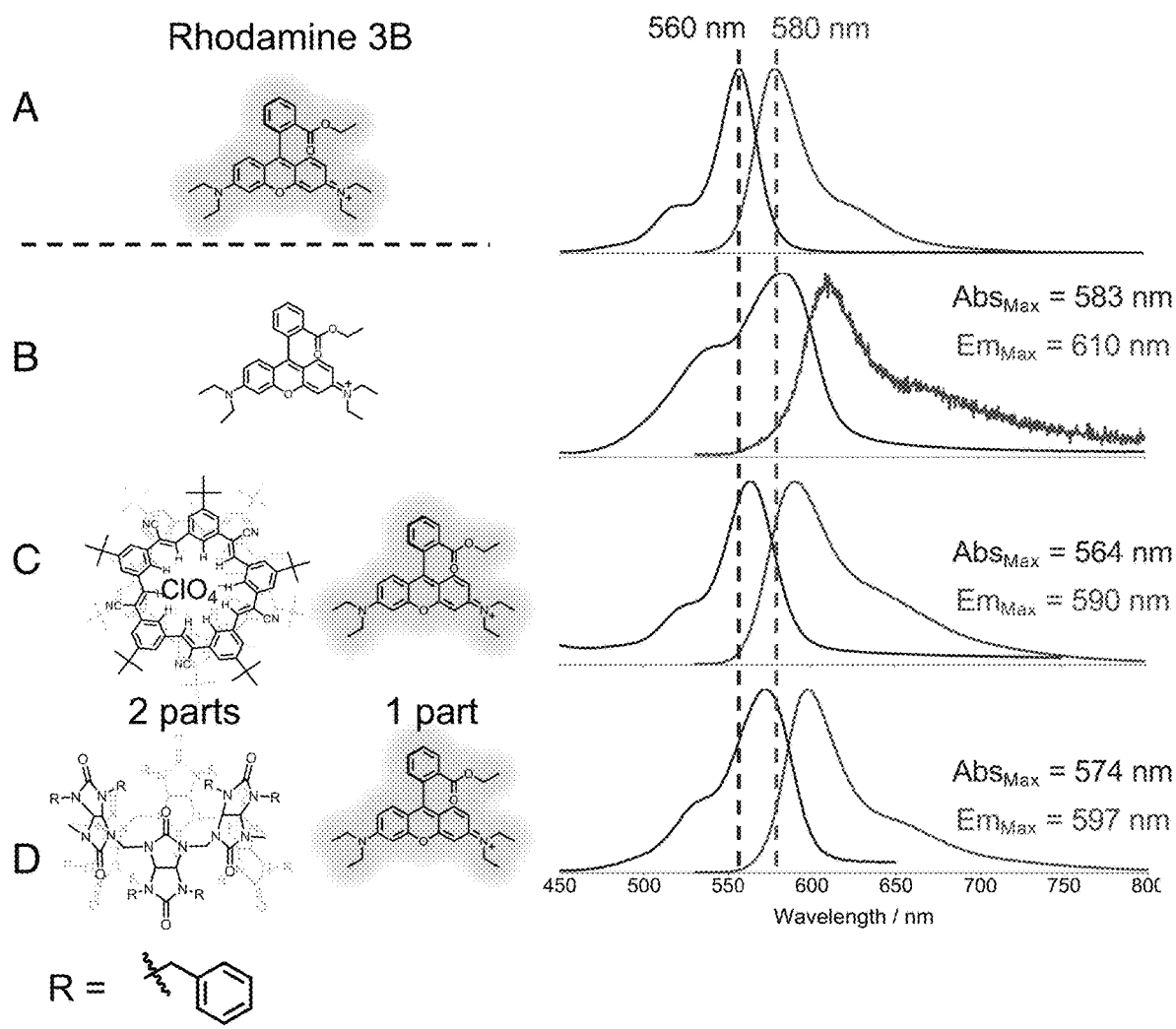
FIG. 28 depicts absorption and emission spectra of various materials, including Rhodamine 3B dye in solution (panel A); a thin film of the Rhodamine 3B dye (Panel B); a thin film of the Rhodamine 3B dye composed using cyanostar (Panel C); and a thin film of the Rhodamine 3B dye composed using bambusuril B.2 (Panel D).
Figure 29:
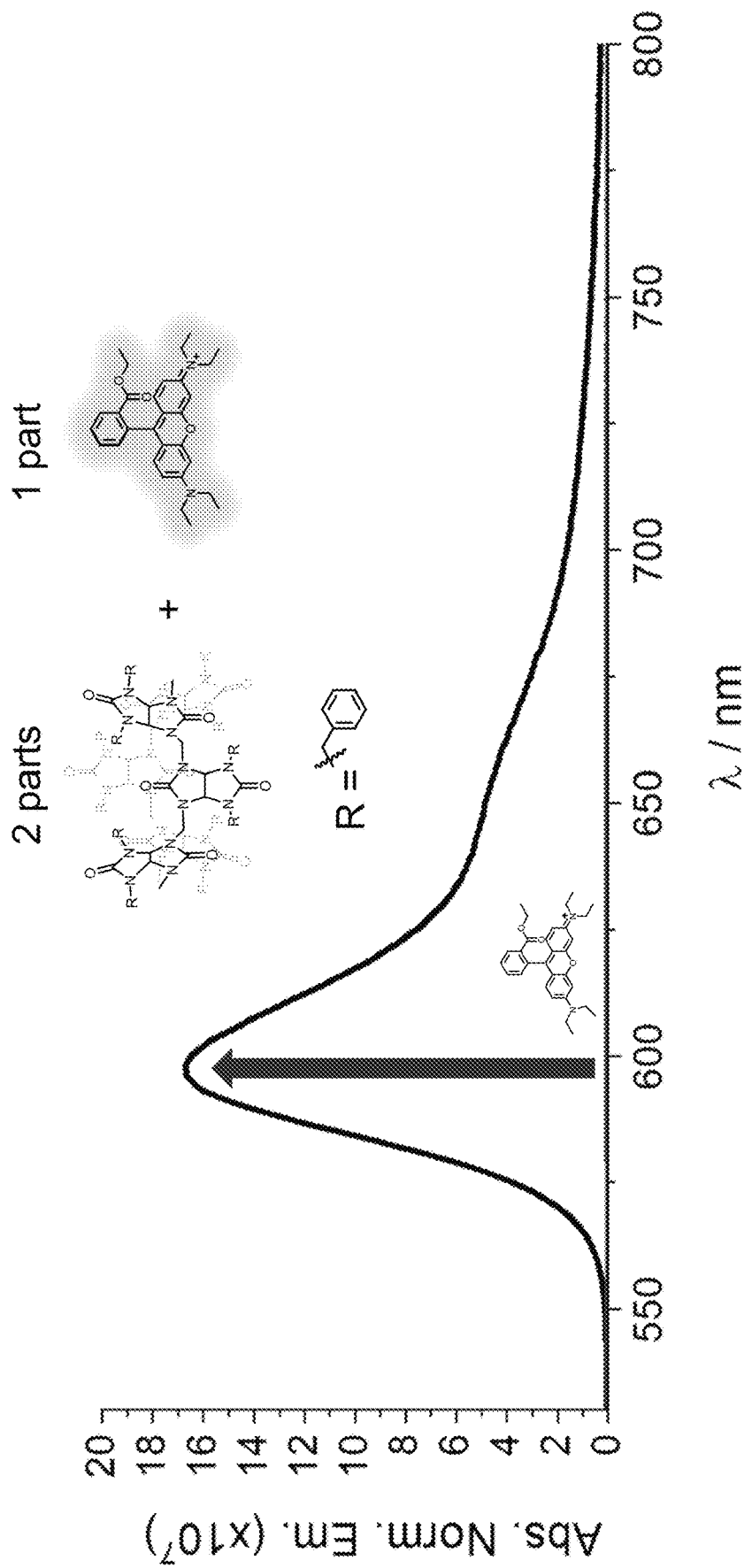
FIG. 29 depicts an absorption-normalized emission spectra of a thin film of the Rhodamine 3B dye composed using bambusuril B.2.

We see the same outcome of restoring the brightness when using rhodamine 3B in FIG. 27. The same outcome is seen in the emission spectra (FIG. 28). In this case, the lower intensity for the thin film of the rhodamine 3B dye alone is observed in the lower signal-to-noise of the spectrum relative to the two SMILES thin films. In order to emphasize the increase in intensity stemming from the SMILES material when two parts of bambusuril are mixed with 1 part of dye, we show the absorption-normalized emission spectra in FIG. 29. The emission from the dye alone is sufficiently quenched that it is hidden in the baseline.

Definitions

When introducing elements of aspects of the disclosure or particular embodiments, the articles "a," "an," "the," and "said" are intended to mean that there are one or more of the elements. The terms "comprising," "including," and "having" are intended to be inclusive and mean that there may be additional elements other than the listed elements. The term "or" means any one member of a particular list and also includes any combination of members of that list, unless otherwise specified.

As intended herein, the terms "substantially," "approximately," and "about" and similar terms are intended to have a broad meaning in harmony with the common and accepted usage in the art to which the subject matter of this disclosure pertains. It should be understood by those of skill in the art who review this disclosure that these terms are intended to allow a description of certain features described and claimed without restricting the scope of these features to precise numerical ranges provided. Accordingly, these terms should be interpreted as indicating that insubstantial or inconsequential modifications or alterations of the subject matter described and claimed are considered to be within the scope of the invention as recited in the appended claims.

The compounds herein described may exhibit chirality and may be isolated in optically active or racemic forms. Methods for preparing optically active forms include, for instance, resolution of racemic forms or synthesis from optically active starting materials. Many geometric isomers of olefins, C=N double bonds, and the like can also be present in the compounds described herein, and all such stable isomers are contemplated in the present invention. All chiral, diastereomeric, racemic forms and all geometric isomeric forms of a structure are intended, unless the specific stereochemistry or isomeric form is specifically indicated.

The compounds of the composition and formulations disclosed herein may exist as salts. The term "salt," refers to salts of the compounds which are water or oil-soluble or dispersible. The salts may be prepared during the final isolation and purification of the compounds or separately by reacting an amino group of the compounds with a suitable acid. For example, a compound may be dissolved in a suitable solvent, such as but not limited to methanol and water and treated with at least one equivalent of an acid, like hydrochloric acid. The resulting salt may precipitate out and be isolated by filtration and dried under reduced pressure. Alternatively, the solvent and excess acid may be removed under reduced pressure to provide the salt. Representative salts include acetate, adipate, alginate, citrate, aspartate, benzoate, benzenesulfonate, bisulfate, butyrate, camphorate, camphorsulfonate, digluconate, glycerophosphate, hemisulfate, heptanoate, hexanoate, formate, isethionate, fumarate, lactate, maleate, methanesulfonate, naphthylenesulfonate, nicotinate, oxalate, pamoate, pectinate, persulfate, 3-phenylpropionate, picrate, oxalate, maleate, pivalate, propionate, succinate, tartrate, trichloroacetate, trifluoroacetate, glutamate, para-toluenesulfonate, undecanoate, hydrochloric, hydrobromic, sulfuric, phosphoric and the like. The amino groups of the compounds may also be quaternized with alkyl chlorides, bromides and iodides such as methyl, ethyl, propyl, isopropyl, butyl, lauryl, myristyl, stearyl and the like.

Basic addition salts may be prepared during the final isolation and purification of the present compounds by reaction of a carboxyl group with a suitable base such as the hydroxide, carbonate, or bicarbonate of a metal cation such as lithium, sodium, potassium, calcium, magnesium, or aluminum, or an organic primary, secondary, or tertiary amine. Quaternary amine salts derived from methylamine, dimethylamine, trimethylamine, triethylamine, diethylamine, ethylamine, tributylamine, pyridine, N,N-dimethylaniline, N-methylpiperidine, N-methylmorpholine, dicyclohexylamine, procaine, dibenzylamine, N,N-dibenzylphenethylamine, 1-ephenamine and N,N'-dibenzylethylenediamine, ethylenediamine, ethanolamine, diethanolamine, piperidine, piperazine and the like, are contemplated as being within the scope of the present invention.

The term "substituted," as used herein, means that any one or more hydrogens on the designated atom is replaced with a selection from the indicated group, provided that the designated atom's normal valency is not exceeded, and that the substitution results in a stable compound. When a substituent is oxo (i.e., =O), then 2 hydrogens on the atom are replaced. Oxo substituents are not present on aromatic moieties. When a ring system (e.g., carbocyclic or heterocyclic) is said to be substituted with a carbonyl group or a double bond, it is intended that the carbonyl group or double bond be part (i.e., within) of the ring.

When a bond to a substituent is shown to cross a bond connecting two atoms in a ring, then such substituent may be bonded to any atom on the ring. When a substituent is listed without indicating the atom via which such substituent is bonded to the rest of the compound of a given formula, then such substituent may be bonded via any atom in such substituent, provided that the resulting bond is present in a stable compound.

The term "hydroxy" as used herein, refers to an —OH group. The term "oxo" as used herein, refers to a =O group. The term "oxy" as used herein, refers to a —O— group. The term "sulfonyl" as used herein, refers to a —S(O)$_2$— group. The term "carbonyl" as used herein refers to a —C(O)— group. The term "carboxy" as used herein refers to a —C(O)—OH group. The term "halo" or "halogen," as used herein, refers to —Cl, —Br, —I or —F.

The term "alkenyl" as used herein, refers to a straight or branched chain hydrocarbon group containing from 2 to 10 carbons and containing at least one carbon-carbon double bond formed by the removal of two hydrogens. Representative examples of alkenyl include, but are not limited to, ethenyl, 2-propenyl, 2-methyl-2-propenyl, 3-butenyl, 4-pentenyl, 5-hexenyl, 2-heptenyl, 2-methyl-1-heptenyl, and 3-decenyl.

The term "alkoxy" as used herein, refers to an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, hexyloxy, heptyloxy, octyloxy, nonyloxy, decyloxy, undecyloxy, dodecyloxy, trisdecyloxy, tetradecyloxy, and pentadecyloxy.

The term "alkyl" as used herein, refers to a straight or branched chain hydrocarbon group containing from 1 to 18 carbon atoms (exemplary number of carbons by way of example). Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl and n-decyl.

The term "alkyl-NH" as used herein, refers to an alkyl group, as defined herein, appended to the parent molecular moiety through a nitrogen atom.

The term "alkyl-NH-alkyl" as used herein, refers to an alkyl-NH group, as defined herein, appended to the parent molecular moiety through an alkyl group, as defined herein.

The term "aryl" as used herein, means a phenyl group, or a bicyclic or a tricyclic fused ring system. Bicyclic fused ring systems are exemplified by a phenyl group appended to the parent molecular moiety and fused to a monocyclic cycloalkyl group, as defined herein, a phenyl group, a monocyclic heteroaryl group, as defined herein, or a monocyclic heterocycle, as defined herein. Tricyclic fused ring systems are exemplified by an aryl bicyclic fused ring system, as defined herein and fused to a monocyclic cycloalkyl group, as defined herein, a phenyl group, a monocyclic heteroaryl group, as defined herein, or a monocyclic heterocycle, as defined herein. Representative examples of aryl include, but are not limited to, anthracenyl, azulenyl, fluorenyl, indanyl, indenyl, naphthyl, phenyl and tetrahydronaphthyl.

The term "cycloalkyl" as used herein, refers to a monocyclic, bicyclic, or tricyclic ring system. Monocyclic ring systems are exemplified by a saturated cyclic hydrocarbon group containing from 3 to 8 carbon atoms. Examples of monocyclic ring systems include cyclopropyl, cyclobutyl, cyclopentyl, cyclohexyl, cycloheptyl and cyclooctyl. Bicyclic fused ring systems are exemplified by a cycloalkyl group appended to the parent molecular moiety, which is fused to an additional cycloalkyl group, as defined herein, a phenyl group, a heteroaryl, as defined herein, or a heterocycle as defined herein. Tricyclic fused ring systems are exemplified by a cycloalkyl bicyclic fused ring system fused to an additional cycloalkyl group, as defined herein, a phenyl group, a heteroaryl, as defined herein, or a heterocycle as defined herein. Bicyclic ring systems are also exemplified by a bridged monocyclic ring system in which two non-adjacent carbon atoms of the monocyclic ring are linked by an alkylene bridge of between one and three additional carbon atoms. Representative examples of bicyclic ring systems include, but are not limited to, bicyclo[3.1.1]heptane, bicyclo[2.2.1]heptane, bicyclo[2.2.2]octane, bicyclo[3.2.2]nonane, bicyclo[3.3.1]nonane and bicyclo[4.2.1]nonane. Tricyclic ring systems are also exemplified by a bicyclic ring system in which two non-adjacent carbon atoms of the bicyclic ring are linked by a bond or an alkylene bridge of between one and three carbon atoms. Representative examples of tricyclic-ring systems include, but are not limited to, tricyclo[3.3.1.0³,⁷]nonane and tricyclo[3.3.1.1³,⁷]decane (adamantane).

The term "haloalkyl," as used herein, refers to at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl and 2-chloro-3-fluoropentyl.

The term "heteroaryl," as used herein, refers to an aromatic monocyclic ring or an aromatic bicyclic ring system. The aromatic monocyclic rings are five or six membered rings containing at least one heteroatom independently selected from the group consisting of N, O and S. The five membered aromatic monocyclic rings have two double bonds and the six membered aromatic monocyclic rings have three double bonds. The bicyclic heteroaryl groups are exemplified by a monocyclic heteroaryl ring appended to the parent molecular moiety and fused to a monocyclic cycloalkyl group, as defined herein, a monocyclic aryl group, as defined herein, a monocyclic heteroaryl group, as defined herein, or a monocyclic heterocycle, as defined herein. Representative examples of heteroaryl include, but are not limited to, benzimidazolyl, benzofuranyl, benzothiazolyl, benzothienyl, benzoxazolyl, furyl, imidazolyl, indazolyl, indolyl, indolizinyl, isobenzofuranyl, isoindolyl, isoxazolyl, isoquinolinyl, isothiazolyl, naphthyridinyl, oxadiazolyl, oxazolyl, phthalazinyl, pyridinyl, pyridazinyl, pyridyl, pyrimidinyl, pyrazinyl, pyrazolyl, pyrrolyl, quinolinyl, quinolizinyl, quinoxalinyl, quinazolinyl, tetrazolyl, thiadiazolyl, thiazolyl, thienyl, triazolyl and triazinyl.

The term "heterocycle" as used herein, refers to a non-aromatic monocyclic ring or a non-aromatic bicyclic ring. The non-aromatic monocyclic ring is a three, four, five, six, seven, or eight membered ring containing at least one heteroatom, independently selected from the group consisting of N, O and S. Representative examples of monocyclic ring systems include, but are not limited to, azetidinyl, aziridinyl, diazepinyl, dithianyl, imidazolinyl, imidazolidinyl, isothiazolinyl, isoxazolinyl, isoxazolidinyl, morpholinyl, oxazolinyl, oxazolidinyl, piperazinyl, piperidinyl, pyranyl, pyrazolinyl, pyrazolidinyl, pyrrolinyl, pyrrolidinyl, tetrahydrofuranyl, tetrahydro-2H-pyranyl, tetrahydro-2H-pyran-2-yl, tetrahydro-2H-pyran-4-yl, tetrahydrothienyl, thiazolinyl, thiazolidinyl, thiomorpholinyl, 1,1-dioxidothiomorpholinyl (thiomorpholine sulfone) and thiopyranyl. The bicyclic heterocycles are exemplified by a monocyclic heterocycle appended to the parent molecular moiety and fused to a monocyclic cycloalkyl group, as defined herein, a monocyclic aryl group, a monocyclic heteroaryl group, as defined herein, or a monocyclic heterocycle, as defined herein. Bicyclic ring systems are also exemplified by a bridged monocyclic ring system in which two non-adjacent atoms of the monocyclic ring are linked by a bridge of between one and three atoms selected from the group consisting of carbon, nitrogen and oxygen. Representative examples of bicyclic ring systems include but are not limited to, for example, benzopyranyl, benzothiopyranyl, benzodioxinyl, 1,3-benzodioxolyl, cinnolinyl, 1,5-diazocanyl, 3,9-diaza-bicyclo[4.2.1]non-9-yl, 3,7-diazabicyclo[3.3.1]nonane, octahydro-pyrrolo[3,4-c]pyrrole, indolinyl, isoindolinyl, 2,3,4,5-tetrahydro-1H-benzo[c]azepine, 2,3,4,5-tetrahydro-1H-benzo[b]azepine, 2,3,4,5-tetrahydro-1H-benzo[d]azepine, tetrahydroisoquinolinyl and tetrahydroquinolinyl.

The term "macrocycle" refers to a cyclic ring system that includes at least three cyclic rings covalently linked together.

The term "heteromacrocycle" refers to a macrocycle having at least one non-carbon atom included in the macrocycle structure.

The term "light-absorbing unit" refers to a chromophore that has an atom or group of atoms whose presence is responsible for absorbing light UV, visible and/or near-infrared region of the electromagnetic spectrum.

The term "light emissive unit" refers to a fluorophore that has an atom or group of atoms whose presence is responsible for absorbing light UV, visible and/or near-infrared region of the electromagnetic spectrum.

The term "light-absorbing unit and a light emissive unit" refers to a fluorophore that has an atom or group of atoms whose presence is responsible for absorbing light UV, visible and/or near-infrared region of the electromagnetic spectrum.

The chemical structures described herein are named according to IUPAC nomenclature rules and include art-accepted common names and abbreviations where appropriate. The IUPAC nomenclature can be derived with chemical structure drawing software programs, such as ChemDraw® (PerkinElmer, Inc.), ChemDoodle® (iChemLabs, LLC) and Marvin (ChemAxon Ltd.). The chemical structure controls in the disclosure to the extent that a compound name is misnamed or otherwise conflicts with the chemical structure disclosed herein.

Ionic Dye Classes

The present invention uses ionic dyes obtained naturally or from specific dye classes of neutral dyes. These dyes include styryls, xanthenes, trianguleniums, oxazines, triarylmethanes, cyanines, acridines, fluoronones, phenanthridines, polyaromatic hydrocarbons, imides, BODIPYs, coumarins, and squaraines, or a combination thereof. These dyes can be converted into cationic dyes or anionic dyes under appropriate conditions as disclosed herein.

Figure 16:
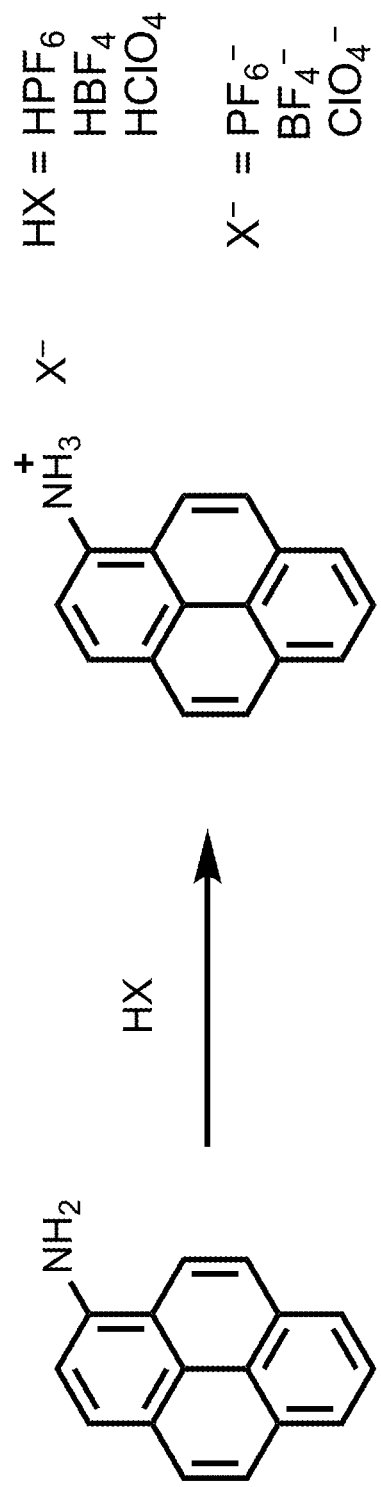
FIG. 16 depicts an exemplary reaction to convert a neutral dye into a cationic dye by addition of acid (HX).

For example, a neutral dye can be converted to the cationic dye with the addition of acid HX, where X is the anionic counterion (FIG. 16). In another example, a neutral dye can be converted to a cationic dye by introduction of one or more cationic sites on the neutral dye (FIG. 17A, B).

Similarly, a neutral dye can be converted to an anionic dye with the addition of base, MOH, wherein M is the anionic counterion (FIG. 18). In another example, a neutral dye can be converted to an anionic dye by introduction of one or more anionic sites on the neutral dye.

For example, an anionic dye can be converted to a cationic dye by introduction of two or more cationic sites on the anionic dye.

For example, an cationic dye can be converted to a anionic dye by introduction of two or more anionic sites on the cationic dye.

SMILES Compounds from Cationic Dyes

In a first aspect, a compound of Formula (I) is provided:

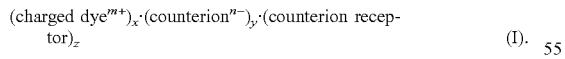

The charged dye$^{m+}$ is a cationic dye, the counterion$^{n-}$ is an anion and the counterion receptor is a binding ligand for the counterion$^{n-}$. The values of m, n, x and y are integers greater than or equal to 1.

In a first respect, compounds of Formula (I) are prepared with naturally cationic dyes or neutral dyes initially converted to cationic dyes or anionic dyes converted to cationic dyes. Accordingly, the charged dye$^{m+}$ of Formula (I) (that is, the cationic dye) can be prepared by one of the following methods. In one method, a neutral dye can be converted to the charged dye$^{m+}$ with the addition of acid HX, where X is the counterion$^{n-}$ in compound of Formula (I). In some preferred embodiments, the preparation of the charged dye$^{m+}$ of Formula (I) by converting a neutral dye to the charged dye$^{m+}$ includes adding an acid HX to the neutral dye, wherein the acid HX is selected from the group consisting of $HPF_6$, $HBF_4$ and $HClO_4$.

In another method, a neutral dye to the charged dye$^{m+}$ by introduction of a cationic site on the neutral dye. In some preferred embodiments, the preparation of the charged dye$^{m+}$ of Formula (I) by converting a neutral dye to the charged dye$^{m+}$ by introduction of a cationic site on the neutral dye comprises alkylating a free base site on the neutral dye with R—Y, where R is an alkyl moiety and Y is the counterion$^{n-}$ in compound of Formula (I). The alkyl moiety R can be any alkyl moiety known in the art. Preferably, the alkyl moiety R can be selected from the group consisting of alkyl (for example, $C_1$-$C_{18}$), alkyl-substituted phenyl derivatives, substituted glycol derivatives, alkenyl, alkoxy, alkyl-NH-alkyl, aryl, cycloalkyl, heteroaryl, heterocycle, haloalkyl, hydrogen, iodo, —$OR^6$, —$N(R^7R^8)$, —$CO_2R^9$, —$C(O)$—$N(R^{10}R^{11})$, wherein $R^6$, $R^7$, $R^8$, $R^9$, $R^{10}$, and $R^{11}$ are each selected from the group consisting of alkenyl, alkyl, alkoxy, alkyl-NH-alkyl, aryl, arylalkyl, cycloalkyl, heteroaryl, heterocycle, haloalkyl, and hydrogen, among others, or a combination thereof.

In another method, an anionic dye can be converted to a cationic dye by adding acid twice or alkylation twice or a combination thereof, such as, by adding acid and alkylation.

In a second respect, the counterion receptor is a heteromacrocycle. In a second respect, the heteromacrocycle is selected from Formulas (II), (III), (IV), (V), (B.1), (B.2), and (B.3):

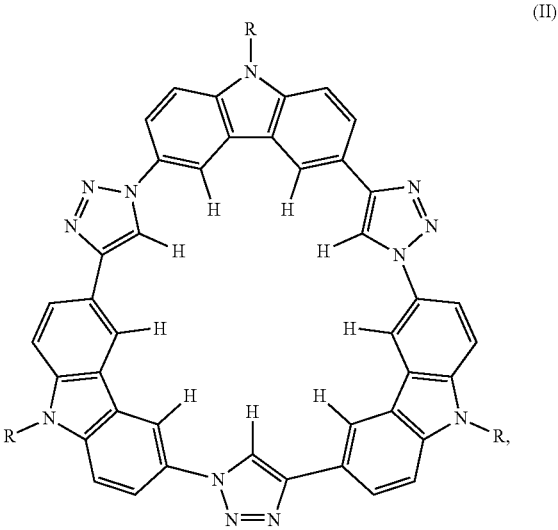

(II)

-continued
(III)
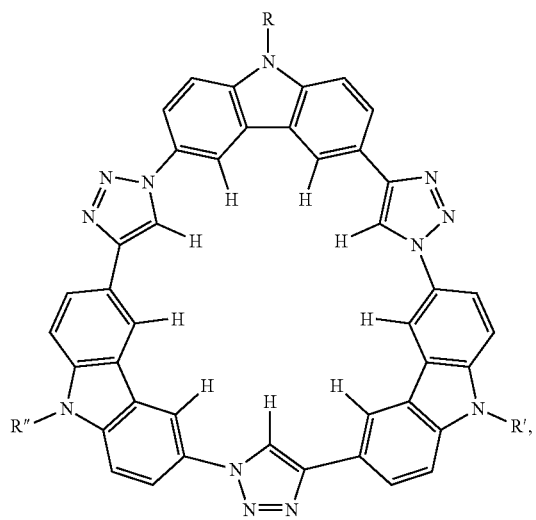
(IV)
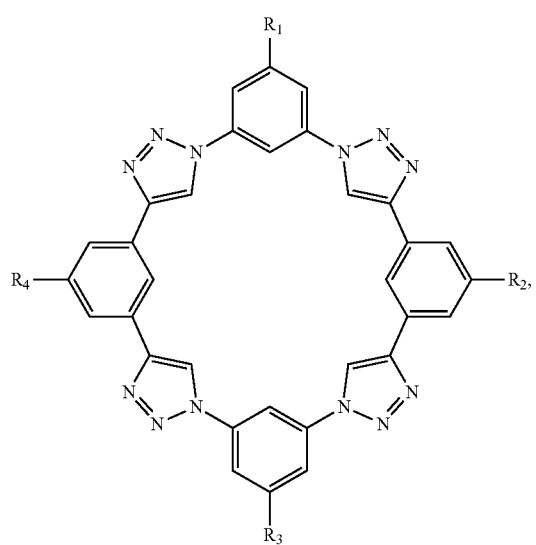
(V)
(B.1)
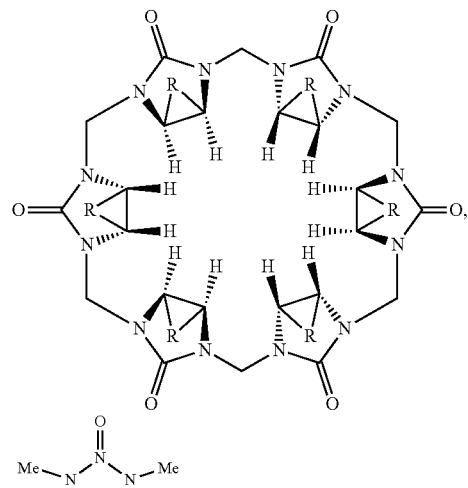
R =
(B.2)
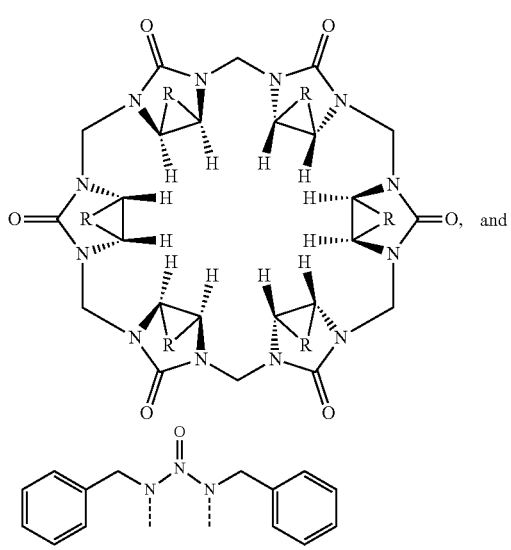
R =
and
(B.3)
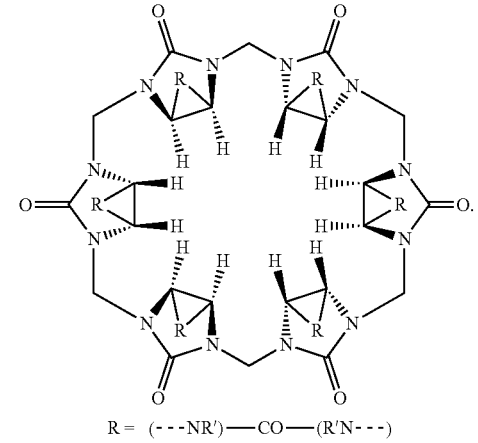
R = (---NR')—CO—(R'N---)
The R of Formula (II), the R, R' and R" of Formula (III), the $R^1$, $R^2$, $R^3$, $R^4$, and $R^5$ of Formula (IV) and the $R_1$, $R_2$, $R_3$ and $R_4$ of Formula (V) are selected from a group consisting of alkyl (for example, $C_1$-$C_{18}$), alkyl-substituted phenyl derivatives, and substituted glycol derivatives, alkenyl, alkoxy, alkyl-NH-alkyl, aryl, cycloalkyl, heteroaryl, heterocycle, haloalkyl, hydrogen, iodo, —$OR^6$, —$N(R^7R^8)$, —$CO_2R^9$, —C(O)—$N(R^{10}R^{11})$, wherein $R^6$, $R^7$, $R^8$, $R^9$, $R^{10}$, and $R^{11}$ are each selected from the group consisting of alkenyl, alkyl, alkoxy, alkyl-NH-alkyl, aryl, arylalkyl, cycloalkyl, heteroaryl, heterocycle, haloalkyl, and hydrogen, among others, or a combination thereof. The R of Formula (II) and the $R^1$, $R^2$, $R^3$, $R^4$, and $R^5$ of Formula (IV) are identical. The R, R' and R" of Formula (III) and the $R_1$, $R_2$, $R_3$ and $R_4$ of Formula (V) can be independently selected from each other. The R' of Formula (B.3) are identical and are selected from a group consisting of alkyl (for example, $C_1$-$C_{18}$), alkyl-substituted phenyl derivatives, alkenyl, alkoxy, aryl, heteroaryl, heterocycle, and substituted forms of alkenyl, alkoxy, aryl, heteroaryl, and heterocycle groups.

With respect to the foregoing respects of the first aspect, the anion can be any anion, provided that the anion can form a chelation complex with the counterion receptor of Formula (I). Preferably, the anion is selected from the group consisting of $BF_4^-$, $ClO_4^-$, $PF_6^-$, $N(SO_2CF_3)_2^-$, $N(SO_2C_2F_5)_2^-$, $CH_3SO_3^-$, $CF_3SO_3^-$, $AsO_4^{3-}$, $HAsO_4^{2-}$, $H_2AsO_4^-$, $AsF_6^-$, $AlCl_4^-$, $PO_4^{3-}$, $HPO_4^{2-}$, $H_2PO_4^-$, $SO_4^{2-}$, $HSO_4^-$, $Cl^-$, $Br^-$, $I^-$, cyanide, $BrO_4^-$, $IO_4^-$, $F^-$, $HF_2^-$, $TcO_4^-$, $RPO_4^{2-}$, $R_2PO_4^-$, $RSO_3^-$, $SCN^-$, $N_3^-$, $I_3^-$, $CO_3^{2-}$, $HCO_3^-$, $P_2O_7^{4-}$, $HP_2O_7^{3-}$, $H_2P_2O_7^{2-}$, $H_3P_2O_7^-$, $RBF_3^-$, wherein R comprises a substituent. Certain anions which are excluded from Formula (I) include anions is selected from the group consisting of F5-TPB⁻; tetrakis[3,5-bis(trifluoromethyl)phenyl]borate; tetrakis[3,5-bis(1,1,1,3,3,3-hexafluoro-2-methoxy-2-propyl)phenyl]borate; $Ar_4B^-$ (where Ar is aryl); TRISPHAT⁻; BINPHAT⁻.

In a further respect, the possibility of partial, full or photoinduced electron transfer between the cationic dye and the counterion receptor compromises retention of the color matched and spectral emission properties of the cationic dye when present in a composition of Formula (I). Without being limited by any particular theory of operation or mechanism of action, it is believed that possible partial or full electron transfer between the cationic dye and the counterion receptor from the resultant composition of Formula (I) when energetically favorable as expected from the Marcus electron transfer theory or the principles of orbital mixing defined by quantum mechanics. An example of such phenomenon is disclosed in Bo Qiao, Brandon E. Hirsch, Semin Lee, Maren Pink, Chun-Hsing Chen, Bo W. Laursen and Amar H. Flood, "Ion-Pair Oligomerization of Chromogenic Triangulenium Cations with Cyanostar-Modified Anions That Controls Emission in Hierarchical Materials," *J. Am. Chem. Soc.* 2017, 139:6226-6233, the contents of which are hereby incorporated herein by reference in its entirety. In this case, partial or full electron transfer is believed to occur between the highest occupied molecular orbital on the cationic dye and the highest occupied molecular orbital on the counterion receptor. Accordingly, in a third respect, the cationic dye of compound of Formula (I) includes a cationic dye having a light-absorbing unit or a cationic dye having both a light-absorbing unit and a light emissive unit.

In a fourth respect, the compound of Formula (I) includes a cationic dye is selected from a group of dye classes consisting of cationic styryls, cationic xanthenes, cationic trianguleniums, cationic oxazines, triarylmethanes, cationic cyanines, cationic acridines, cationic fluoronones, cationic phenanthridines, cationic polyaromatic hydrocarbons, cationic imides, cationic BODIPYs, cationic coumarins, and cationic squaraines, or a combination thereof. Exemplary cationic dyes include those having the following structures:

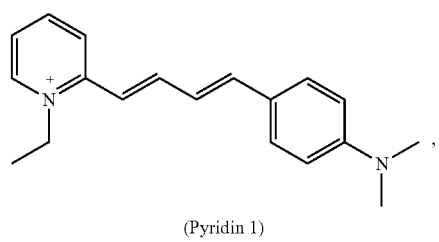

(Pyridin 1)

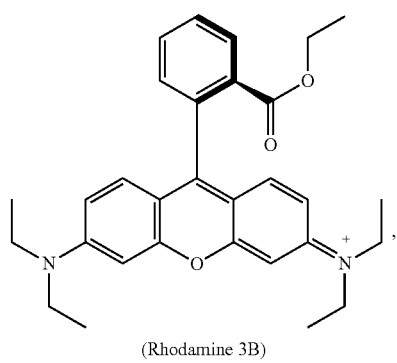

(Rhodamine 3B)

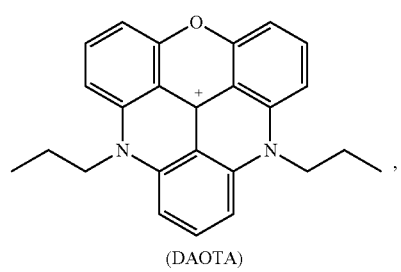

(DAOTA)

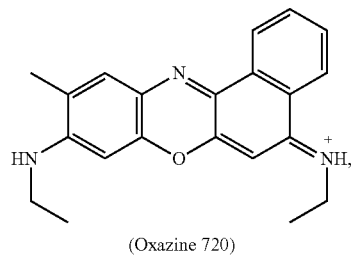

(Oxazine 720)

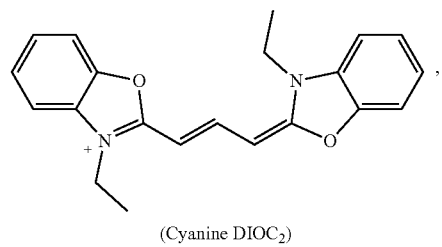

(Cyanine $DIOC_2$)

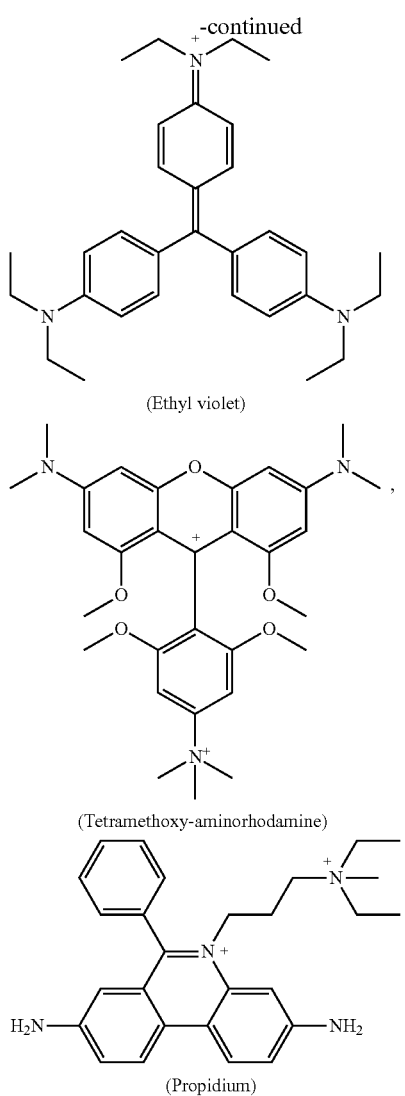
(Ethyl violet)
(Tetramethoxy-aminorhodamine)
(Propidium), and
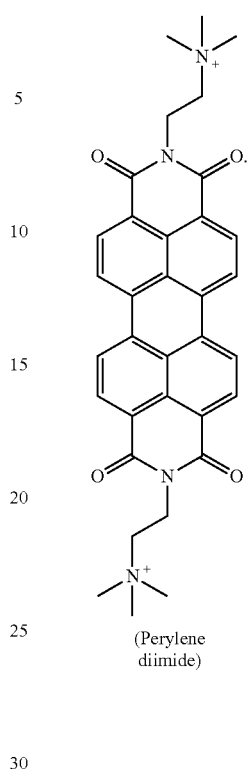
(Perylene diimide)
According yet additional respects, compounds of Formula (I) can be selected from the group consisting of Formula (I-1), Formula (I-2), Formula (I-3), Formula (I-4), Formula (I-5), Formula (I-6), Formula (I-7), Formula (I-8), Formula (I-9), Formula (I-10), Formula (I-11), Formula (I-12), Formula (I-13) and Formula (I-14):
Formula (I-1)
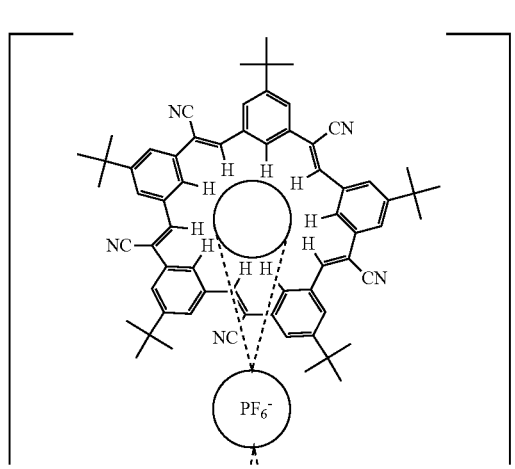
(I-1)
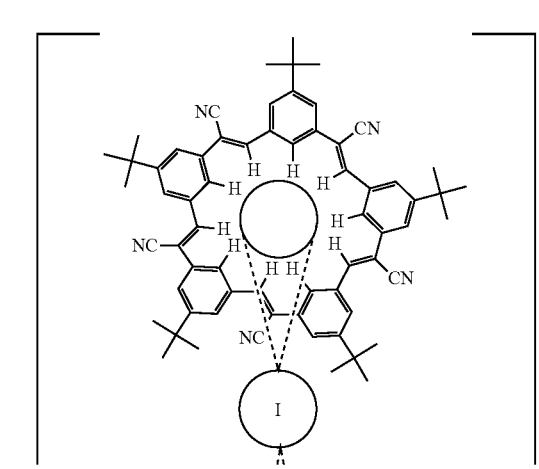
(I-2)

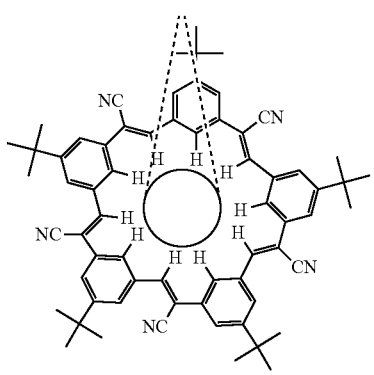
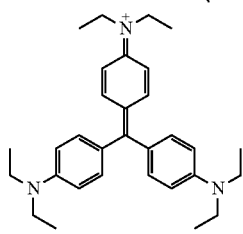
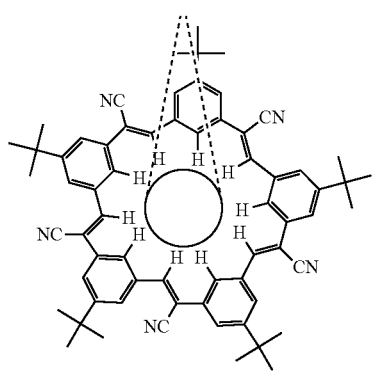
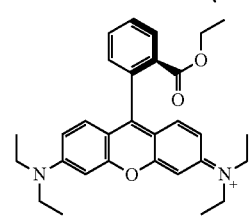
(I-3)
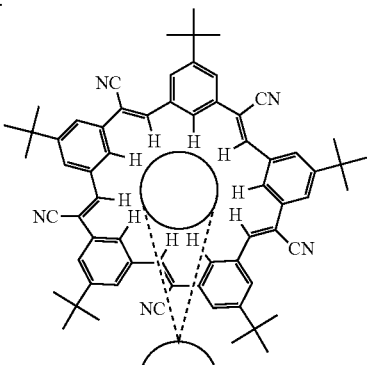
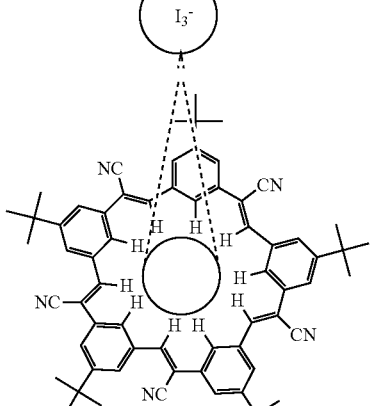
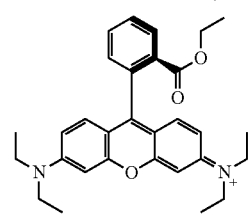
(I-4)
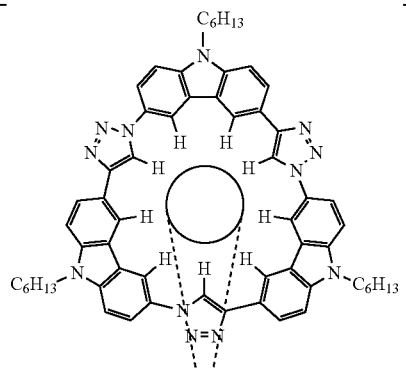
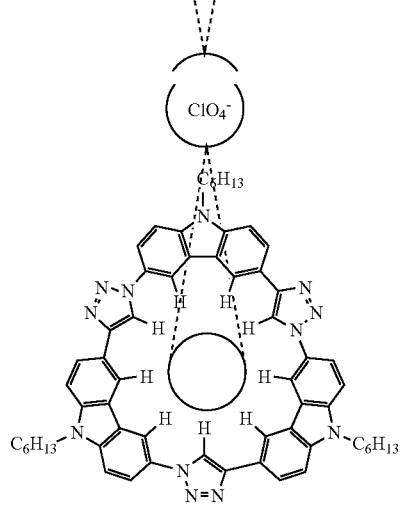
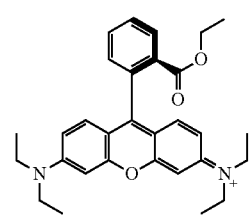

-continued
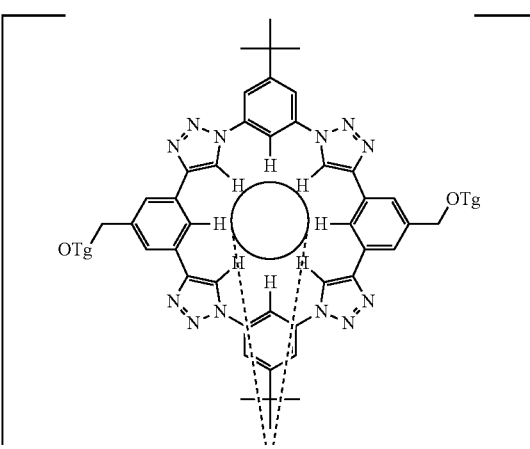
(I-5)
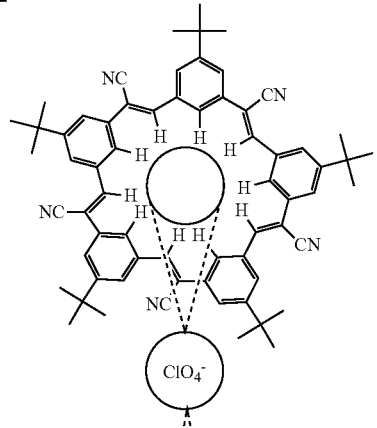
(I-6)
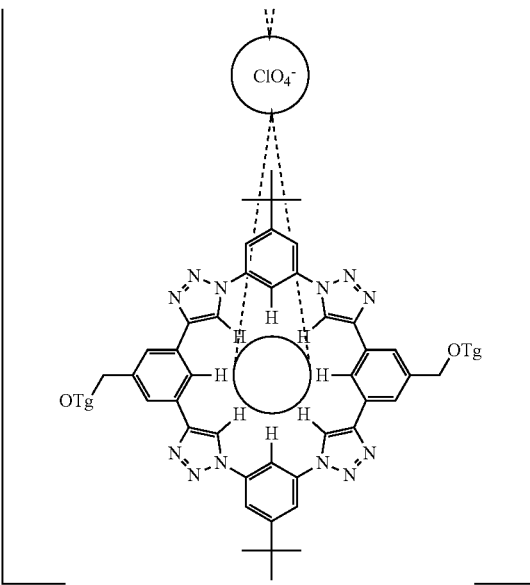
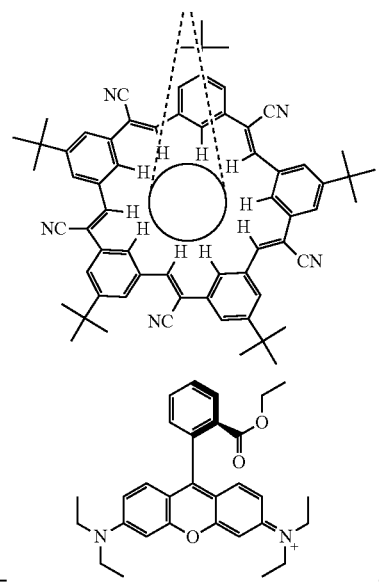
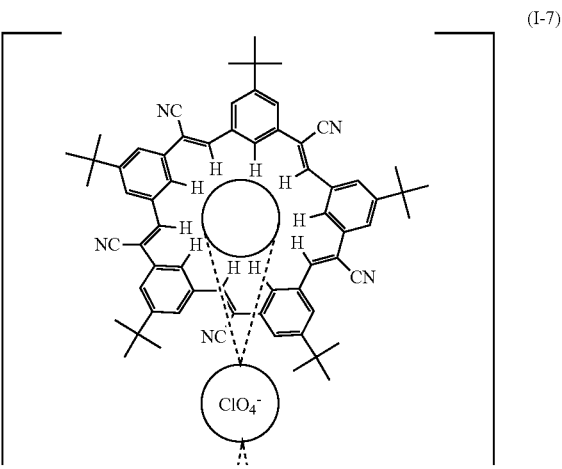
(I-7)
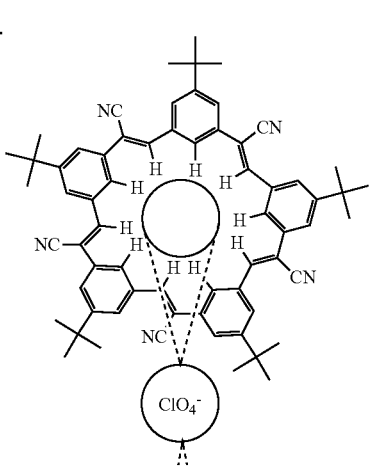
(I-8)

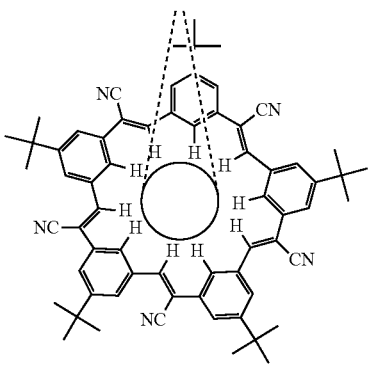
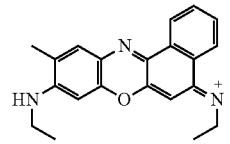
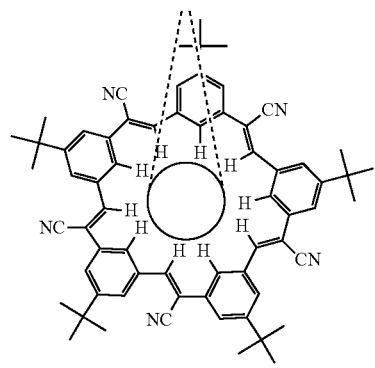
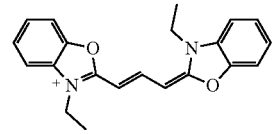
(I-9)
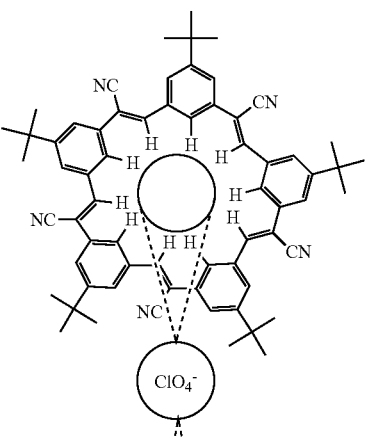
(I-10)
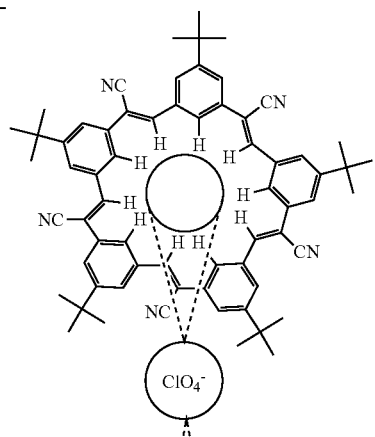
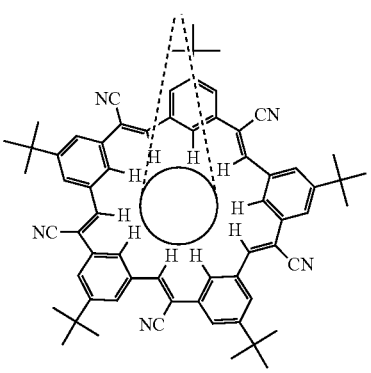
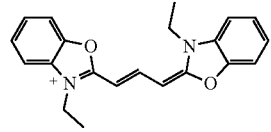
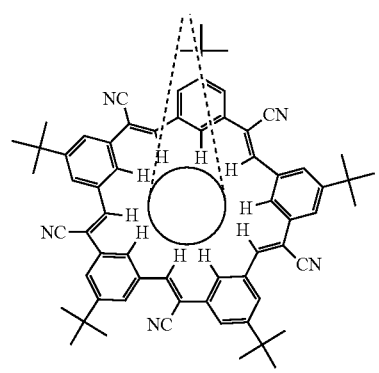
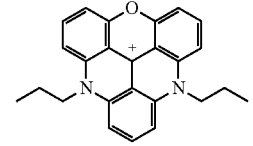

-continued
(I-11)
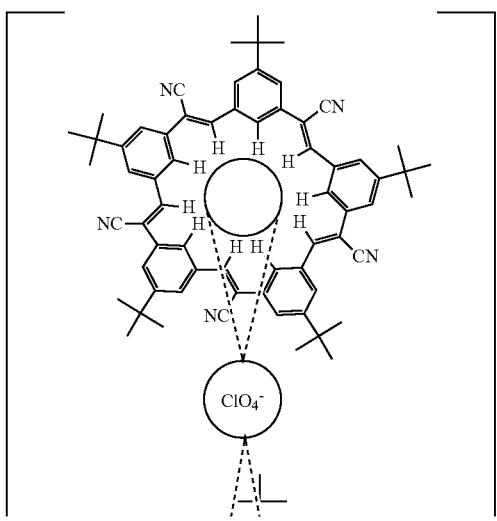
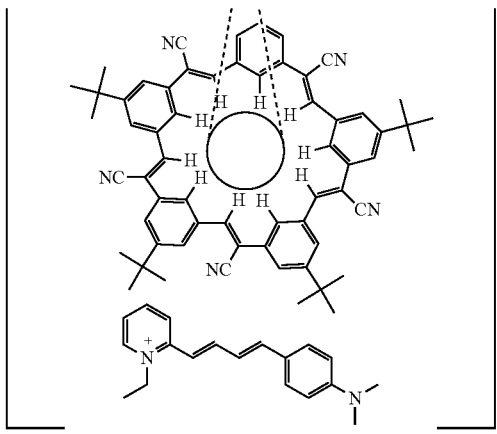
(I-12)
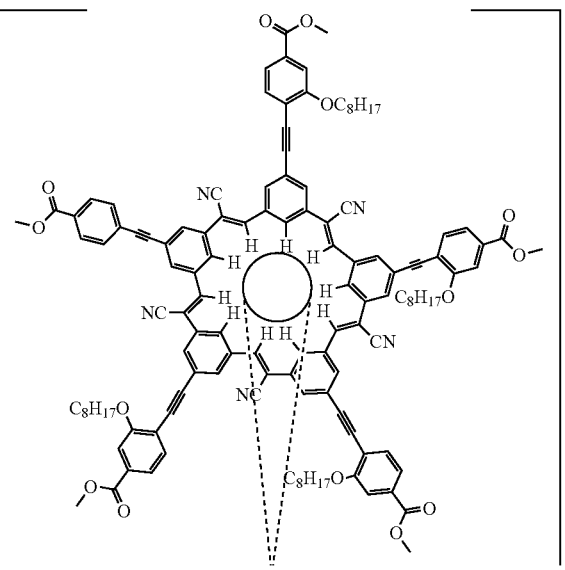
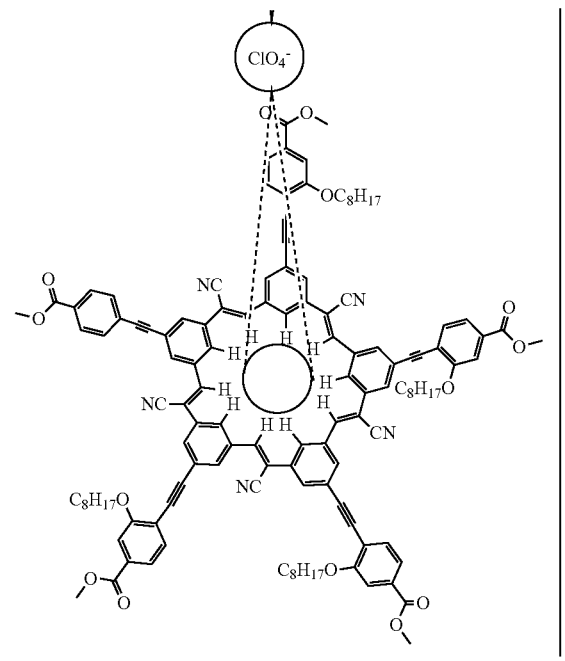
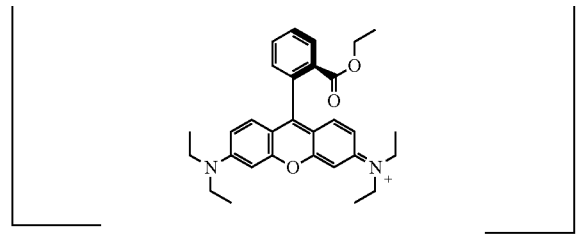

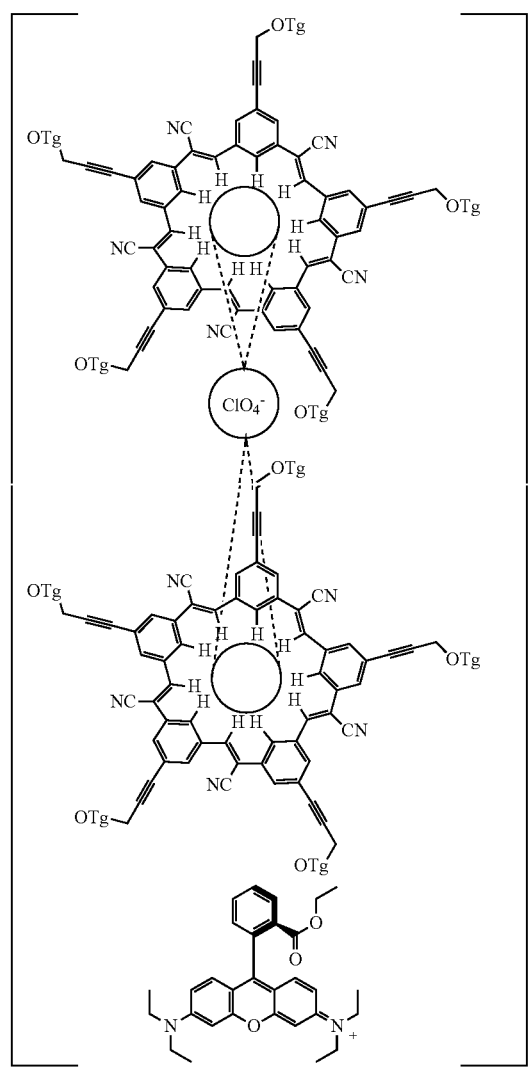
(I-13)
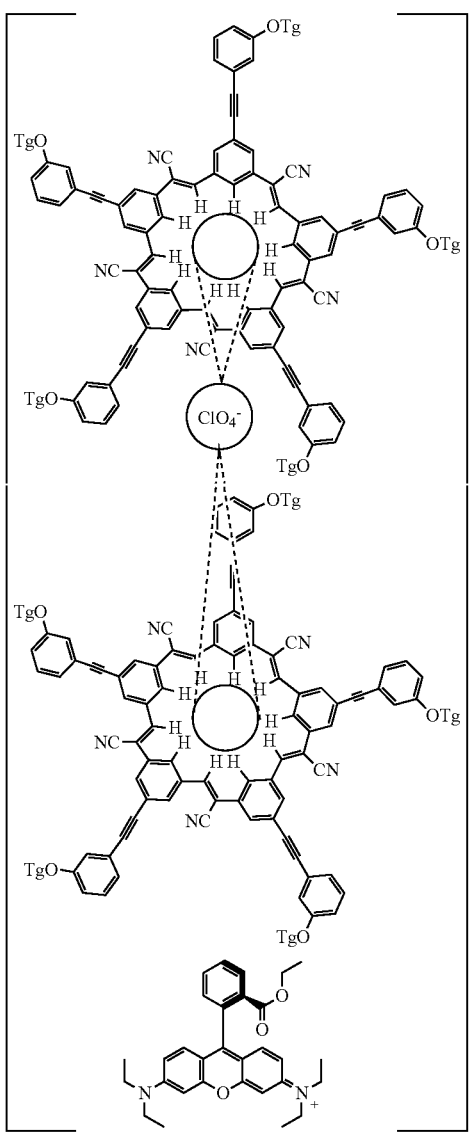
(I-14)
, and
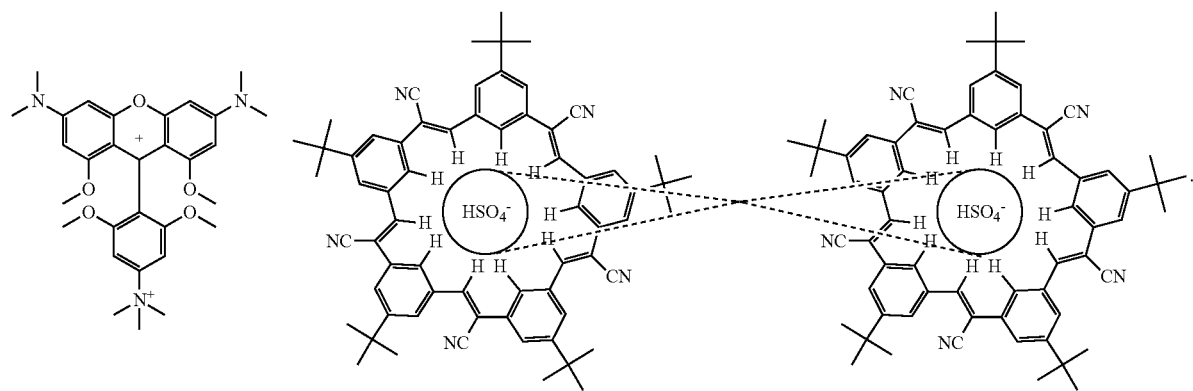
(I-15)

Smiles Formulations of Cationic Dyes

In a second aspect, a formulation is provided. The formulation includes a compound of Formula (I):

(charged dye$^{m+}$)$_x$·(counterion$^{n-}$)$_y$·(counterion receptor)$_z$  (I).

The charged dye$^{m+}$ is a cationic dye, the counterion$^{n-}$ is an anion and the counterion receptor is a binding ligand for the counterion$^{n-}$. The values of m, n, x and y are integers greater than or equal to 1, and products of x·n and m·y are identical.

In a first respect, the counterion receptor is a heteromacrocycle. In a second respect, the heteromacrocycle is selected from Formulas (II), (III), (IV), (V), (B.1), (B.2), and (B.3):

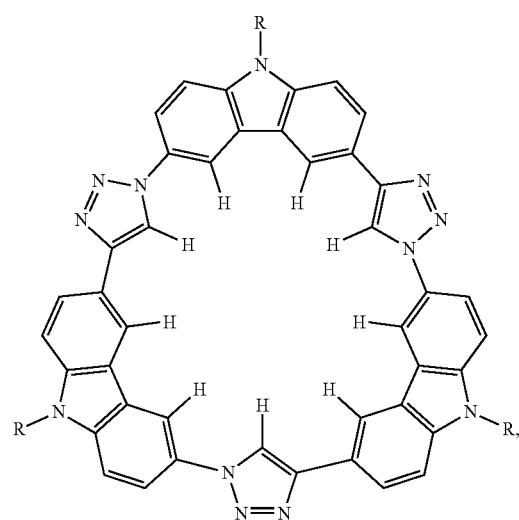

(II)

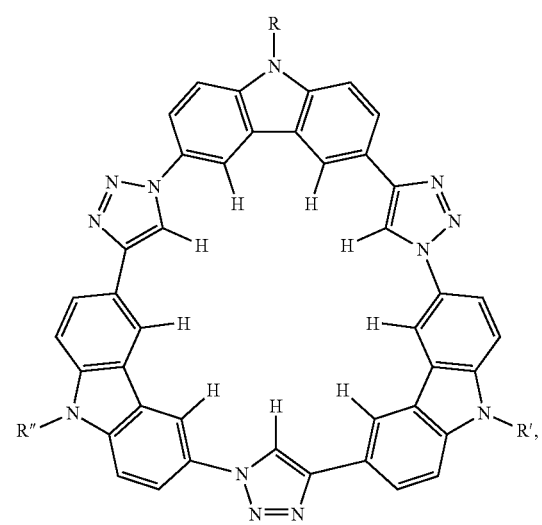

(III)

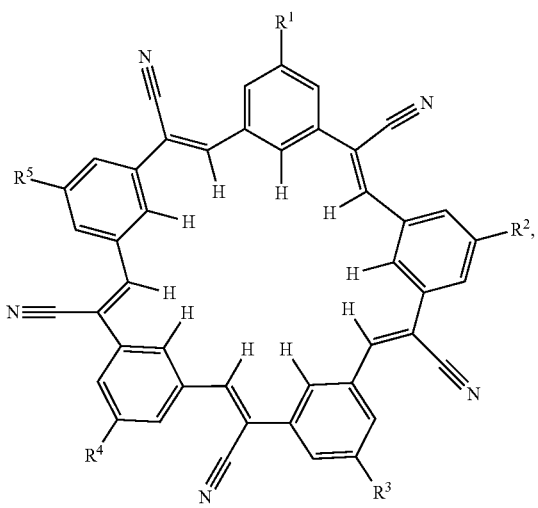

(IV)

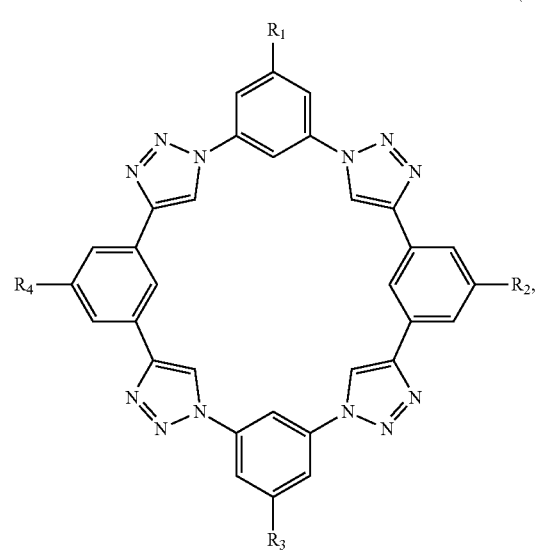

(V)

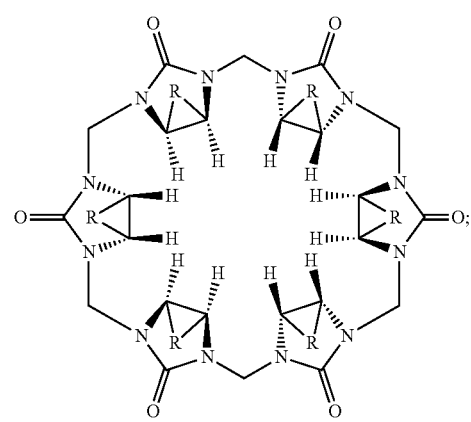

(B.1)

-continued

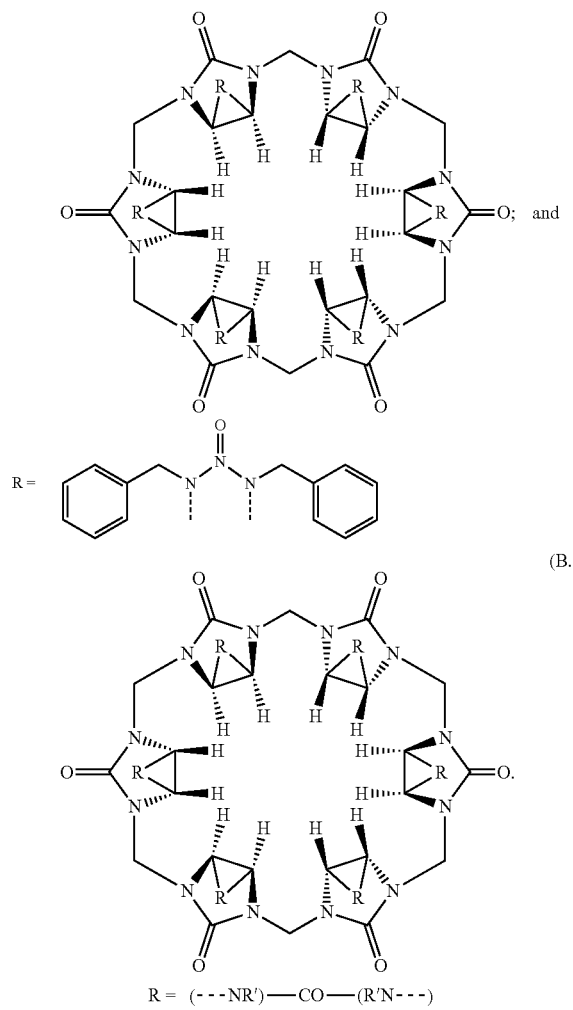

(B.2)

(B.3)

or a combination thereof.

The R of Formula (II), the R, R' and R" of Formula (III), the $R^1$, $R^2$, $R^3$, $R^4$, and $R^5$ of Formula (IV) and the $R_1$, $R_2$, $R_3$ and $R_4$ of Formula (V) are selected from a group consisting of alkyl (for example, $C_1$-$C_{18}$), alkyl-substituted phenyl derivatives, and substituted glycol derivatives, alkenyl, alkoxy, alkyl-NH-alkyl, aryl, cycloalkyl, heteroaryl, heterocycle, haloalkyl, hydrogen, iodo, —$OR^6$, —$N(R^7R^8)$, —$CO_2R^9$, —$C(O)$—$N(R^{10}R^{11})$, wherein $R^6$, $R^7$, $R^8$, $R^9$, $R^{10}$, and $R^{11}$ are each selected from the group consisting of alkenyl, alkyl, alkoxy, alkyl-NH-alkyl, aryl, arylalkyl, cycloalkyl, heteroaryl, heterocycle, haloalkyl, and hydrogen, among others, or a combination thereof. The R of Formula (II) and the $R^1$, $R^2$, $R^3$, $R^4$, and $R^5$ of Formula (IV) are identical. The R, R' and R" of Formula (III) and the $R_1$, $R_2$, $R_3$ and $R_4$ of Formula (V) can be independently selected from each other. The R' of Formula (B.3) are identical and are selected from a group consisting of alkyl (for example, $C_1$-$C_{18}$), alkyl-substituted phenyl derivatives, alkenyl, alkoxy, aryl, heteroaryl, heterocycle, and substituted forms of alkenyl, alkoxy, aryl, heteroaryl, and heterocycle groups.

In a third respect of the formulation, the preferred anion is selected from the group consisting of $BF_4^-$, $ClO_4^-$, $PF_6^-$, $N(SO_2CF_3)_2^-$, $N(SO_2C_2F_5)_2^-$, $CH_3SO_3^-$, $CF_3SO_3^-$, $AsO_4^{3-}$, $HAsO_4^{2-}$, $H_2AsO_4^-$, $AsF_6^-$, $AlCl_4^-$, $PO_4^{3-}$, $HPO_4^{2-}$, $H_2PO_4^-$, $SO_4^{2-}$, $HSO_4^-$, $Cl^-$, $Br^-$, $I^-$, cyanide, $BrO_4^-$, $IO_4^-$, $F^-$, $HF_2^-$, $TcO_4^-$, $RPO_4^{2-}$, $R_2PO_4^-$, $RSO_3^-$, $SCN^-$, $N_3^-$, $I_3^-$, $CO_3^{2-}$, $HCO_3^-$, $P_2O_7^{4-}$, $HP_2O_7^{3-}$, $H_2P_2O_7^{2-}$, $H_3P_2O_7^-$, $RBF_3^-$, wherein R comprises a substituent. Certain anions which are excluded from Formula (I) include anions is selected from the group consisting of F5-TPB$^-$; tetrakis[3,5-bis(trifluoromethyl)phenyl]borate; tetrakis[3,5-bis(1,1,1,3,3,3-hexafluoro-2-methoxy-2-propyl)phenyl]borate; $Ar_4B^-$ (where Ar is aryl); TRISPHAT$^-$; BINPHAT$^-$. In another respect of the formulation, partial, full or photoinduced electron transfer between the cationic dye$^{m+}$ and the counterion receptor does not occur according to the rules governed by Marcus theory and quantum theory. According yet additional respects of the formulation, formulations can include Formula (I) selected from the group consisting of Formula (I-1), Formula (I-2), Formula (I-3), Formula (I-4), Formula (I-5), Formula (I-6), Formula (I-7), Formula (I-8), Formula (I-9), Formula (I-10), Formula (I-11), Formula (I-12), Formula (I-13), Formula (I-14) and Formula (I-15):

Formula (I-1)

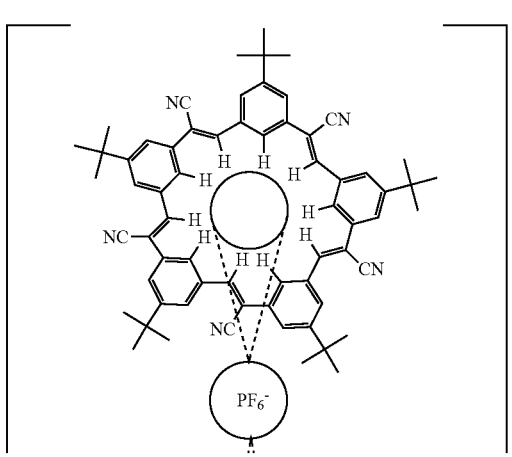

(I-1)

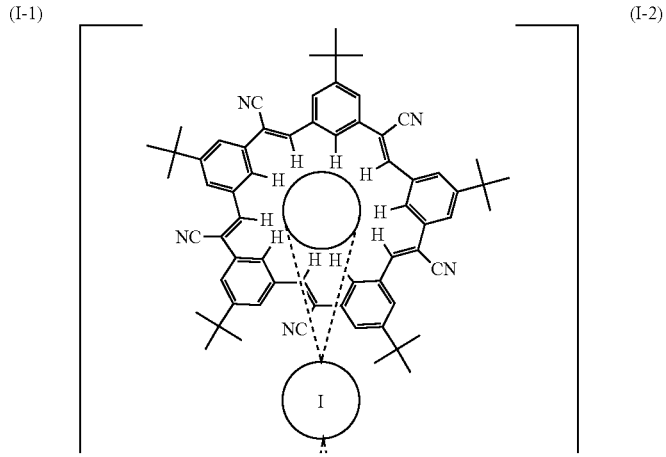

(I-2)

-continued
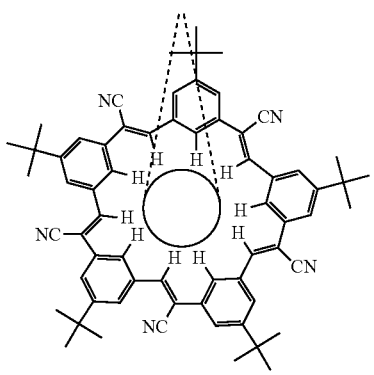
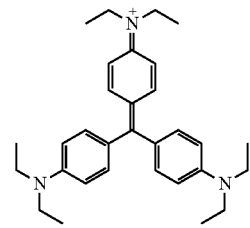
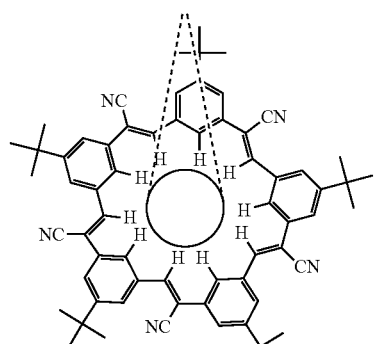
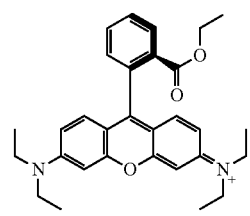
(I-3)
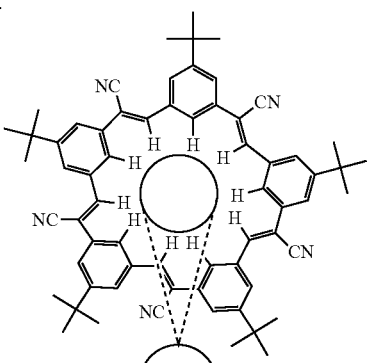
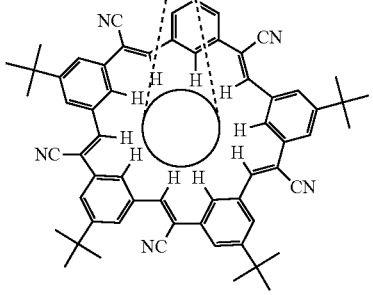
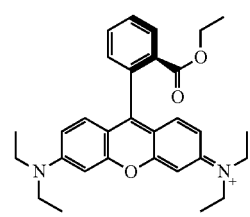
(I-4)
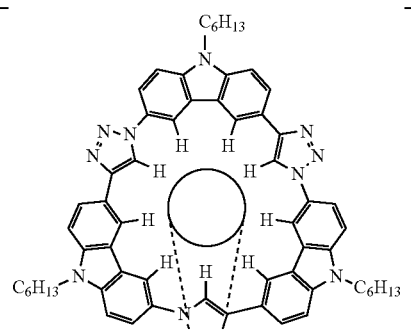
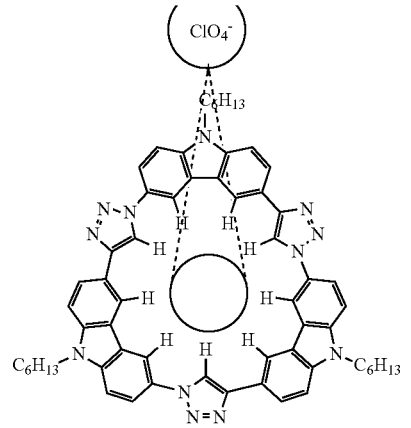
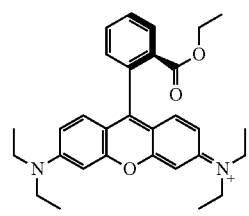

-continued
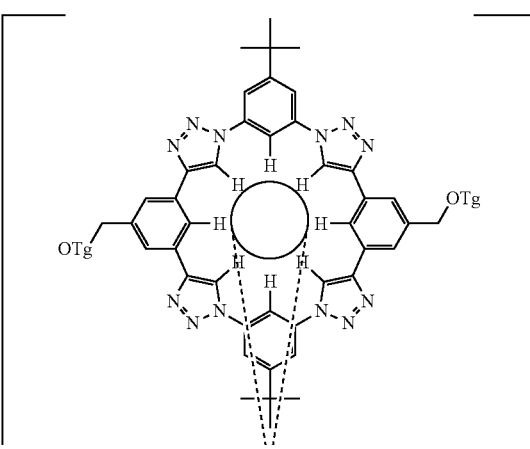
(I-5)
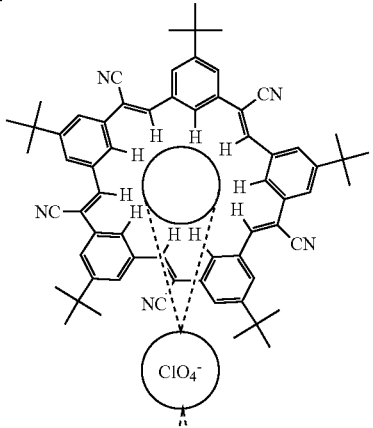
(I-6)
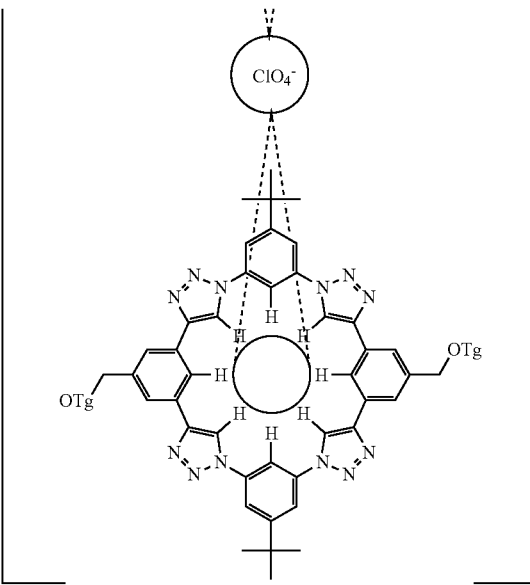
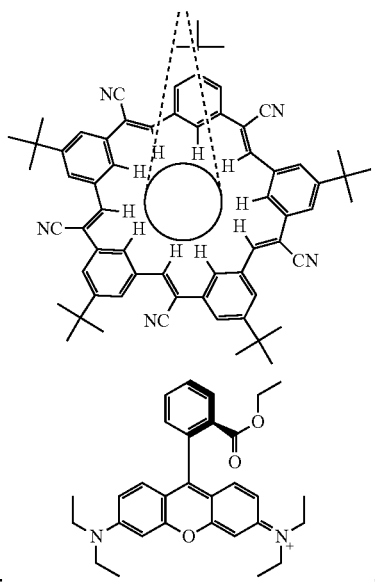
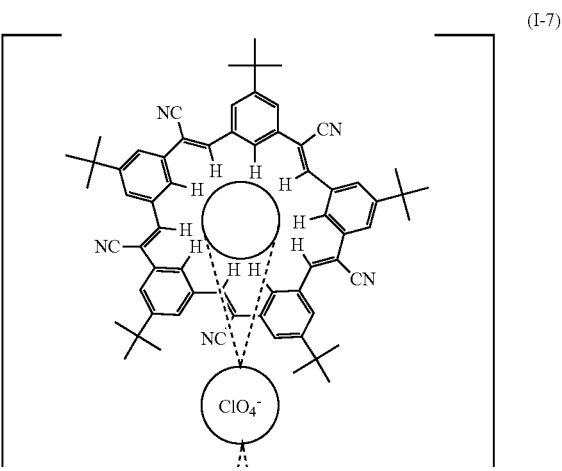
(I-7)
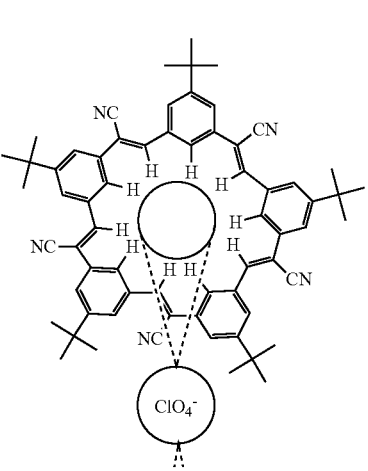
(I-8)

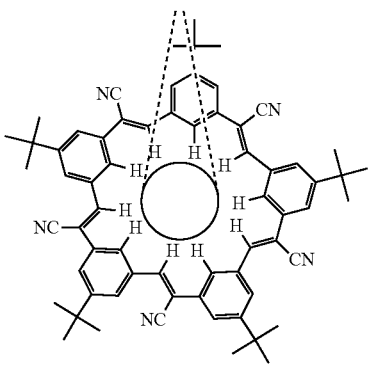
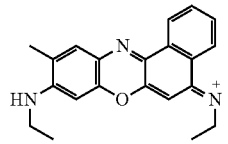
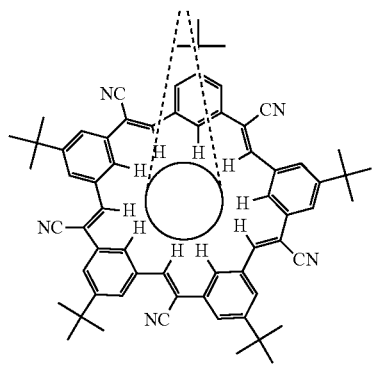
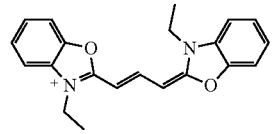
(I-9)
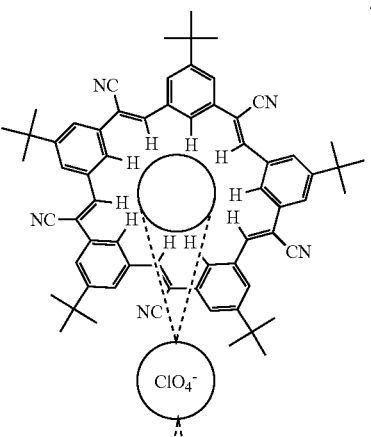
(I-10)
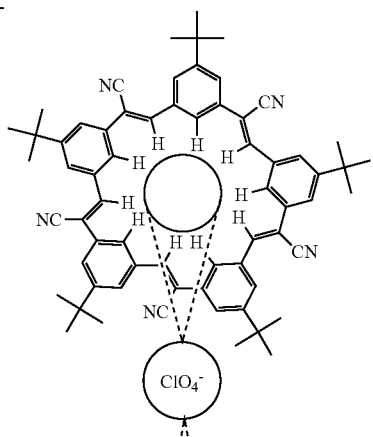
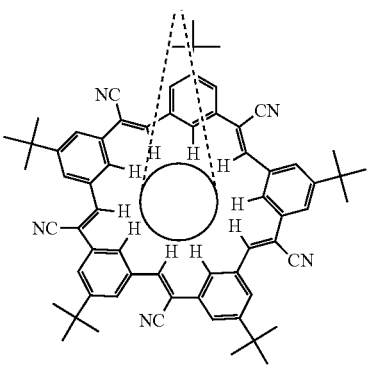
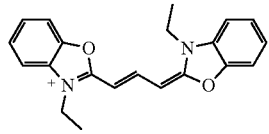
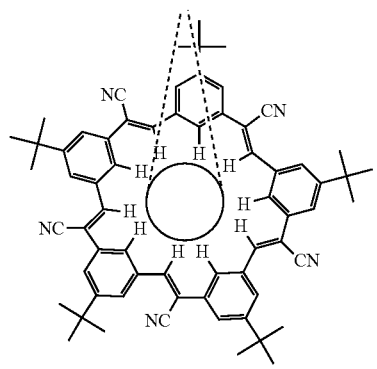
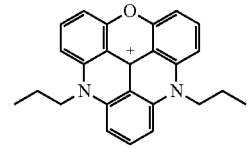

-continued
(I-11)
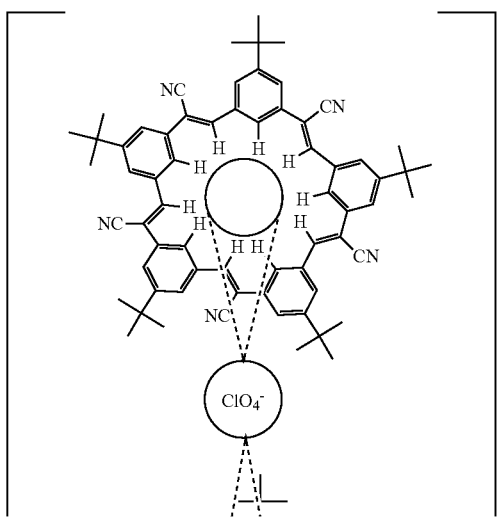
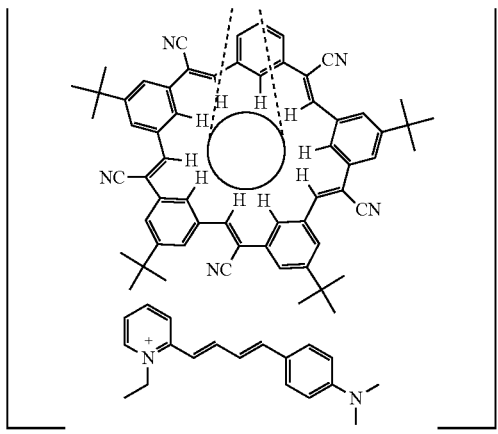
(I-12)
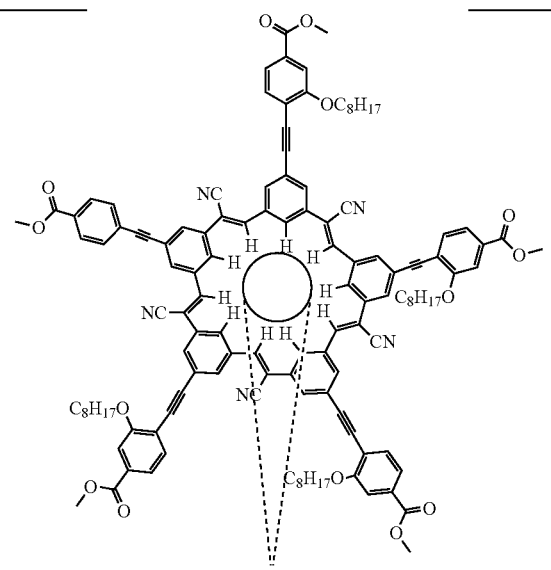
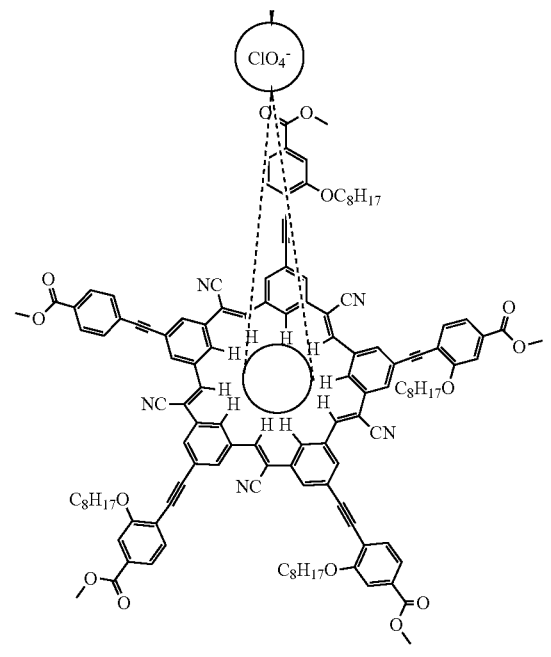
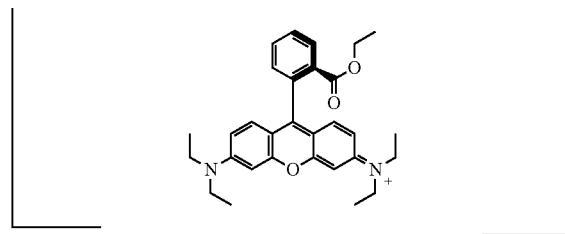

-continued

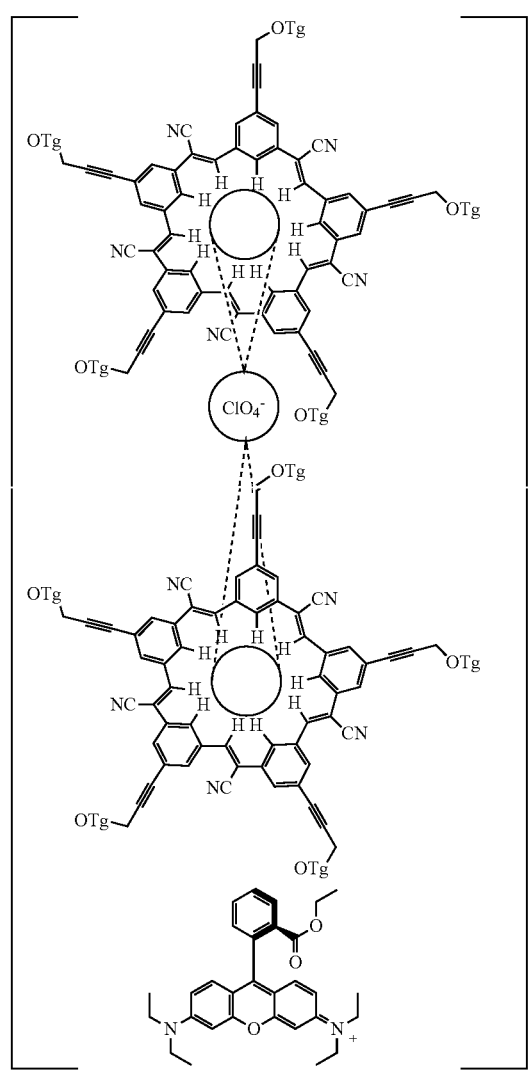

(I-13)

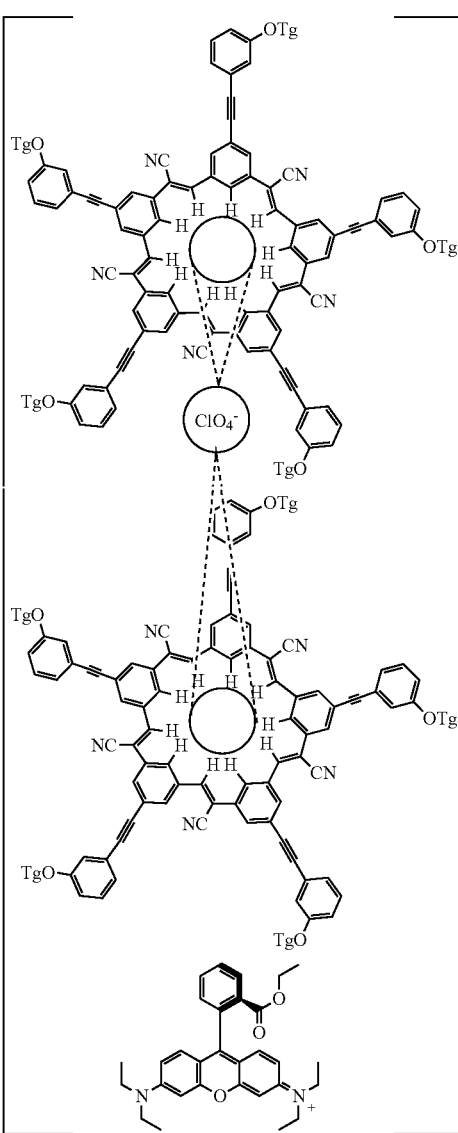

(I-14), and

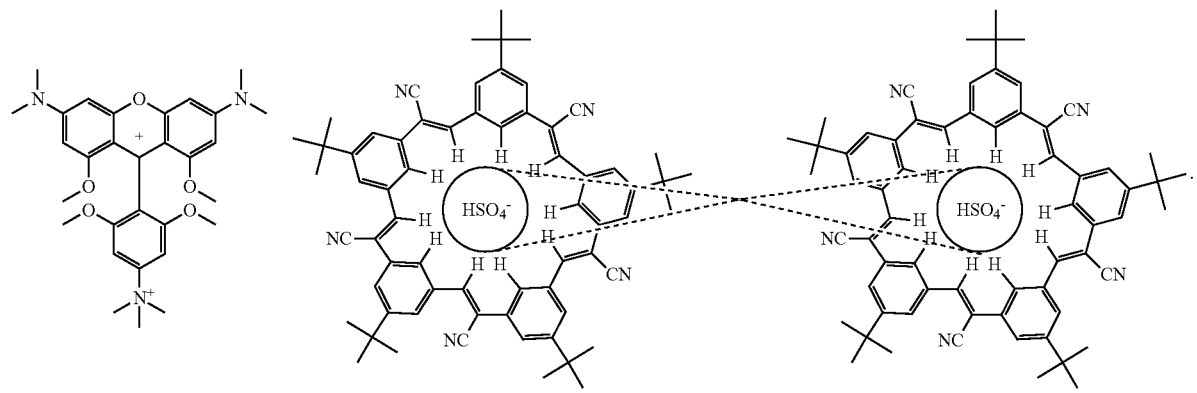

(I-15)

Yet according to further respects of the formulation, the cationic dye$^{m+}$ absorbs light at a wavelength longer than the absorption wavelength of a complex formed between the counterion$^{n-}$ and the counterion receptor. Yet according to further respects of the formulation, the cationic dye$^{m+}$ emits light at a wavelength longer than the absorption wavelength of a complex formed between the counterion$^{n-}$ and the counterion receptor. Yet according to further respects of the formulation, the compound of Formula (I) comprises an emissive unit. Yet according to further respects of the formulation, formulation comprises a solid state material. In this regard, solid state material is preferably selected from the group consisting of a powder, amorphous solid, thin films, crystals, microparticles, polymer composites, nanoparticles, and colloid of microparticles and nanoparticles. Additionally, and in accordance with the formulation, the formulation is prepared from a solution including a solvent of low polarity.

Preparation of SMILES Materials of Cationic Dyes

The SMILES materials can be easily prepared by mixing the correct ratio of cationic dye and counterion anion with the counterion receptor and generating the material in a solid state form.

Accordingly, in a third aspect, a method of producing a material having bright emission properties is provided. The method includes the following steps. A first step includes mixing a solution of cationic dye and counter anion with an anion receptor to form a first mixture that includes a compound of Formula (I):

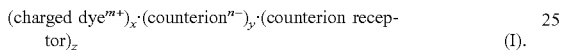

(I)

The charged dye$^{m+}$ is a cationic dye, the counterion$^{n-}$ is an anion and the counterion receptor is a binding ligand for the counterion$^{n-}$. The values of m, n, x and y are integers greater than or equal to 1, and products of x·n and m·y are identical. A second step is condensing the first mixture to form a material having an emissive unit in a solid state.

In a first respect, the counterion receptor is a heteromacrocycle. In a second respect, the heteromacrocycle is selected from Formulas (II), (III), (IV), (V), (B.1), (B.2), and (B.3):

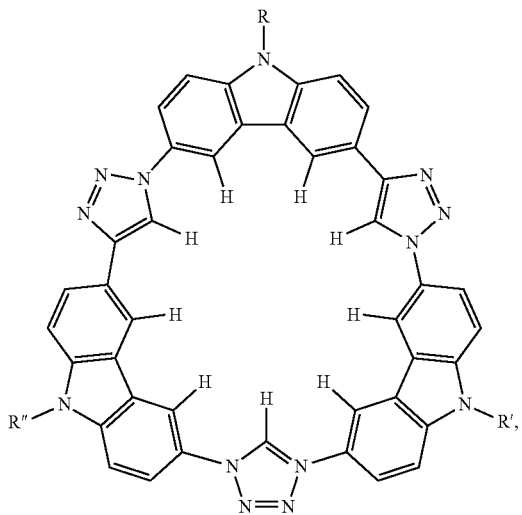

(III)

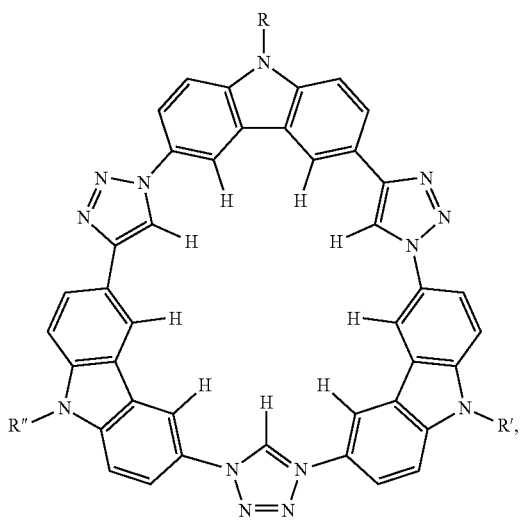

(IV)

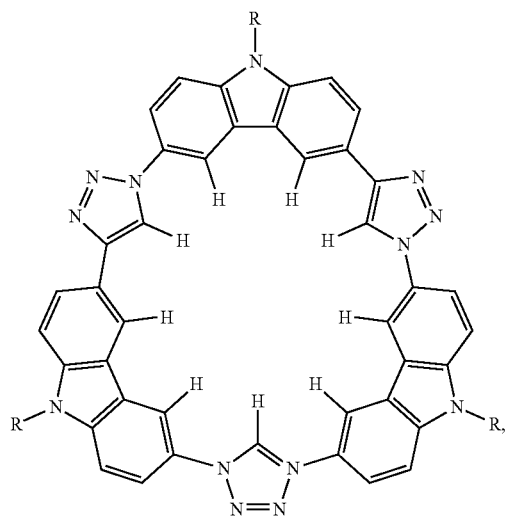

(II)

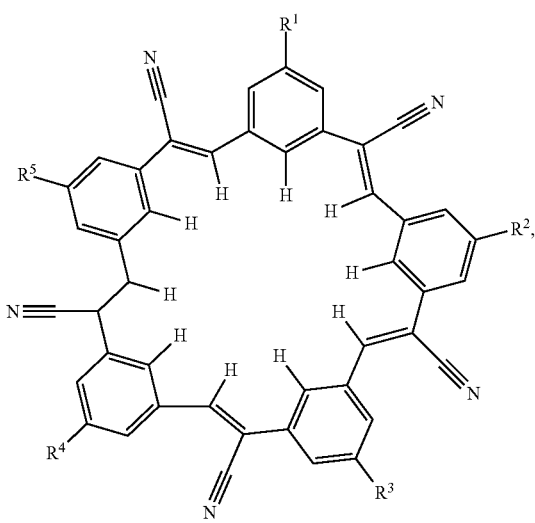

(V)

(B.1)

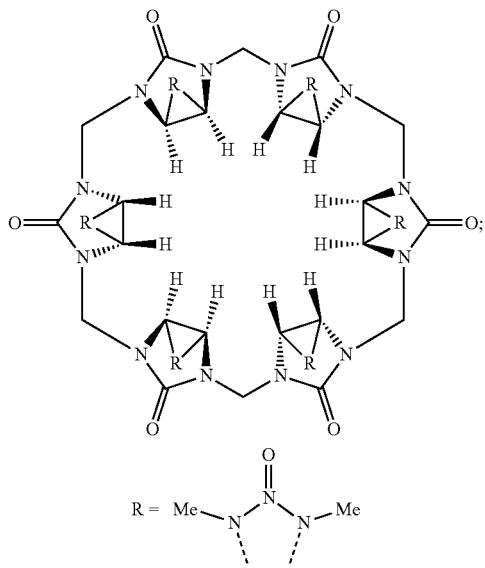

R = Me—N(—N(=O)—N)—Me (B.2)

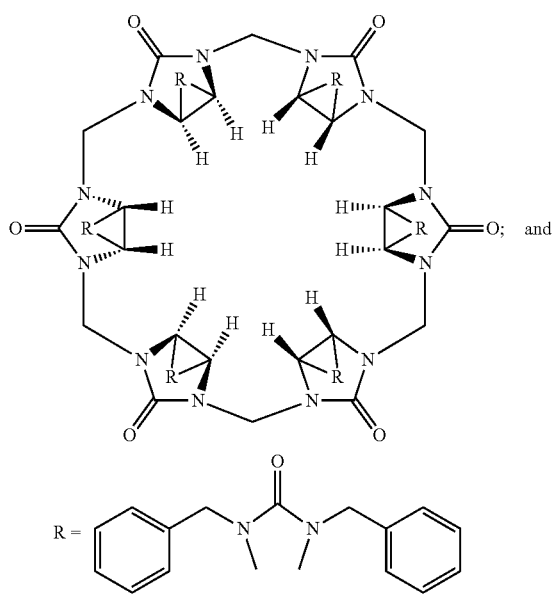

R = PhCH₂—N(—CO—N)—CH₂Ph (B.3)

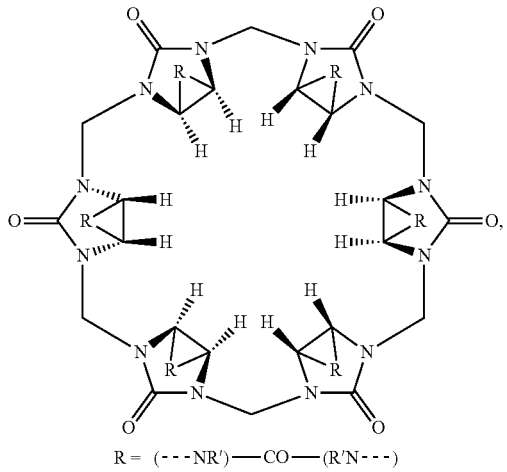

R = (---NR')—CO—(R'N---)

or a combination thereof.

The R of Formula (II), the R, R' and R" of Formula (III), the $R^1$, $R^2$, $R^3$, $R^4$, and $R^5$ of Formula (IV) and the $R_1$, $R_2$, $R_3$ and $R_4$ of Formula (V) are selected from a group consisting of alkyl (for example, $C_1$-$C_{18}$), alkyl-substituted phenyl derivatives, and substituted glycol derivatives, alkenyl, alkoxy, alkyl-NH-alkyl, aryl, cycloalkyl, heteroaryl, heterocycle, haloalkyl, hydrogen, iodo, —$OR^6$, —$N(R^7R^8)$, —$CO_2R^9$, —C(O)—$N(R^{10}R^{11})$, wherein $R^6$, $R^7$, $R^8$, $R^9$, $R^{10}$, and $R^{11}$ are each selected from the group consisting of alkenyl, alkyl, alkoxy, alkyl-NH-alkyl, aryl, arylalkyl, cycloalkyl, heteroaryl, heterocycle, haloalkyl, and hydrogen, among others, or a combination thereof. The R of Formula (II) and the $R^1$, $R^2$, $R^3$, $R^4$, and $R^5$ of Formula (IV) are identical. The R, R' and R" of Formula (III) and the $R_1$, $R_2$, $R_3$ and $R_4$ of Formula (V) can be independently selected from each other. The R' of Formula (B.3) are identical and are selected from a group consisting of alkyl (for example, $C_1$-$C_{18}$), alkyl-substituted phenyl derivatives, alkenyl, alkoxy, aryl, heteroaryl, heterocycle, and substituted forms of alkenyl, alkoxy, aryl, heteroaryl, and heterocycle groups.

In a third respect of the method, the preferred anion is selected from the group consisting of $BF_4^-$, $ClO_4^-$, $PF_6^-$, $N(SO_2CF_3)_2^-$, $N(SO_2C_2F_5)_2^-$, $CH_3SO_3^-$, $CF_3SO_3^-$, $AsO_4^{3-}$, $HAsO_4^{2-}$, $H_2AsO_4^-$, $AsF_6^-$, $AlCl_4^-$, $PO_4^{3-}$, $HPO_4^{2-}$, $H_2PO_4^-$, $SO_4^{2-}$, $HSO_4^-$, $Cl^-$, $Br^-$, $I^-$, cyanide, $BrO_4^-$, $IO_4^-$, $F^-$, $HF_2^-$, $TcO_4^-$, $RPO_4^{2-}$, $R_2PO_4^-$, $RSO_3^-$, $SCN^-$, $N_3^-$, $I_3^-$, $CO_3^{2-}$, $HCO_3^-$, $P_2O_7^{4-}$, $HP_2O_7^{3-}$, $H_2P_2O_7^{2-}$, $H_3P_2O_7^-$, $RBF_3^-$, wherein R comprises a substituent. Certain anions which are excluded from Formula (I) include anions is selected from the group consisting of F5-TPB⁻; tetrakis[3,5-bis(trifluoromethyl)phenyl]borate; tetrakis[3,5-bis(1,1,1,3,3,3-hexafluoro-2-methoxy-2-propyl)phenyl]borate; $Ar_4B^-$ (where Ar is aryl); TRISPHAT⁻; BINPHAT⁻. In another respect of the formulation, partial, full or photoinduced electron transfer between the cationic $dye^{m+}$ and the counterion receptor does not occur according to the rules governed by Marcus theory and quantum theory. According yet additional respects of the method, formulations can include Formula (I) selected from the group consisting of Formula (I-1), Formula (I-2), Formula (I-3), Formula (I-4), Formula (I-5), Formula (I-6), Formula (I-7), Formula (I-8), Formula (I-9), Formula (I-10), Formula (I-11), Formula (I-12), Formula (I-13), Formula (I-14) and Formula (I-15):

Formula (I-1)
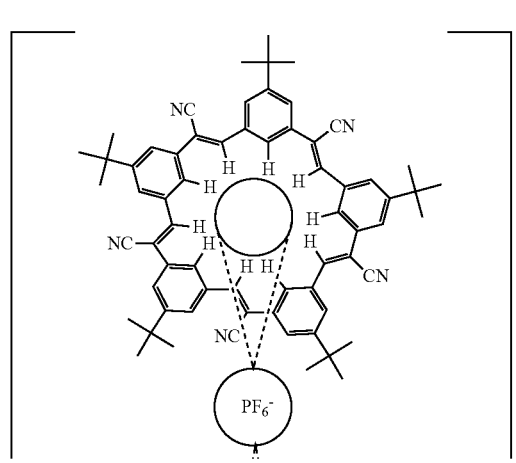
(I-1)
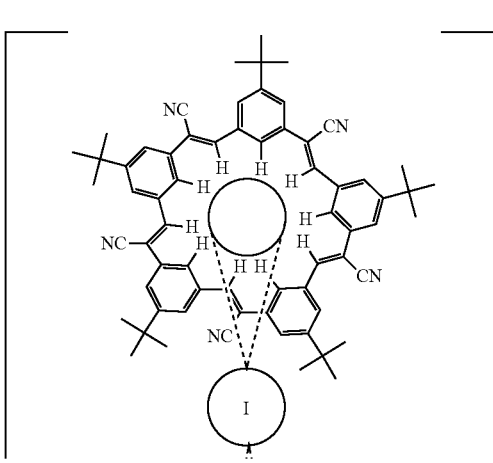
(I-2)
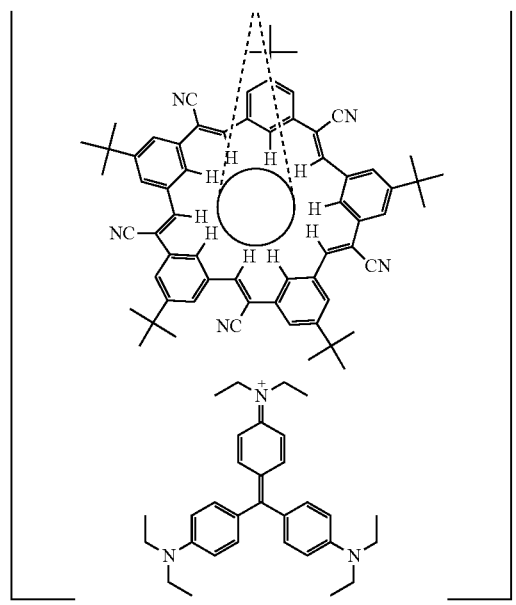
,
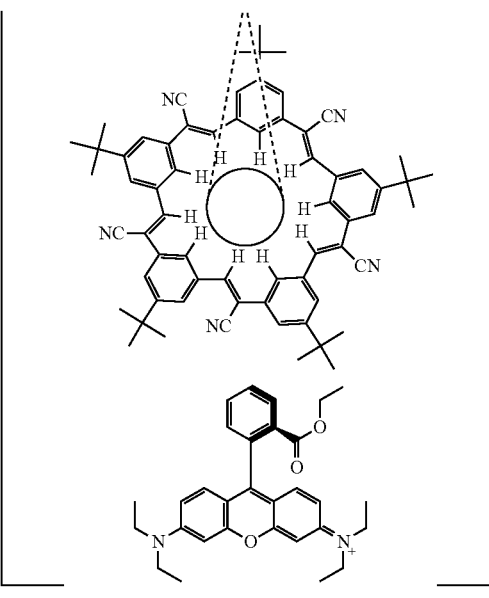
,

-continued
(I-3)
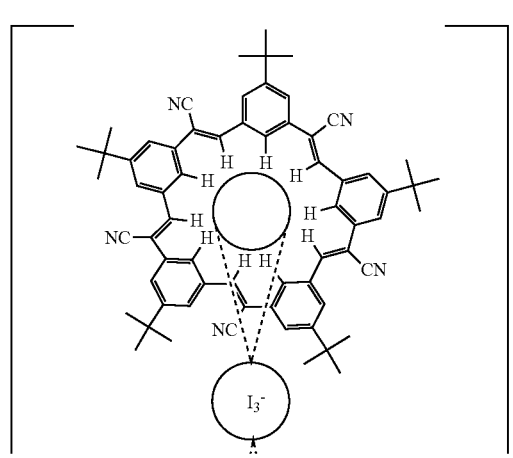
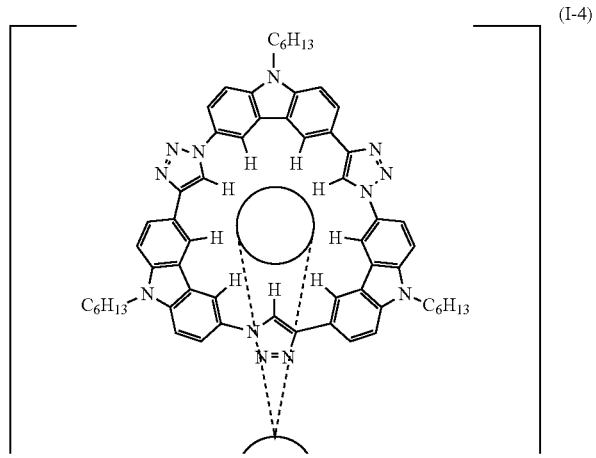
(I-4)
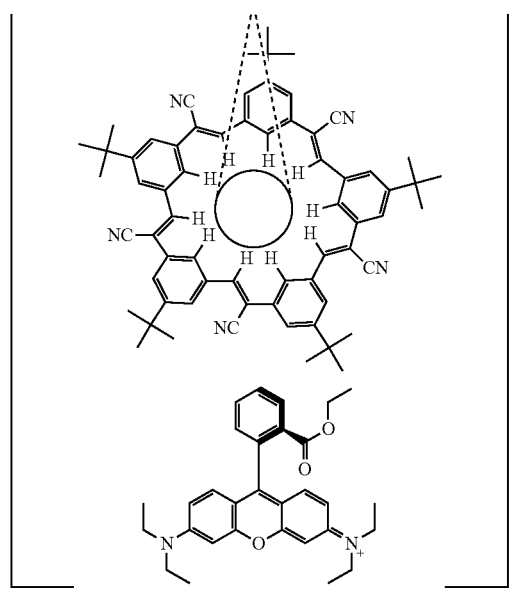
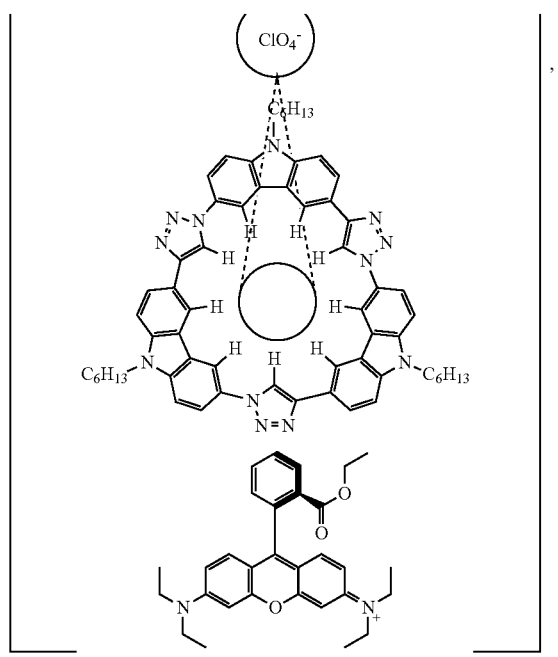

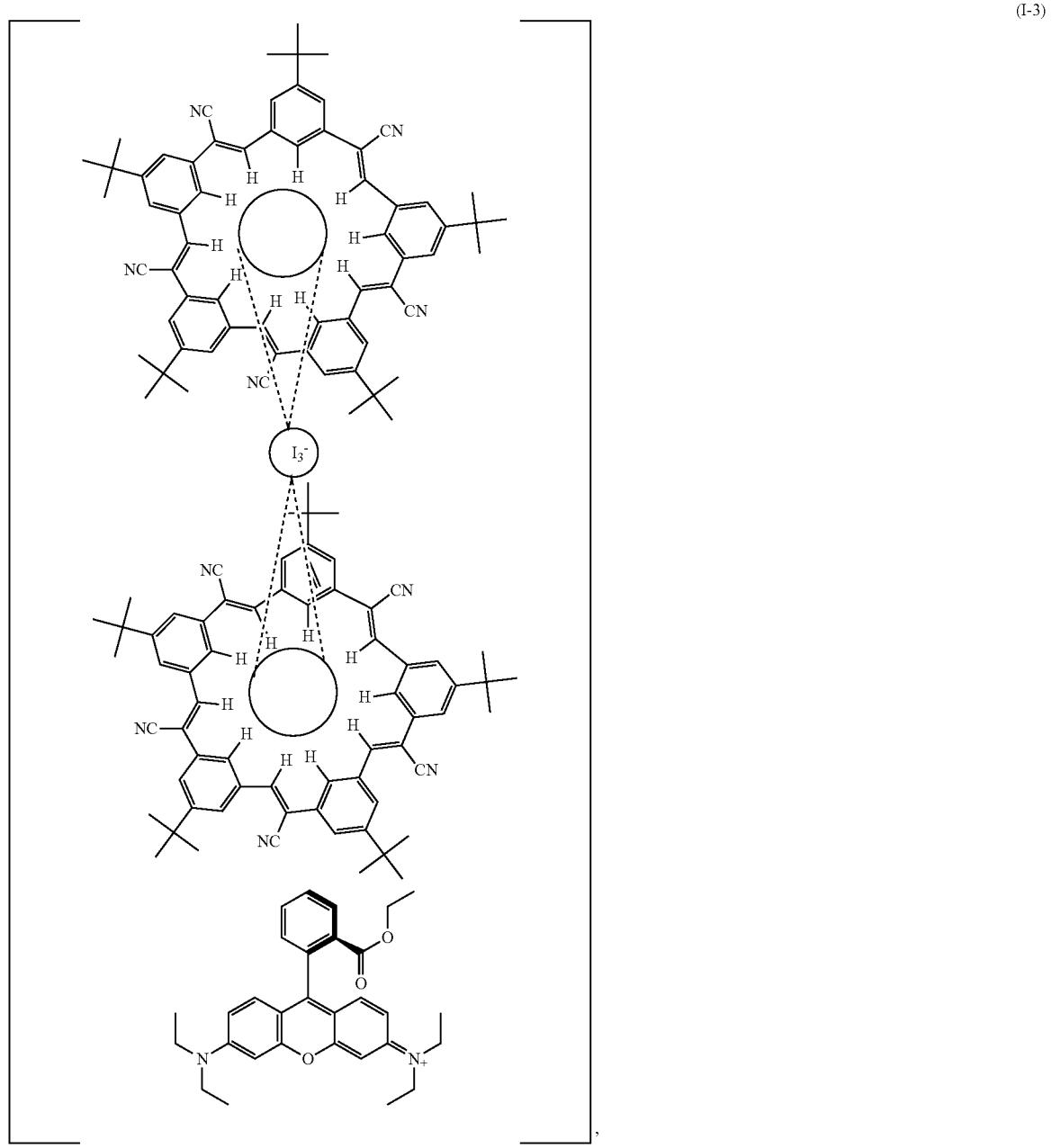
(I-3)

-continued
(I-7)
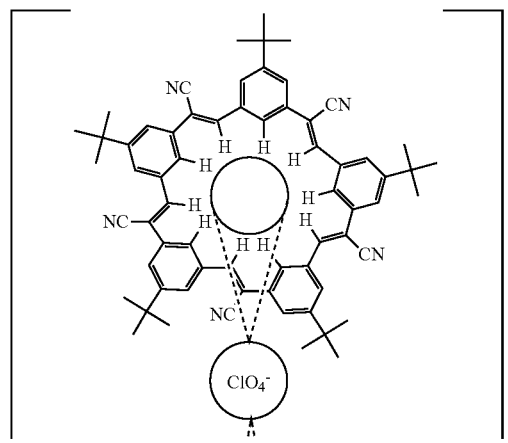
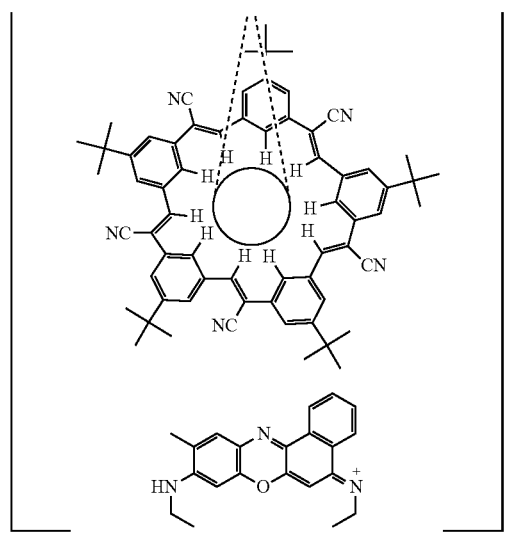
,
(I-8)
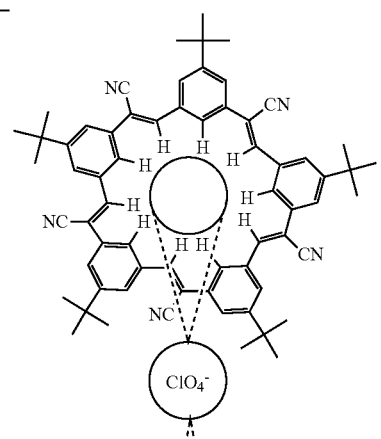
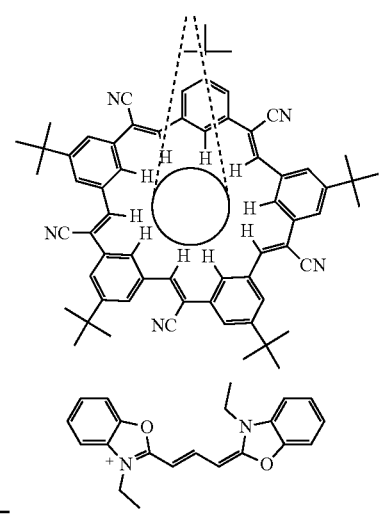
,

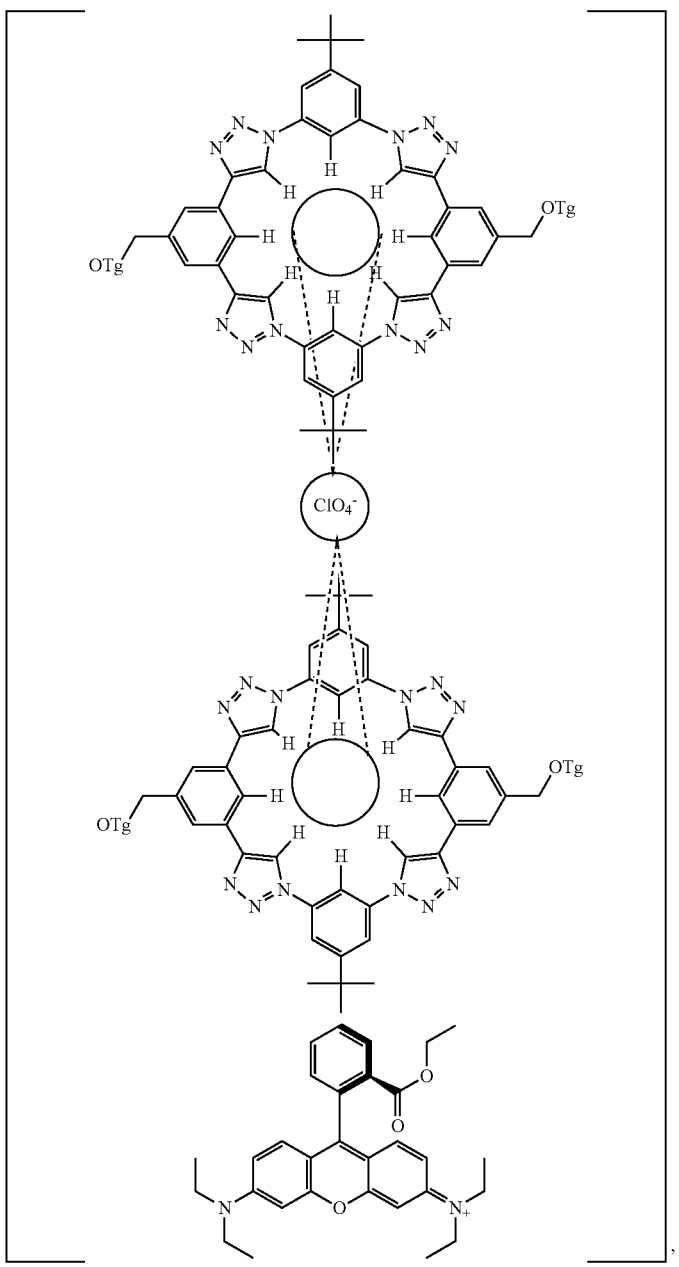
(I-5)

-continued
(I-11)
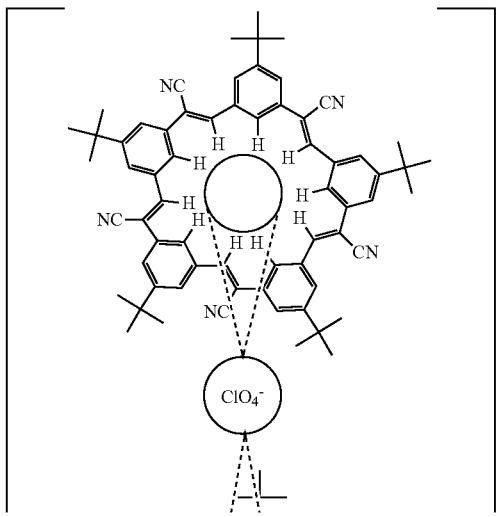
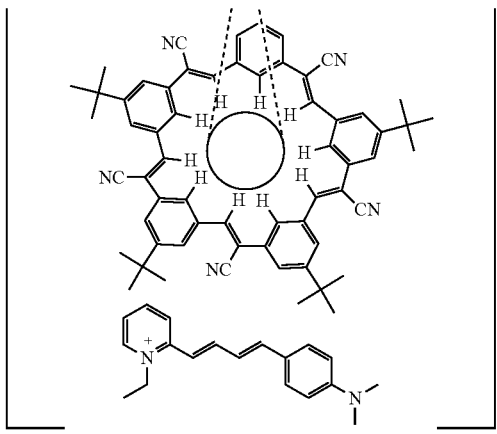
(I-12)
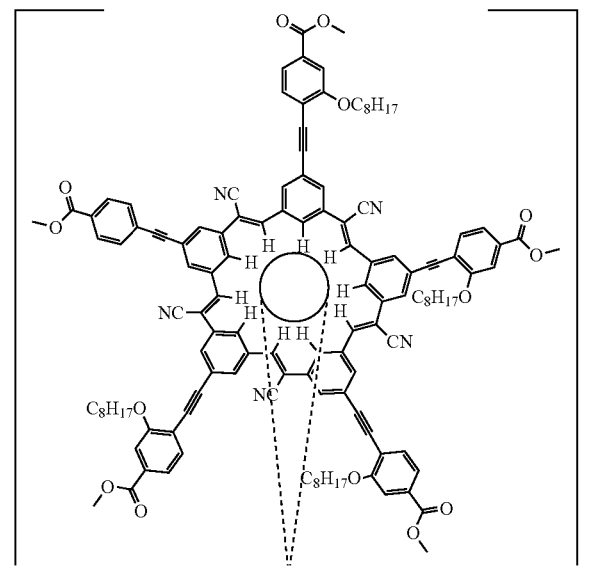
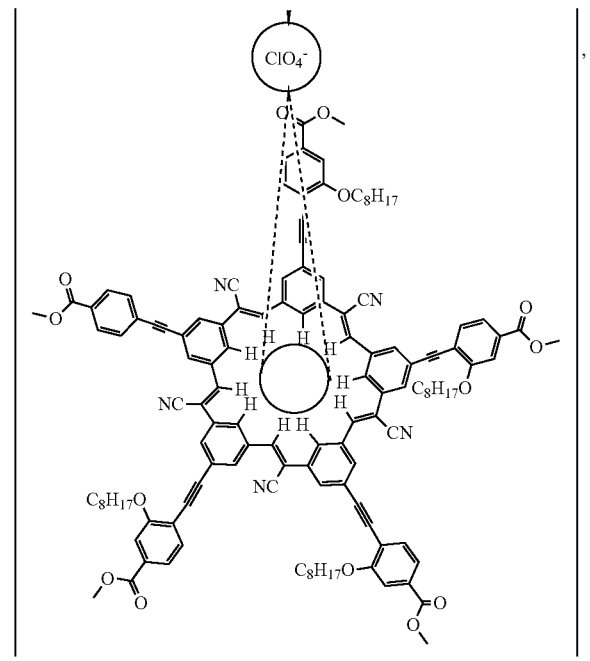
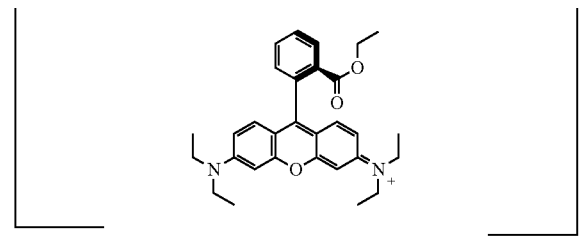

-continued

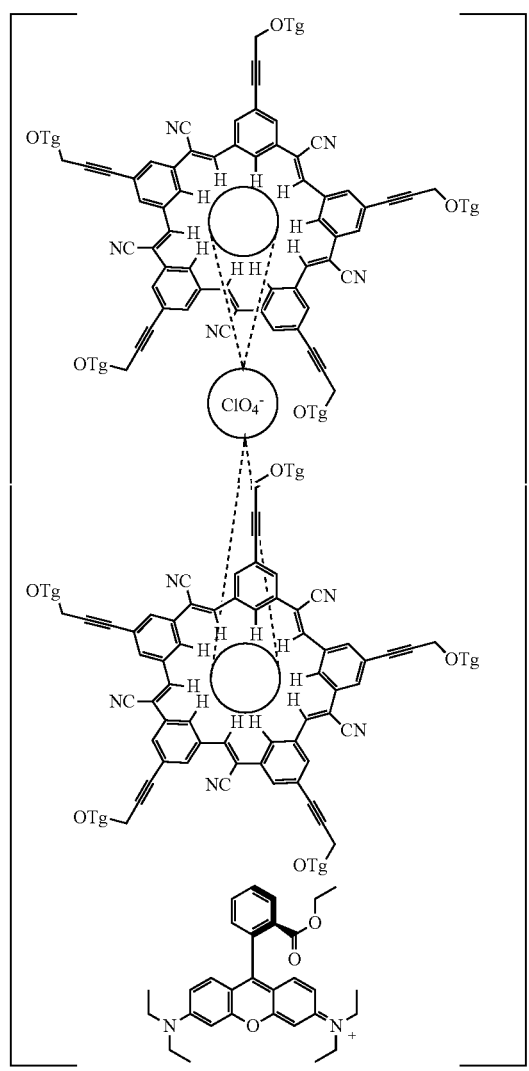

(I-13)

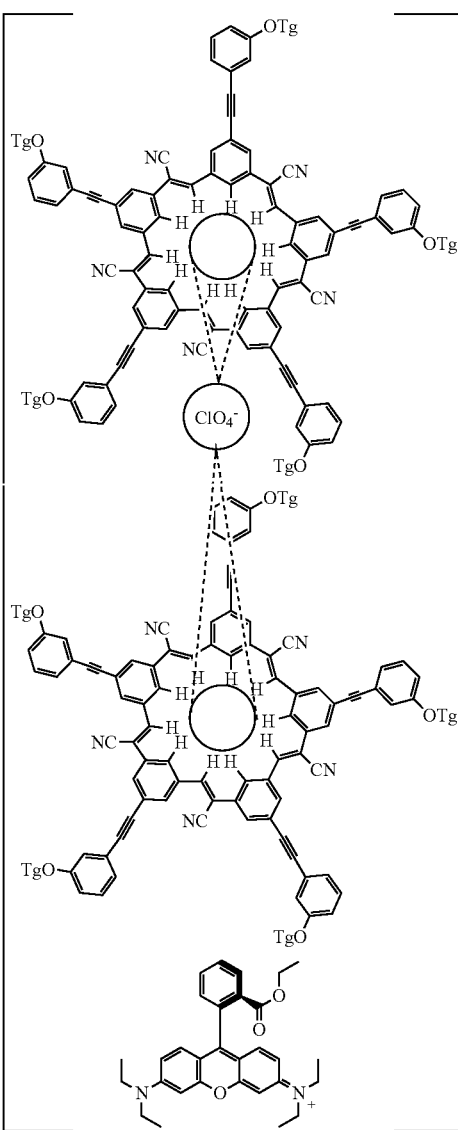

(I-14)

, and

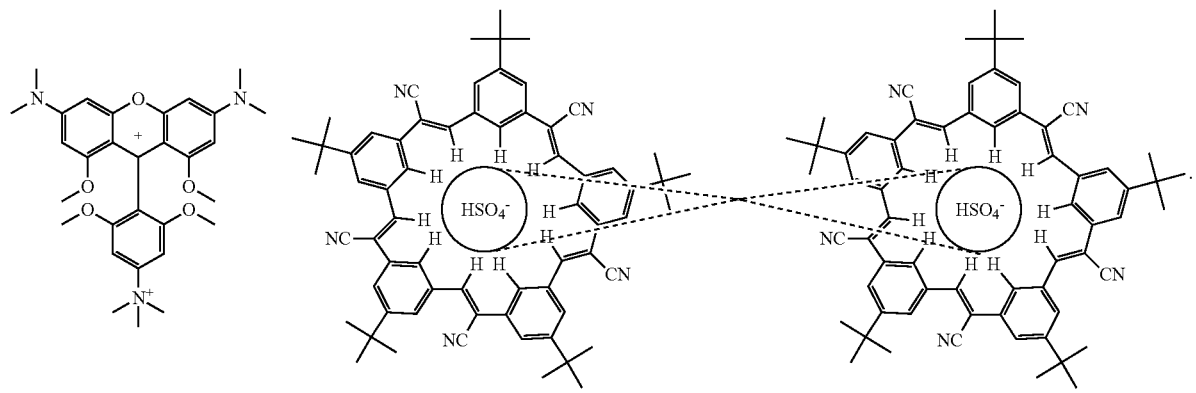

(I-15)

Yet according to further respects of the method, the cationic dye$^{m+}$ absorbs light at a wavelength longer than the absorption wavelength of a complex formed between the counterion$^{n-}$ and the counterion receptor. Yet according to further respects of the method, the cationic dye$^{m+}$ emits light at a wavelength longer than the absorption wavelength of a complex formed between the counterion$^{n-}$ and the counterion receptor. Yet according to further respects of the method, the compound of Formula (I) comprises an emissive unit. Yet according to further respects of the method, formulation comprises a solid state material. In this regard, solid state material is preferably selected from the group consisting of a powder, amorphous solid, thin films, crystals, microparticles, polymer composites, nanoparticles, and colloid of microparticles and nanoparticles. Additionally, and in accordance with the method, the formulation is prepared from a solution including a solvent of low polarity or from a powder or from a colloid. In one respect, the wherein the formulation includes a colloid, which is a different state of matter from liquids, solutions, and solid state.

SMILES Compounds from Anionic Dyes

In a fourth aspect, a compound of Formula (VI) is provided:

(charged dye$^{m-}$)$_x$·(counterion$^{n+}$)$_y$·(counterion receptor)$_z$ (VI).

The charged dye$^{m-}$ is an anionic dye, counterion$^{n+}$ is a cation, and counterion receptor is a binding ligand for counterion$^{n+}$. The m, n, x and y are integers greater than or equal to 1 and products of x·n and m·y are identical.

In a first respect, the compound of Formula (VI) includes a charged dye$^{m-}$ that can be prepared by one of the following methods. In a first method, a neutral dye can be converted to the charged dye$^{m-}$ with the addition of base MOH, where M is the counterion$^{n+}$ in compound of Formula (VI). In a second method, a neutral dye can be converted to the charged dye$^{m-}$ by introduction of an anionic site on the neutral dye. In preferred embodiments, the base MOH is selected from the group consisting of LiOH, NaOH, KOH, CsOH, RbOH, Ca(OH)$_2$, Ba(OH)$_2$, Mg(OH)$_2$, ammonium hydroxide where ammonium is N(R)$_4^+$, wherein R is an alkyl group of identical or non-identical composition.

In a second respect, the compound of, Formula (VI) includes an anionic dye, wherein the anionic dye is selected from a compound having a light-absorbing unit and an anionic dye having both a light-absorbing unit and a light emissive unit.

In a third respect, the compound of Formula (VI) includes an anionic dye, wherein the anionic dye is selected from a group of dye classes consisting of anionic styryls, anionic xanthenes, anionic trianguleniums, anionic oxazines, anionic triarylmethanes, anionic cyanines, anionic acridines, anionic fluoronones, anionic phenanthridines, anionic polyaromatic hydrocarbons, anionic imides, anionic BODIPYs, anionic coumarins, and anionic squaraines, or a combination thereof.

In a fourth respect, the compound of Formula (VI) includes an anionic dye, wherein the anionic dye is selected from the group consisting of the following members:

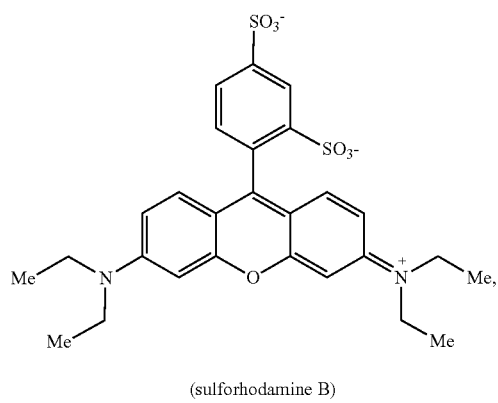

(sulforhodamine B)

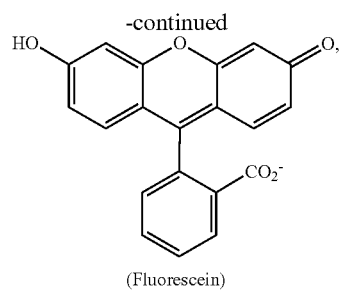

(Fluorescein)

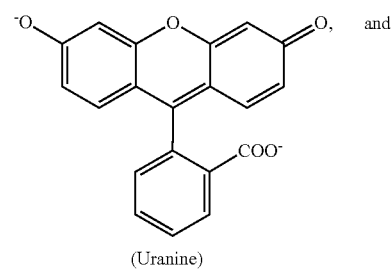

(Uranine)

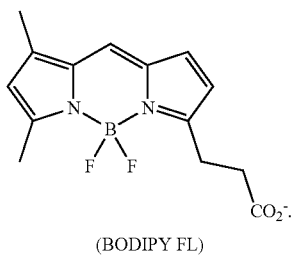

(BODIPY FL)

In a fifth respect, the compound of Formula (VI) includes a counterion receptor, wherein the counterion receptor is a heteromacrocycle. Preferred heteromacrocycles include one selected from Formulas (VII)-(XIII):

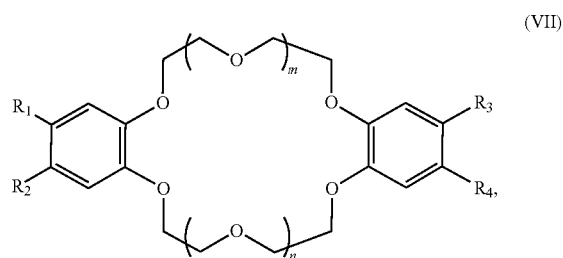

(VII)

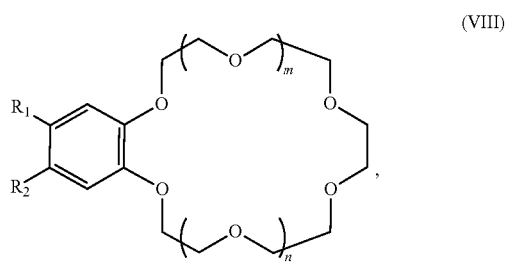

(VIII)

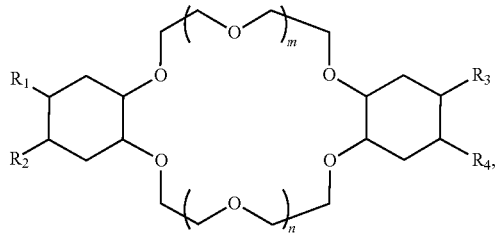

(IX)

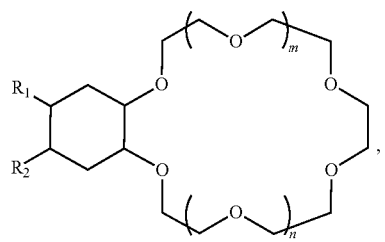

(X)

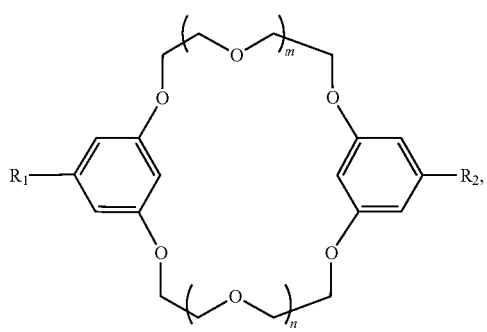

(XI)

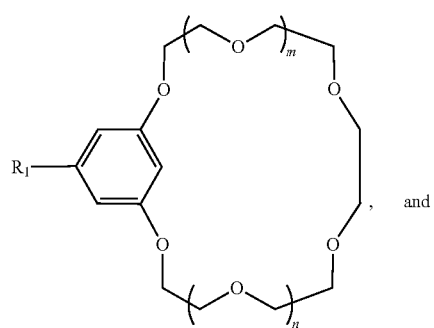

(XII)

, and

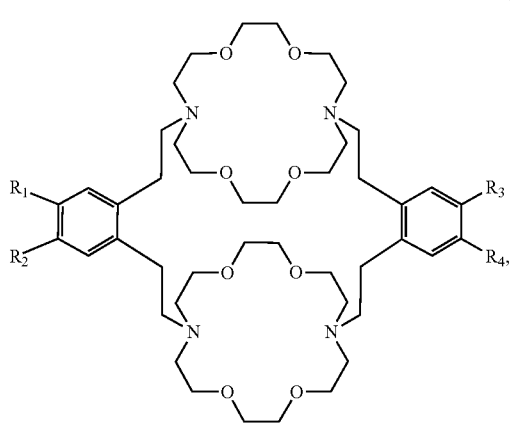

(XIII)

or a combination thereof. The substituents $R_1$, $R_2$, $R_3$ and $R_4$ can all the same or all different and are selected from a group consisting of alkyl (for example, $C_1$-$C_{18}$), alkyl-substituted phenyl derivatives, and substituted glycol derivatives, alkenyl, alkoxy, alkyl-NH-alkyl, aryl, cycloalkyl, heteroaryl, heterocycle, haloalkyl, hydrogen, iodo, —$OR^6$, —$N(R^7R^8)$, —$CO_2R^9$, —C(O)—$N(R^{10}R^{11})$, wherein $R^6$, $R^7$, $R^8$, $R^9$, $R^{10}$, and $R^{11}$ are each selected from the group consisting of alkenyl, alkyl, alkoxy, alkyl-NH-alkyl, aryl, arylalkyl, cycloalkyl, heteroaryl, heterocycle, haloalkyl, and hydrogen, among others, or a combination thereof.

Preferred cationic counterions of compounds of Formula (VI) include a cation selected from the group consisting of $Li^+$, $Na^+$, $K^+$, $Cs^+$, ammonium cations $N(R)_4^+$, wherein R is an alkyl group of identical or non-identical composition, $Rb^+$, $Ca^{2+}$, $Ba^{2+}$, $Mg^{2+}$, dicationic bis-ammonium cations $(R^1)_3N^+$—$(R^2)$—$N(R^3)_3^+$, wherein $R^1$ and $R^3$ is an alkyl group of identical or non-identical composition, and $R^2$ is selected from the group consisting of alkenyl, alkyl, alkoxy, alkyl-NH-alkyl, aryl, arylalkyl, cycloalkyl, heteroaryl, heterocycle, haloalkyl, among others, or a combination thereof. Since the counterion needs to bind to the counterion receptor, the preferred cation is not is not tetra-phenyl phosphonium. Since the counterion needs to be inert towards thermal or photoinduced electron transfer, the preferred cation is not methyl pyridinium. Exemplary compounds of Formula (VI) include Formulas (VI-1), (VI-2), (VI-3), (VI-4) and (VI-5):

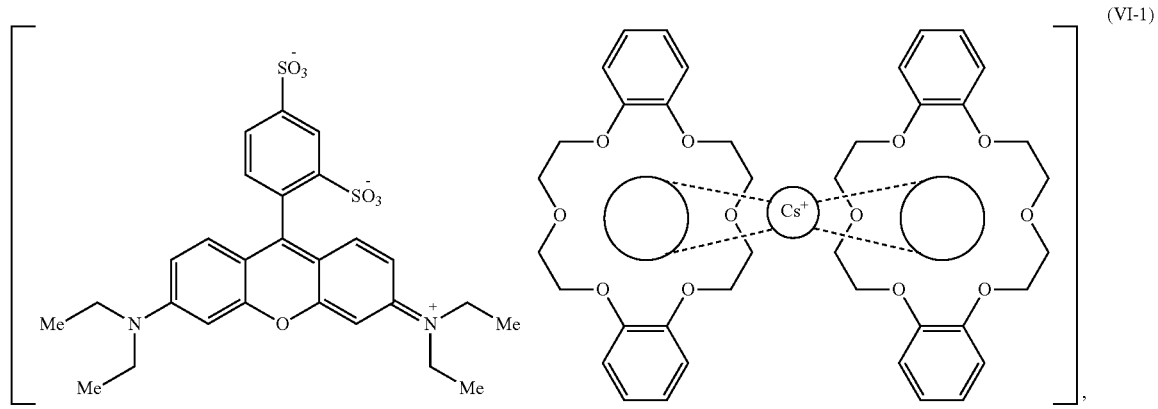

(VI-1)

-continued
(VI-2)
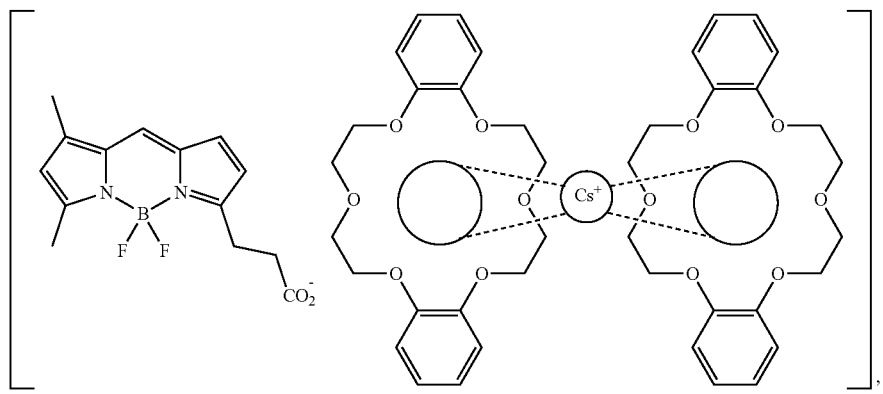
(VI-3)
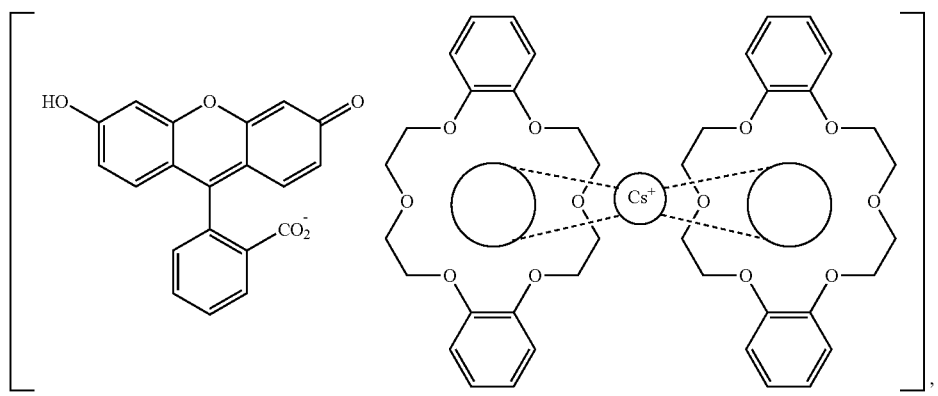
(VI-4)
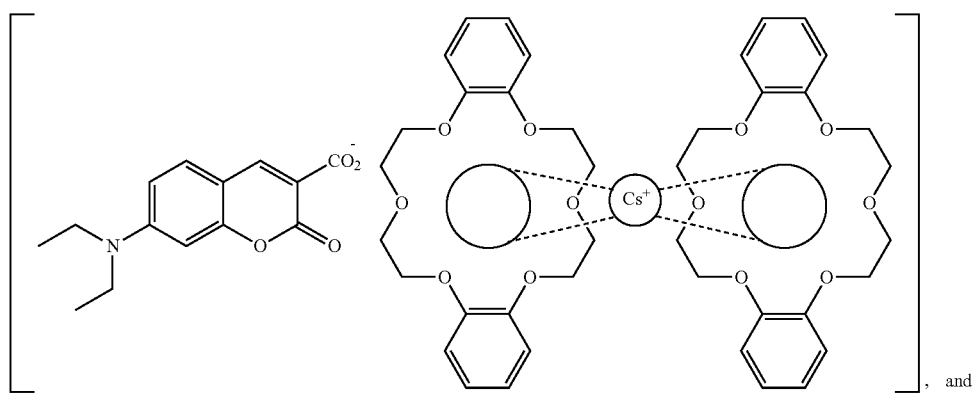
, and
(VI-5)
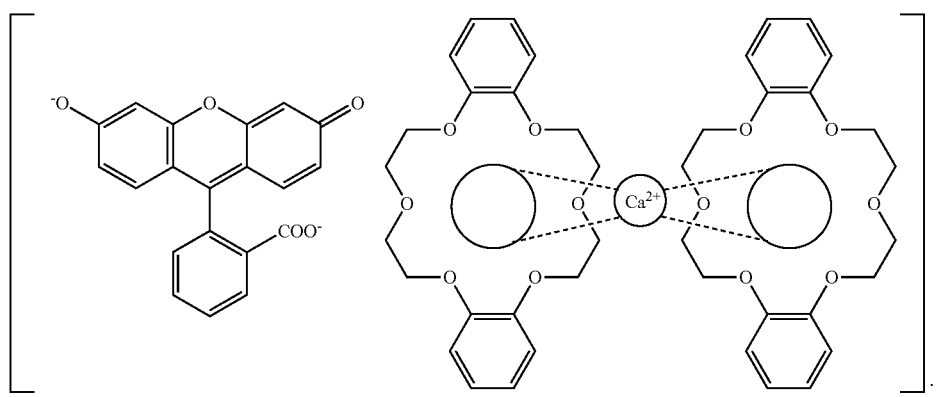
.
In another respect, the compound of Formula (VI) includes an anionic dye that includes a light-absorbing unit. In this regard, a preferred embodiment includes anionic dye that absorbs light at a wavelength longer than the absorption wavelength of a complex formed between the counterion$^{n+}$ and the counterion receptor. Preferred embodiments include anionic dyes that include a light-absorbing unit having light-absorbing properties that reproduce the light absorbing properties (absorption band position and width) of the anionic dye alone under dilute conditions. In yet other further embodiments, the anionic dye comprises a light-absorbing unit and a light emissive unit. In yet other further embodiments, the anionic dye absorbs and emits light at a wavelength longer than the absorption wavelength of a complex formed between the counterion$^{n+}$ and the counterion receptor. In this regard, an electronic property of the anionic dye and the counterion receptor complex does not produce partial or full electron transfer, photo induced electron transfer between the anionic dye and the counterion receptor, or does not produce a new absorption or emission band.

Smiles Formulations of Anionic Dyes

In a fifth aspect, a formulation comprising a compound of Formula (VI) is disclosed:

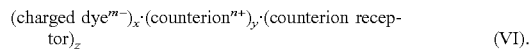

(VI).

The charged dye$^{m-}$ is an anionic dye, counterion$^{n+}$ is a cation, and counterion receptor is a binding ligand for counterion$^{n+}$. The m, n, x and y are integers greater than or equal to 1 and products of x·n and m·y are identical.

In a first respect, the formulation includes the compounds set forth for each of the respects disclosed for the compounds of Formula (VI). In a second respect, the formulation includes an electronic property of the anionic dye and the counterion receptor complex that does not produce partial or full electron transfer, photo induced electron transfer, or electronic mixing between the cationic dye and the counterion receptor. In a third respect, the formulation comprises a solid state material. In this regard, the solid state material is selected from the group consisting of a powder, amorphous solid, thin films, crystals, microparticles, polymer composites, nanoparticles, and colloid of microparticles and nanoparticles. In another respect, the formulation is prepared from a solution, a powder or a colloid. In this regard, the formulation comprises a colloid.

Preparation of SMILES Materials of Anionic Dyes

In a sixth aspect, a method of producing a material having bright emission properties is disclosed. The method includes several steps. A first step includes preparing a first mixture comprising a compound according to the fourth aspect or a formulation according to the fifth aspect. A second step includes condensing the first mixture to form a material having an emissive unit in a solid state.

Additional Methods and Applications with SMILES Materials

In a seventh aspect, a method of detecting a substance is disclosed. The method includes several steps. A first step includes contacting the substance with any of the compounds, formulations or materials according to any of the foregoing aspects. A second step includes measuring a change in at least one spectral property in any of the compounds, formulations or materials of the mixture as a result of the contacting step relative to the substance alone or the compounds, formulations or materials alone. The substance is detected by the change in at least one spectral property in any of the compounds, formulations or materials as a result of the measuring step with the mixture.

In an eighth aspect, a method of adding light absorption and emission to a polymer is disclosed. The method includes several steps. A first step includes providing the polymer. A second step includes contacting the polymer with a SMILES material.

In a ninth aspect, a method of staining a biological material is provided. The method includes several steps. A first step includes providing the biological material. A second step includes contacting the biological material with a microparticle or nanoparticle comprising a SMILES material.

In a tenth aspect, a method of increasing the photostability of an ionic dye is provided. The method includes several steps. A first step includes providing the ionic dye. A second step includes converting the ionic dye into a SMILES material.

In an eleventh aspect, a method of increasing the solubility and mixability of an ionic dye with polymers and non-polar solvents is provided. The method includes several steps. A first step includes providing the ionic dye. A second step includes converting the ionic dye into a SMILES material.

In a twelfth aspect, a method of generating a SMILES material with a programmable light absorption and emission properties is provided. The method includes several steps. A first step includes providing an ionic dye. The ionic dye includes specific light absorption and emission properties. A second step includes converting the ionic dye into the SMILES material.

In a thirteenth aspect, a method of generating a SMILES material with programmable Stokes shifts is provided. The method includes several steps. A first step includes providing a first ionic dye and a second ionic dye. A second step includes mixing first ionic dye and the second ionic dye together to form a first mixture. A third step includes converting the first mixture into the SMILES material. The first ionic dye is an energy donor and the second ionic dye is an energy acceptor in the SMILES material to allow light emission by the first ionic dye and light absorption by the second ionic dye.

In a fourteenth aspect, a method of generating a SMILES material with programmable absorption and emission at different wavelengths with different relative intensities is provided. The method includes several steps. A first step includes providing at least two ionic dyes. A second step includes mixing the least two ionic dyes together to form a first mixture. A third step includes converting the first mixture into the SMILES material. The at least two ionic dyes comprise programmable absorption and emission at different wavelengths with different relative intensities.

In a fifteenth aspect, a method of generating a SMILES material with programmable emission decay rate is provided. The method includes several steps. A first step includes providing a plurality of ionic dyes. A second step includes mixing the plurality of ionic dyes together to form a first mixture. A third step includes converting the mixture into a SMILES material. The plurality of ionic dyes comprises a first ionic dye that acts as a light absorbing energy donor, any intermediate dyes that acts simultaneously as an energy acceptor and energy donor and a final ionic dye that acts as an energy accepting emitter in the SMILES material to allow light absorption by the first ionic dye, pass energy through any intermediate dyes, and light emission by the final ionic dye.

EXAMPLES

Example 1. Methods of Preparation of SMILES Materials

A.1 SMILES Dye in Solution

Figure 1A:
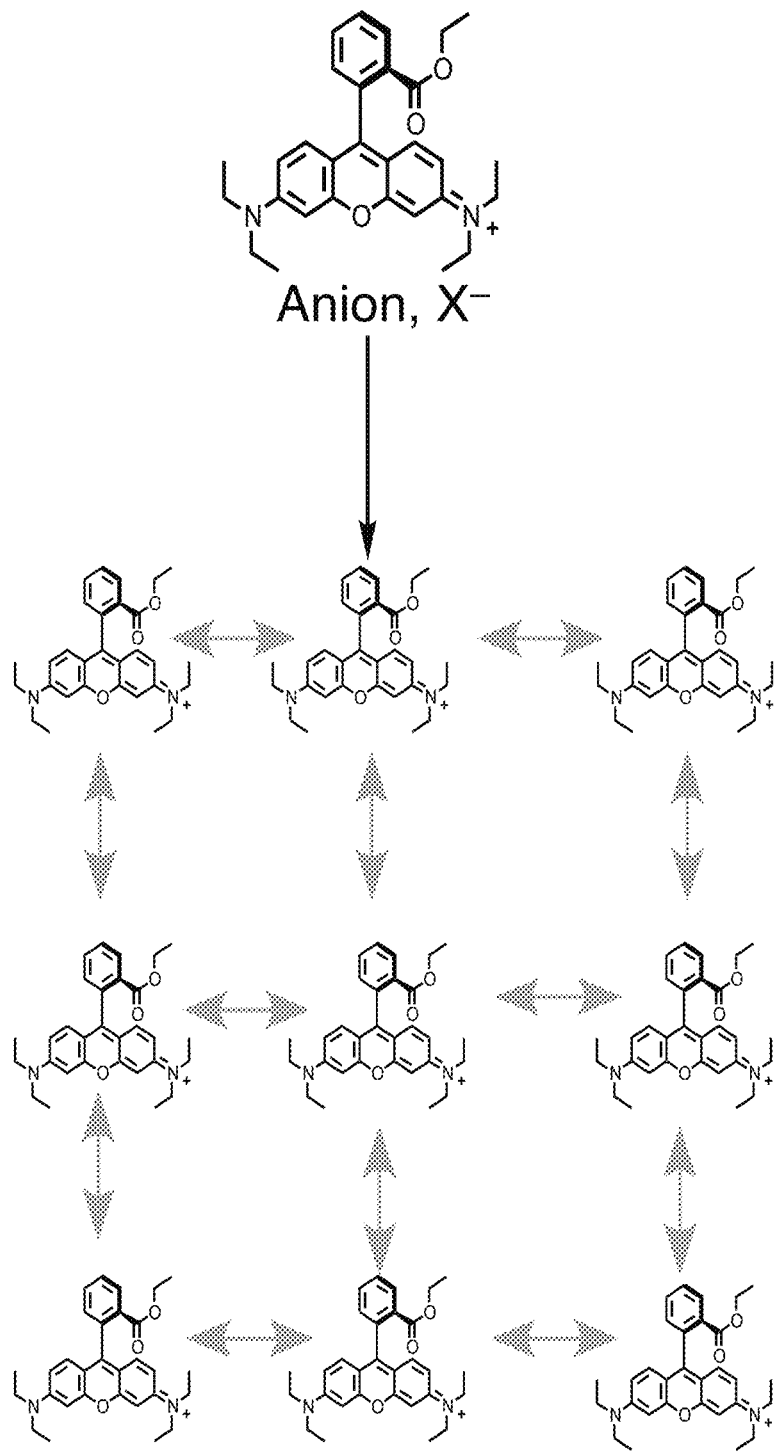
FIG. 1A illustrates exemplary cationic dyes and their counterions (anion, X$^-$) close pack in solids to distort absorption and quench emission.
Figure 1B:
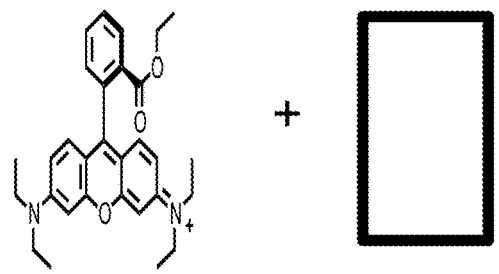
FIG. 1B illustrates exemplary isolation lattices offer a chance to rescue optical properties.
Figure 1B:
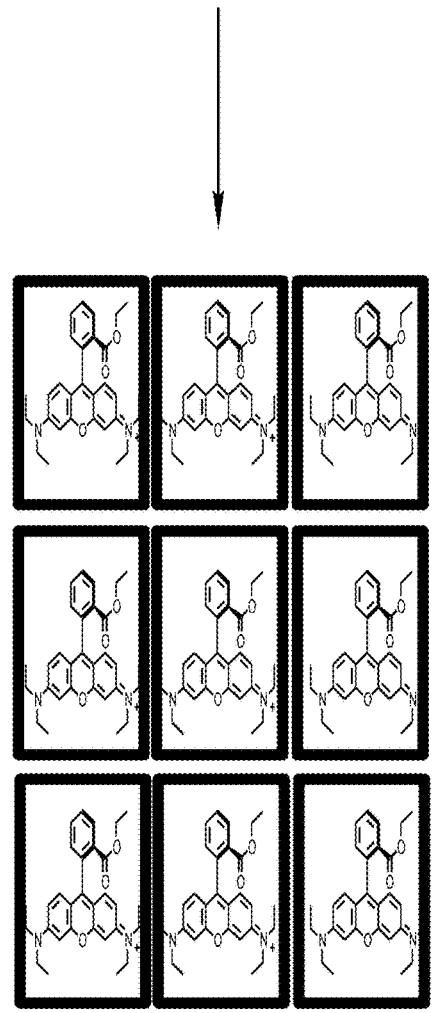
Figure 1C:
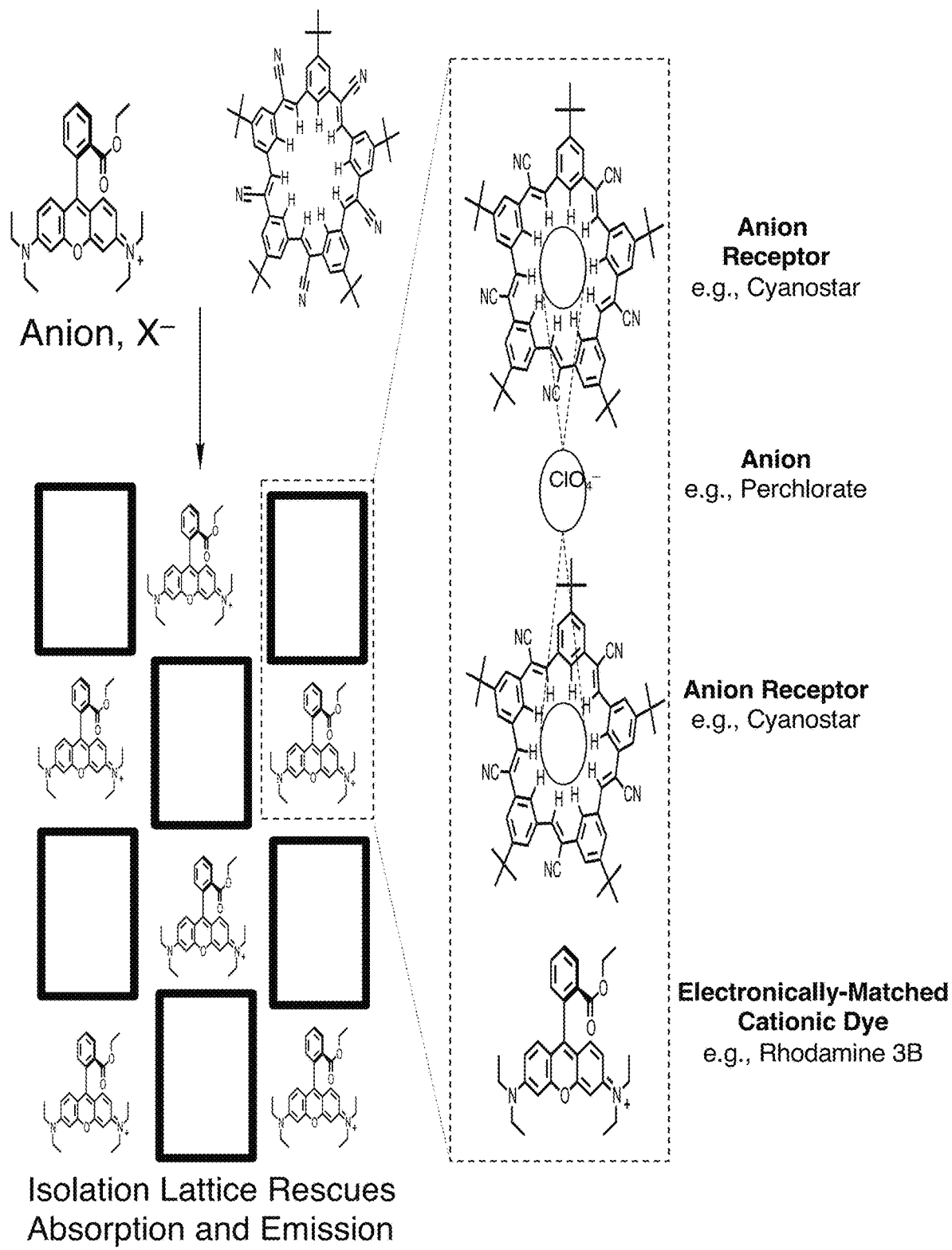
FIG. 1C illustrates exemplary small-molecule isolation lattices (SMILES) can be produced using anion-binding macrocycles, e.g., cyanostar, for spatial and electronic isolation of the cationic dyes.

The SMILES material was made by mixing an ionic dye as its salt of the counterion (e.g., rhodamine 3B perchlorate, 1 equivalent) with the right number of equivalents of the counterion receptor, e.g., 2 equivalents of cyanostar (FIG. 1C, Compound IV, where R1=R2=R3=R4=R5=tertiary-butyl). This method makes a solution of compounds of Formulas (I) or (VI) (depending on the charge on the ionic dye, its counterion and counterion receptor) where the values of m and n are integers greater than or equal to 1.

To make a representative solution of the SMILES dye, the ionic dye as its salt was weighed and added to a flask. To this flask was added two molar equivalents of a SMILES-compatible counterion receptor (e.g., cyanostar, FIG. 1C). Different molar equivalents of the counterion receptor can be added to alter values for x, y, and z. A volume of solvent (e.g., dichloromethane) is added to the dry mixture to yield a solution of desired concentration (e.g., 1 mM with respect to an ionic dye).

Example 2. Making SMILES Materials from Cyanostar and Rhodamine 3B

A quantity of dry rhodamine 3B perchlorate (6.1 mg) was added to a flask. Two molar equivalents of the SMILES-compatible anion ligand cyanostar (19.6 mg) was measured out and added to the flask. A volume of dichloromethane (1 mL) was added to the dry mixture to yield a solution of desired concentration (e.g., 1 mM with respect to cationic dye). The solvent was then removed in vacuo and the resulting powder collected. A quantity (2.4 mg) of the dry FL-SMILES powder [(cyanostar)$_2$(ClO$_4$)(rhodamine 3B)] was added to a flask. The solid was then dissolved in a volatile organic solvent (dichloromethane) to a desired stock concentration (2 mM). A glass microscope slide was then affixed to a spin coater set to 2000 RPM. Spinning time was set for 30-45 seconds. The spinner was started and 20 µL of the dissolved stock solution of the FL-SMILES [(cyanostar)$_2$(ClO$_4$)(rhodamine 3B)] was then applied to the center of the slide. Once spinning was complete, the slide was removed and analyzed for optical properties without any additional processing.

Example 3. Making SMILES Materials from Cyanostar and Pyridin 1

A quantity of dry pyridin 1 perchlorate (5.7 mg) was added to a flask. Two molar equivalents of the SMILES-compatible anion ligand cyanostar (27.6 mg) was measured out and added to the flask. A volume of dichloromethane (1 mL) was added to the dry mixture to yield a solution of desired concentration (e.g., 1 mM with respect to cationic dye). The solvent was then removed in vacuo and the resulting powder collected. A quantity (2.2 mg) of the dry FL-SMILES powder [(cyanostar)$_2$(ClO$_4$)(pyridin 1)] was added to a flask. The solid was then dissolved in a volatile organic solvent (dichloromethane) to a desired stock concentration (2 mM). A glass microscope slide was then affixed to a spin coater set to 2000 RPM. Spinning time was set for 30-45 seconds. The spinner was started and 20 µL of the dissolved stock solution of the FL-SMILES [(cyanostar)$_2$(ClO$_4$)(pyridin 1)] was then applied to the center of the slide. Once spinning was complete, the slide was removed and analyzed for optical properties without any additional processing.

Example 4. Making SMILES Materials from Cyanostar and DAOTA

A quantity of dry DAOTA tetrafluoroborate (5.7 mg) was added to a flask. Two molar equivalents of the SMILES-compatible anion ligand cyanostar (23.0 mg) was measured out and added to the flask. A volume of dichloromethane (1 mL) was added to the dry mixture to yield a solution of desired concentration (e.g., 1 mM with respect to cationic dye). The solvent was then removed in vacuo and the resulting powder collected. A quantity (2.3 mg) of the dry FL-SMILES powder [(cyanostar)$_2$(BF$_4$)(DAOTA)] was added to a flask. The solid was then dissolved in a volatile organic solvent (dichloromethane) to a desired stock concentration (2 mM). A glass microscope slide was then affixed to a spin coater set to 2000 RPM. Spinning time was set for 30-45 seconds. The spinner was started and 20 µL of the dissolved stock solution of the FL-SMILES [(cyanostar)$_2$(BF$_4$)(DAOTA)] was then applied to the center of the slide. Once spinning was complete, the slide was removed and analyzed for optical properties without any additional processing.

Example 5. Making SMILES Materials from Cyanostar and Oxazine 720

A quantity of dry oxazine 720 perchlorate (4.9 mg) was added to a flask. Two molar equivalents of the SMILES-compatible anion ligand cyanostar (20.8 mg) was measured out and added to the flask. A volume of dichloromethane (1 mL) was added to the dry mixture to yield a solution of desired concentration (e.g., 1 mM with respect to cationic dye). The solvent was then removed in vacuo and the resulting powder collected. A quantity (2.3 mg) of the dry FL-SMILES powder [(cyanostar)$_2$(ClO$_4$)(oxazine 720)] was added to a flask. The solid was then dissolved in a volatile organic solvent (dichloromethane) to a desired stock concentration (2 mM). A glass microscope slide was then affixed to a spin coater set to 2000 RPM. Spinning time was set for 30-45 seconds. The spinner was started and 20 µL of the dissolved stock solution of the FL-SMILES [(cyanostar)$_2$(ClO$_4$)(oxazine 720)] was then applied to the center of the slide. Once spinning was complete, the slide was removed and analyzed for optical properties without any additional processing.

Example 6. Making SMILES Materials from Cyanostar and Cyanine

A quantity of dry cyanine DIOC2 hexafluorophosphate (6.3 mg) was added to a flask. Two molar equivalents of the SMILES-compatible anion ligand cyanostar (24.1 mg) was measured out and added to the flask. A volume of dichloromethane (1 mL) was added to the dry mixture to yield a solution of desired concentration (e.g., 1 mM with respect to cationic dye). The solvent was then removed in vacuo and the resulting powder collected. A quantity (2.3 mg) of the dry FL-SMILES powder [(cyanostar)$_2$(PF$_6$)(DIOC$_2$)] was added to a flask. The solid was then dissolved in a volatile organic solvent (dichloromethane) to a desired stock concentration (2 mM). A glass microscope slide was then affixed to a spin coater set to 2000 RPM. Spinning time is set for 30-45 seconds. The spinner was started and 20 µL of the dissolved stock solution of the FL-SMILES [(cyanostar)$_2$ (PF$_6$)(DIOC$_2$)] was then applied to the center of the slide. Once spinning was complete, the slide was removed and analyzed for optical properties without any additional processing.

Example 7. Making Materials that do not Display Color Reproduction when Using Cyanostar with TOTA Showing Poor Energy Matching A quantity of dry TOTA tetrafluoroborate (4.4 mg) was added to a flask. Two molar equivalents of the SMILES-compatible anion ligand cyanostar (21.6 mg) was measured out and added to the flask. A volume of dichloromethane (1 mL) was added to the dry mixture to yield a solution of desired concentration (e.g., 1 mM with respect to cationic dye). The solvent was then removed in vacuo and the resulting powder collected. A quantity (2.2 mg) of the dry FL-SMILES powder [(cyanostar)$_2$(BF$_4$)(TOTA)] was added to a flask. The solid was then dissolved in a volatile organic solvent (dichloromethane) to a desired stock concentration (2 mM). A glass microscope slide was then affixed to a spin coater set to 2000 RPM. Spinning time was set for 30-45 seconds. The spinner was started and 20 L of the dissolved stock solution of the FL-SMILES [(cyanostar)$_2$(BF$_4$) (TOTA)] was then applied to the center of the slide. Once spinning was complete, the slide was removed and analyzed for optical properties without any additional processing. The absorption spectrum of the thin film does not show the same features as the dilute solution of the TOTA dye alone, and the emission properties does not reproduce the same emission seen from the dye in dilute solution but instead shows a new red-shifted emission band.

Example 8: Solid State of SMILES Material

Figure 2A:
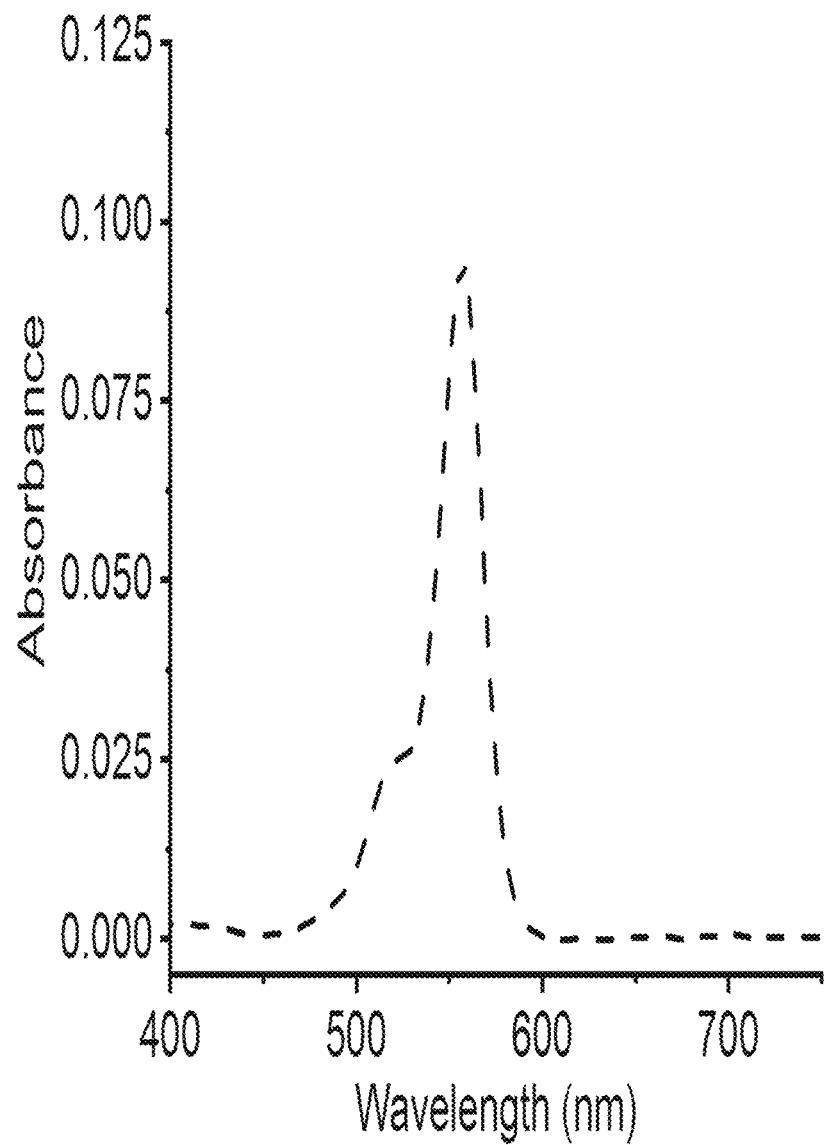
FIG. 2A illustrates exemplary absorption spectrum of rhodamine B perchlorate in the solution phase (dashed line, 1 µM, $CH_2Cl_2$).
Figure 2B:
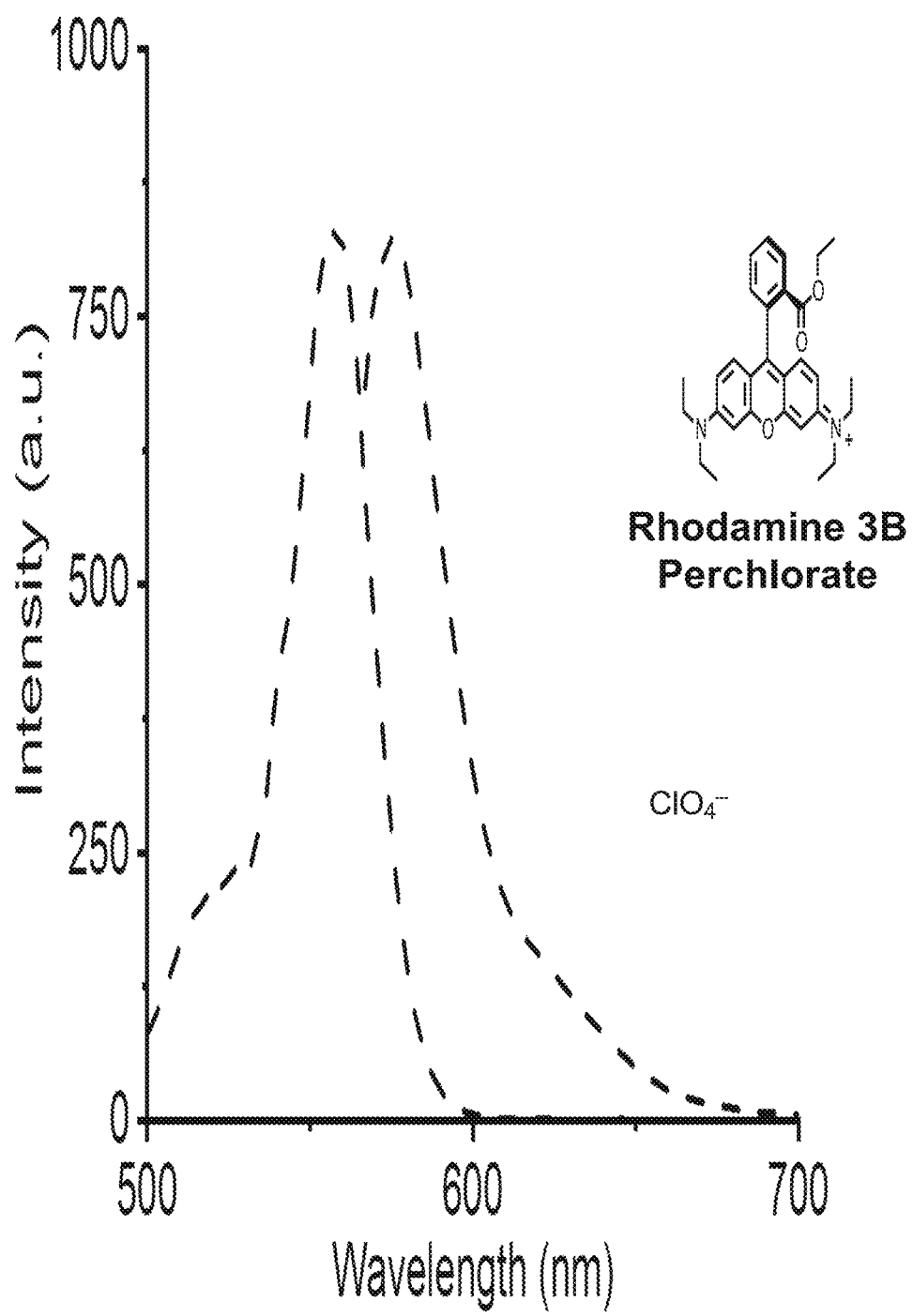
FIG. 2B illustrates exemplary excitation and emission spectra of rhodamine B perchlorate in the solution phase (dashed lines, 1 µM, $CH_2Cl_2$).
Figure 2C:
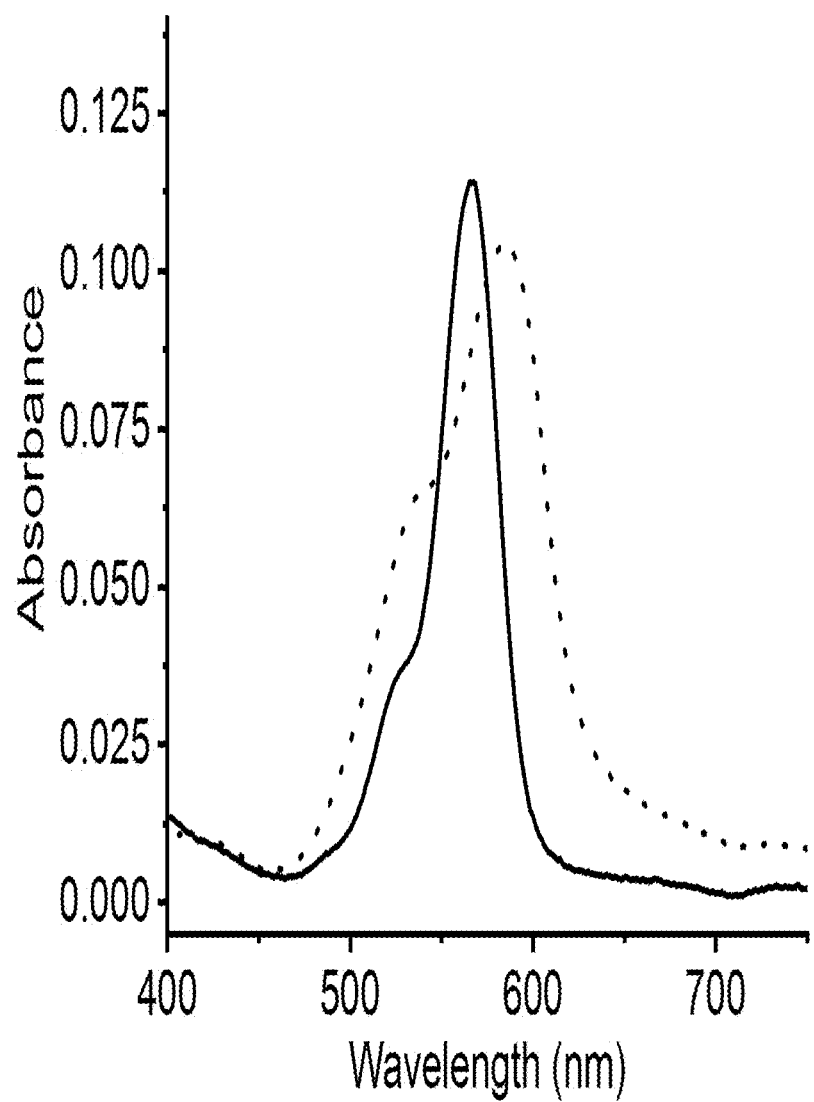
FIG. 2C illustrates exemplary solid-state absorption spectrum for rhodamine B perchlorate alone (dotted line) and rhodamine B perchlorate composed as FL-SMILES thin films (solid lines).
Figure 2D:
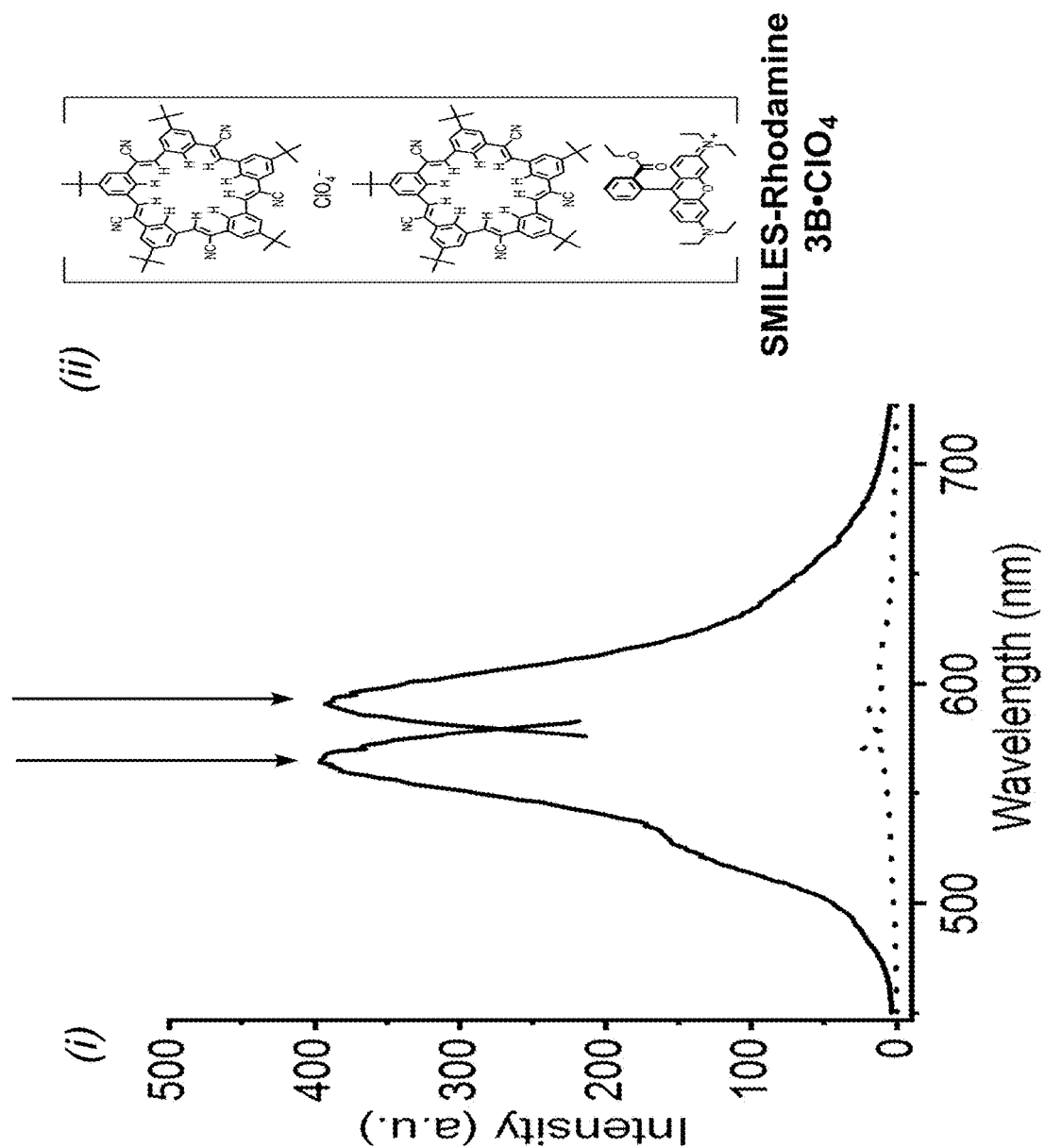
FIG. 2D illustrates exemplary solid-state excitation and emission spectra for rhodamine B perchlorate alone (dotted line) and for rhodamine B perchlorate composed as FL-SMILES thin films (solid lines). Conditions for thin films: 20 µL of 2 mM $CH_2Cl_2$ solution, 2000 RPM, glass slide 15 s.
Figure 2E:
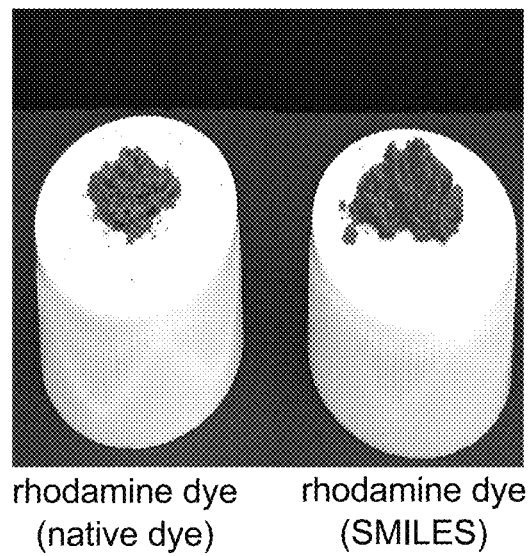
FIG. 2E illustrates exemplary images of the rhodamine 3B perchlorate (left) and FL-SMILES (right) under ambient.

A comparison of the optical properties of rhodamine 3B perchlorate by itself in the solid state and as a SMILES material provides a demonstration of the concept. The light absorption spectrum (FIG. 2C, solid line) of the thin film of the FL-SMILES material [(cyanostar)$_2$(ClO$_4$)(rhodamine 3B)] was seen to match solution spectra of the cationic dye rhodamine 3B in dilute conditions (FIG. 2A). However, the light absorption spectrum of the rhodamine 3B perchlorate alone (FIG. 2C, dotted line) did not match solution spectra of the cationic dye rhodamine 3B in dilute conditions (FIG. 2A). Instead, the absorption spectrum from the thin film was distorted, showing a shift to longer wavelength and a broader spectral band than in solution. The light excitation and emission of the FL-SMILES materials (FIG. 2D, solid line) was enhanced relative to a thin film of the rhodamine 3B perchlorate alone (FIG. 2D, dotted line).

Figure 2F:
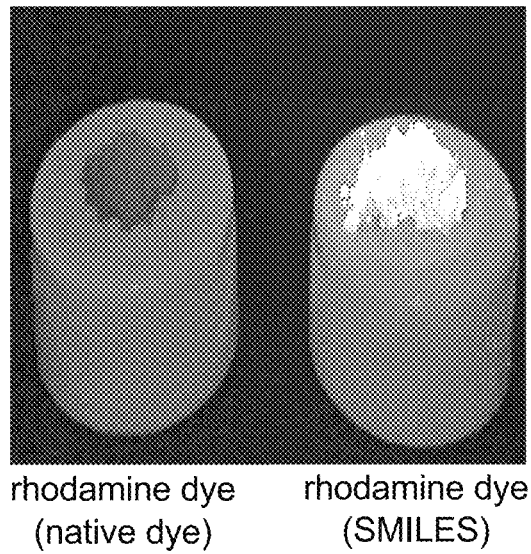
FIG. 2F illustrates exemplary images of the rhodamine 3B perchlorate complexed to FL-SMILES under UV light.

The emission enhancement from the solid-state preparation of the FL-SMILES material an amorphous powder can be readily seen in the enhanced brightness of the photograph of the SMILES material (FIG. 2F, right hand) relative to the rhodamine 3B perchlorate dye alone (FIG. 2F, left hand).

Bright emission obtained when using the FL-SMILES can be seen in various polymer composites. Using Method I (see EXAMPLES, F.1 Polymer Composites), the following polymers were stained with FL-SMILES [(cyanostar)$_2$(ClO$_4$) (rhodamine 3B)] and seen to show bright fluorescence when observed with UV light irradiation. See FIG. 11 for photographic images of stained polystyrene, poly(methyl methacrylate), poly(bisphenol A carbonate), PEG 5000, and poly(vinyl pyrrolidone). See FIG. 12 for examples of stained polymers made using Method II (see EXAMPLES, F.1 Polymer Composites): poly(propylene), and poly(acrylic acid).

B.1 SMILES Powders and Amorphous Solids

The values of x, y, and z in compounds of Formulas (I) and (VI) are used to first prepare a SMILES dye solution as described above in A.1. The solvent is then removed by evaporation, under vacuum or similar method. The resulting powder (e.g., FIG. 2E and FIG. 2F) is composed of the SMILES material in the solid state of formula corresponding to Compound I with values of x, y, and z determined by the original SMILES dye solution.

C.1. Thin Films

A thin film of SMILES materials can be made by spin coating an appropriate solution, particle suspension, polymer solution, or any related SMILES formulation onto a glass slide. The values of x, y, and z for compounds of Formulas (I) and (VI) are determined by the SMILES powder or SMILES dye solution or particle suspension or polymer solution used.

A quantity of SMILES powder (section B.1) is dissolved or suspended in a volatile organic solvent (e.g., dichloromethane or pentane) to a desired stock concentration (e.g., 2 mM). In addition, a SMILES dye solution (see A.1), microparticle suspension (see E.1), or polymer composite (see F.1) can be used.

In a typical preparation, a glass slide is affixed to a spin coater. The spinner (2000 RPM) is started and 20 μL of the SMILES material in solution is then applied to the center of the slide. Once spinning is complete (30-45 s), the thin film can be subjected to further analysis without further processing.

D.1. Bulk Crystals

Crystals of SMILES materials of compounds of Formulas (I) and (VI) are made using standard methods for crystal growing. These include but are not limited to vapor diffusion, layering of good and bad solvents, slow evaporation of solvent, recrystallization, seeding of solutions, and cooling of a concentrated solution.

In a typical preparation employing vapor diffusion, a 5-mM solution of SMILES materials is added to a sealed vial with a pinhole aperture and placed inside a chamber containing a suitable volatile antisolvent. The antisolvent chamber is then closed and the crystals are allowed to grow.

E.1. Microcrystals and Microparticles of SMILES

Method I: A quantity of dry SMILES powder (section B.1) is transferred to a flask, and dissolved in dichloromethane to a desired concentration (typical concentration range: 1-20 mM). Alternatively, a dye solution can be made from the components of the SMILES material as described in section A.1. The SMILES components and material needs to be soluble in the solvent of choice. To this solution is slowly added an excess of an antisolvent (e.g., 20 equivalents of pentane by volume). During the addition, the solution will become opaque as small microparticles of SMILES materials are produced. Solvents are subsequently removed under vacuum, yielding SMILES materials.

Method II: A quantity of dry SMILES powder (section B.1) is added to a flask and dissolved in dichloromethane to a desired concentration (typical concentration range: 1-20 mM). Alternatively, a SMILES dye solution (section A.1) can also be prepared at the desired concentration. The SMILES solution is then added to 20 equivalents (by volume) of antisolvent (typically pentane) dropwise, during which time the solution will become opaque. Solvents are subsequently removed under vacuum, yielding SMILES materials.

F.1 Polymer Composites

SMILES materials can be added to polymers by one of two methods.

Method I: A quantity of dry polymer (e.g., resin) is added to a flask. SMILES material is then added as a powder (section B.1) at a fraction of the mass of the polymer (e.g., between 0.05% and 20%). Solvent is then added until all solids are fully dissolved. The solution can then be used to prepare a thin film (section C.1), cast into a shape using a mold, or have the solvent removed to furnish a dry powder composite. Representative examples include use of poly (methyl methacrylate) (PMMA) or poly(bisphenol A carbonate). These doped polymers are prepared by dissolving the mixture of the dry polymer resin and SMILES in dichloromethane and removing the solvent.

Method II: A quantity of dry polymer (e.g., resin) is added to a flask. The flask is then heated in an oil bath until the resin fully melts. SMILES particles are added as a powder (section B.1 and E.1) at a fraction of the mass of the polymer (e.g., between 0.05% and 20%) and stirred to evenly disperse the SMILES materials within the liquified polymer. Representative examples include use of polypropylene and polyacrylic acid.

Making Neat SMILES Rhodamine R12 Nano-Particles

The SMILES nanoparticles were fabricated by injecting a mixture of R12 (400 µL) and cyanostar (400 µL) in 20 mL water in a bath ultrasonicator. To ensure homogenous mixing, the suspension was continued to be sonicated for 1 min after the end of the injection. The open vial was then put on a magnet stirrer for 8 h, to evaporate the containing THF. To remove any dissolved dye, the suspension was then put overnight under dialysis against 2 liters deionized water with cut-off filter of 10 kDa. The suspension was then concentrated using centrifuge concentrator of 10 kDa to yield the final volume 4 mL.

Particles with a DSPEGEG Surface Coating

The DSPEPEG-wrapped SMILES nanoparticles were fabricated by firstly mixing 400 µL of R12, 400 µL of cyanostar and 600 µL of DSPEPEG, and then injecting in 20 mL water in a bath ultrasonicator. To ensure homogenous mixing, the suspension was continued to be sonicated for 1 min after the end of the injection. The vial was then put on a magnet stirrer to evaporate the containing THF. To remove excess DSPEPEG and possibly any dissolved dye, the suspension was then put overnight under dialysis with cut-off filter of 10 kDa. The suspension was then concentrated using centrifuge concentrator of 10 kDa to yield the final volume 4 mL.

SMILES Nanoparticles Coated with TAT Peptide Conjugated DSPEPEG

The DSPEPEG-wrapped SMILES nanoparticles were fabricated by firstly mixing 400 µL of R12, 400 µL of cyanostar, 300 µL of DSPEPEG and 300 µL of DSPEPEG-Malemide, and then injecting in 20 mL water in a bath ultrasonicator. To ensure homogenous mixing, the suspension was continued to be sonicated for 1 min after the end of the injection. The vial was then put on a magnet stirrer to evaporate the containing THF. A 150 µL portion of the TAT-peptide stock solution was then added to the nanoparticles suspension and the vial was left for stirring over night to complete the conjugation reaction. To remove excess DSPEPEG, TAT-peptide and possibly any dissolved dye, the suspension was then put overnight under dialysis with cut-off filter of 10 kDa. The suspension was then concentrated using centrifuge concentrator of 10 kDa to yield the final volume 4 mL.

G.1. Making SMILES Materials from Dibenzo-18-Crown-6 and Sulforhodamine B Sodium Salt.

A quantity of dry sulforhodamine B sodium (5.8 mg) is added to a flask. One molar equivalent of the cation ligand dibenzo-18-crown-6 (3.6 mg) is measured out and added to the flask. A volume of dichloromethane (10 mL) is added to the dry mixture to yield a solution of desired concentration (e.g., 1 mM with respect to anionic dye). The solvent is then removed in vacuo and the resulting powder collected. A quantity (18.8 mg) of the dry SMILES powder [(dibenzo-18-crown-6) (Na)(sulforhodamine B)] is added to a flask. The solid is then dissolved in a volatile organic solvent (dichloromethane) to a desired stock concentration (2 mM). A glass microscope slide is then affixed to a spin coater set to 2000 RPM. Spinning time is set for 30-45 seconds. The spinner is started and 20 µL of the dissolved stock solution of the SMILES [(dibenzo-18-crown-6) (Na)(sulforhodamine B)] is then applied to the center of the slide. Once spinning is complete, the slide is removed and can be analyzed for optical properties without any additional processing.

G.2 Making SMILES Materials from Dibenzo-18-Crown-6 and Fluorescein Cesium Salt.

A quantity of dry fluorescein cesium salt (4.6 mg) is added to a flask. Two molar equivalents of dibenzo-18-crown-6 (7.2 mg) is measured out and added to the flask. A volume of dichloromethane (10 mL) is added to the dry mixture to yield a solution of desired concentration (e.g., 1 mM with respect to anionic dye and 2 mM with respect to the dibenzo-18-crown-6). The solvent is then removed in vacuo and the resulting powder collected. A quantity (23.7 mg) of the dry FL-SMILES powder [(dibenzo-18-crown-6)$_2$ (Cs) (fluorescein)] is added to a flask. The solid is then dissolved in a volatile organic solvent (dichloromethane) to a desired stock concentration (2 mM). A glass microscope slide is then affixed to a spin coater set to 2000 RPM. Spinning time is set for 30-45 seconds. The spinner is started and 20 µL of the dissolved stock solution of the SMILES [(dibenzo-18-crown-6)$_2$ (Cs) (fluorescein)] is then applied to the center of the slide. Once spinning is complete, the slide is removed and can be analyzed for optical properties without any additional processing.

G.3 Making SMILES Materials from Cyanostar and Dicationic Tetramethoxy-aminorhodamine.

A quantity of dry tetramethoxy-aminorhodamine bis-bisulfate (7.2 mg) is added to a flask. Two molar equivalents of the SMILES-compatible anion ligand cyanostar (18.4 mg) is measured out and added to the flask. A volume of dichloromethane (10 mL) is added to the dry mixture to yield a solution of desired concentration (e.g., 1 mM with respect to the dicationic dye). The solvent is then removed in vacuo and the resulting powder collected. A quantity (5.1 mg) of the dry FL-SMILES powder [(cyanostar)$_2$(HSO$_4$)$_2$ (tetramethoxy-aminorhodamine)] is added to a flask. The solid is then dissolved in a volatile organic solvent (dichloromethane) to a desired stock concentration (2 mM at 1 mL). A glass microscope slide is then affixed to a spin coater set to 2000 RPM. Spinning time is set for 30-45 seconds. The spinner is started and 20 µL of the dissolved stock solution of the FL-SMILES [(cyanostar)$_2$(HSO$_4$)$_2$(tetramethoxy-aminorhodamine)] is then applied to the center of the slide. Once spinning is complete, the slide is removed and can be analyzed for optical properties without any additional processing.

G.4 Making SMILES Materials from Cyanostar, Aminopyrene and Hexafluorophosphoric Acid.

A quantity of aminopyrene (2.2 mg) is added to a flask. A volume of dichloromethane (10 mL) is added to the dry mixture to yield a solution of desired concentration (e.g., 1 mM with respect to the dye). One molar equivalent of hexafluorophosphoric acid is added to produce ammoniumpyrene hexafluorophosphate in situ. Two molar equivalents of the SMILES-compatible anion ligand cyanostar (18.4 mg) is measured out and added to the flask. The solvent is then removed in vacuo and the resulting powder collected. A quantity (4.39 mg) of the dry SMILES powder [(cyanostar)$_2$(PF$_6$)(ammoniumpyrene)] is added to a flask. The solid is then dissolved in a volatile organic solvent (dichloromethane) to a desired stock concentration (2 mM). A glass microscope slide is then affixed to a spin coater set to 2000 RPM. Spinning time is set for 30-45 seconds. The spinner is started and 20 µL of the dissolved stock solution of the FL-SMILES [(cyanostar)$_2$(PF$_6$)(ammoniumpyrene)] is then applied to the center of the slide. Once spinning is complete, the slide is removed and can be analyzed for optical properties without any additional processing.

Example 9. Methods of Preparation of SMILES Materials Using Bambusuril

A.1 SMILES Dye in Solution

The SMILES material is made by mixing the cationic dye$^{m+}$ as its salt of the counterion$^{n-}$ (e.g., pyridine 1 perchlorate, 1 equivalent) with the two equivalents of the counterion receptor, e.g., 2 equivalents of bambusuril. This method makes a solution of Compound I of formula (charged dye$^{m+}$)$_x$·(counterion$^{n-}$)$_y$·(counterion receptor)$_z$; where the values of m and n are integers greater than or equal to 1.

To make a representative solution of the SMILES dye, the cationic dye as its salt is weighed and added to a flask. To this flask is added two molar equivalents of a SMILES-compatible counterion receptor (e.g., bambusuril). Different molar equivalents of the counterion receptor can be added to alter values for x, y, and z. A volume of solvent (e.g., dichloromethane) is added to the dry mixture to yield a solution of desired concentration (e.g., 1 mM with respect to cationic dye).

B.1 SMILES Powders and Amorphous Solids

The values of x, y, and z in Compound I are used to first prepare a SMILES dye solution as described above in A.1. The solvent is then removed by evaporation, under vacuum or similar method. The resulting powder is composed of the SMILES material in the solid state of formula corresponding to Compound I with values of x, y, and z determined by the original SMILES dye solution.

C.1. Thin Films

A thin film of SMILES materials can be made by spin coating an appropriate solution or any related SMILES formulation (e.g., particle suspension, polymer solution) onto a glass slide. The values of x, y, and z for Compound I are determined by the SMILES powder or SMILES dye solution used.

A quantity of SMILES powder (section B.1) is dissolved or suspended in a volatile organic solvent (e.g., dichloromethane or pentane) to a desired stock concentration (e.g., 2 mM).

In a typical preparation, a glass slide is affixed to a spin coater. The spinner (2000 RPM) is started and 20 µL of the SMILES material in solution is then applied to the center of the slide. Once spinning is complete (30-45 s), the thin film can be subjected to further analysis without further processing.

D.1. Bulk Crystals

Crystals of SMILES materials of Compound I can be made using standard methods for crystal growing. These include but are not limited to vapor diffusion, layering of good and bad solvents, slow evaporation of solvent, recrystallization, seeding of solutions, and cooling of a concentrated solution.

In a typical preparation employing vapor diffusion, a 5-mM solution of SMILES dye is added to a sealed vial with a pinhole aperture and placed inside a chamber containing a suitable volatile antisolvent. The antisolvent chamber is then closed and the crystals are allowed to grow.

E.1. Microcrystals and Microparticles of SMILES

Method I: A quantity of dry SMILES powder (section B.1) is transferred to a flask, and dissolved in dichloromethane to a desired concentration (typical concentration range: 1-20 mM). Alternatively, a dye solution can be made from the components of the SMILES material as described in section A.1. The SMILES components and material needs to be soluble in the solvent of choice. To this solution is slowly added an excess of an antisolvent (e.g., 20 equivalents of pentane by volume). During the addition, the solution will become opaque as small microparticles of SMILES materials are produced. Solvents are subsequently removed under vacuum, yielding SMILES materials.

Method II: A quantity of dry SMILES powder (section B.1) is added to a flask and dissolved in dichloromethane to a desired concentration (typical concentration range: 1-20 mM). Alternatively, a SMILES dye solution (section A.1) can also be prepared at the desired concentration. The SMILES solution is then added to 20 equivalents (by volume) of antisolvent (typically pentane) dropwise, during which time the solution will become opaque. Solvents are subsequently removed under vacuum, yielding SMILES materials.

Example 10. Making SMILES Materials from Bambusuril B.2 and Pyridin 1

A quantity of dry pyridin 1 perchlorate (5.7 mg) is added to a flask. Two molar equivalents of the SMILES-compatible anion ligand bambusuril B.2 is measured out and added to the flask. A volume of dichloromethane (1 mL) is added to the dry mixture to yield a solution of desired concentration (e.g., 1 mM with respect to cationic dye). The solvent is then removed in vacuo and the resulting powder collected. A quantity of the dry FL-SMILES powder [(bambusuril)$_2$(ClO$_4$)(pyridin 1)] is added to a flask. The solid is then dissolved in a volatile organic solvent (dichloromethane) to a desired stock concentration (2 mM). A glass microscope slide is then affixed to a spin coater set to 2000 RPM. Spinning time is set for 30-45 seconds. The spinner is started and 20 µL of the dissolved stock solution of the FL-SMILES [(bambusuril)$_2$(ClO$_4$)(pyridin 1)] is then applied to the center of the slide. Once spinning is complete, the slide is removed and can be analyzed for optical properties without any additional processing.

Example 11. Making SMILES Materials from Bambusuril B.2 and Rhodamine 3B

A quantity of dry rhodamine 3B perchlorate (6.1 mg) is added to a flask. Two molar equivalents of the SMILES-compatible anion ligand bambusuril B.2 is measured out and added to the flask. A volume of dichloromethane (1 mL) is added to the dry mixture to yield a solution of desired concentration (e.g., 1 mM with respect to cationic dye). The solvent is then removed in vacuo and the resulting powder collected. A quantity of the dry FL-SMILES powder [(bambusuril)$_2$(ClO$_4$)(rhodamine 3B)] is added to a flask. The solid is then dissolved in a volatile organic solvent (dichloromethane) to a desired stock concentration (2 mM). A glass microscope slide is then affixed to a spin coater set to 2000 RPM. Spinning time is set for 30-45 seconds. The spinner is started and 20 µL of the dissolved stock solution of the FL-SMILES [(bambusuril)$_2$(ClO$_4$)(rhodamine 3B)] is then applied to the center of the slide. Once spinning is complete, the slide is removed and can be analyzed for optical properties without any additional processing.

INCORPORATION BY REFERENCE

All of the patents, patent applications, patent application publications, other publications and appendices cited herein are hereby incorporated by reference as if set forth in their entirety.

PREFERRED EMBODIMENTS

The present invention has been described in connection with what are presently considered to be the most practical and preferred embodiments. However, the invention has been presented by way of illustration and is not intended to be limited to the disclosed embodiments. Accordingly, one of skill in the art will realize that the invention is intended to encompass all modifications and alternative arrangements within the spirit and scope of the invention as set forth in the appended claims.

What is claimed is:

1. A compound of Formula (I):

(charged dye$^{m+}$)$_x$·(counterion$^{n-}$)$_y$·(counterion receptor)$_z$    (I), wherein charged dye$^{m+}$ is a cationic dye, counterion$^{n-}$ is an anion, and counterion receptor is a binding ligand for counterion$^{n-}$, wherein m, n, x, y, and z are integers greater than or equal to 1 and products of x·n and m·y are identical, wherein the counterion receptor is a heteromacrocycle selected from Formulas (B.1), (B.2), and (B.3):

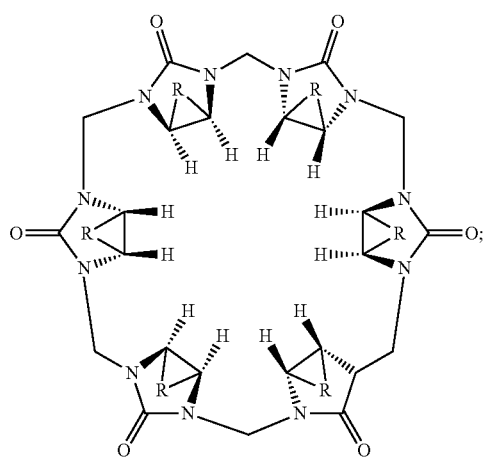

(B.1)

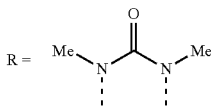

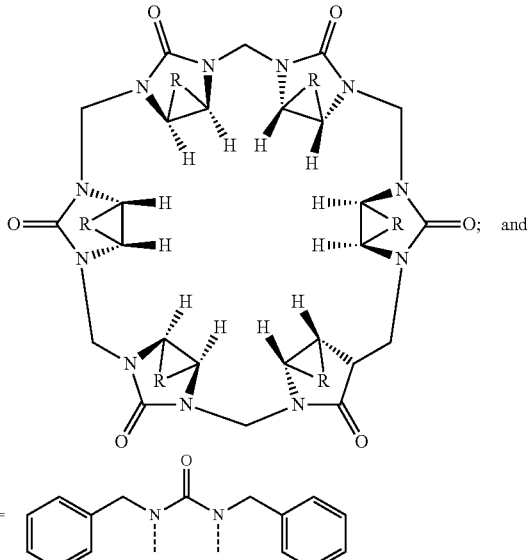

(B.2)

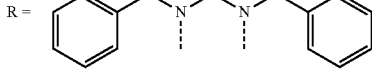

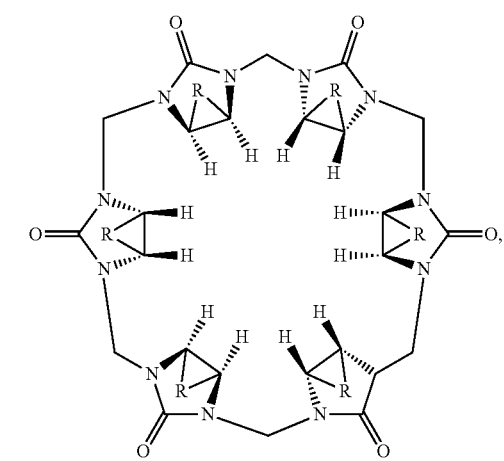

(B.3)

R = (---NR')—CO—(R'N---)

or a combination thereof, wherein R' of Formula (B.3) are identical and are selected from a group consisting of alkyl, alkenyl, alkoxy, aryl, heteroaryl, heterocycle, and substituted forms of alkenyl, alkoxy, aryl, heteroaryl, and heterocycle groups.

2. The compound according to claim 1, wherein the cationic dye has a light-absorbing unit or both a light-absorbing unit and a light emissive unit.

3. The compound of claim 1, wherein the cationic dye is selected from a group of dye classes consisting of cationic styryls, cationic xanthenes, cationic trianguleniums, cationic oxazines, triarylmethanes, cationic cyanines, cationic acridines, cationic fluoronones, cationic phenanthridines, cationic polyaromatic hydrocarbons, cationic imides, cationic BODIPYs, cationic coumarins, and cationic squaraines, or a combination thereof.

4. The compound of claim 1, wherein the cationic dye is selected from the group consisting of the following members:
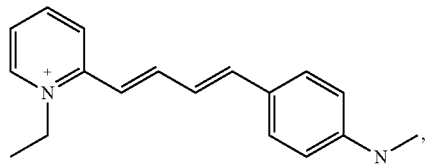
(Pyridine 1)
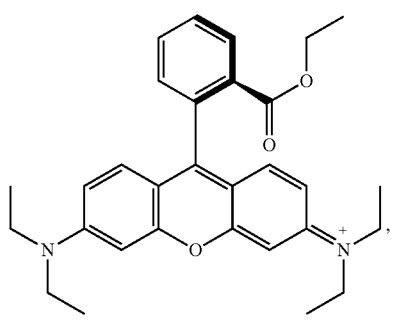
(Rhodamine 3B)
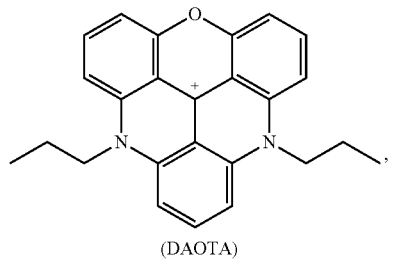
(DAOTA)
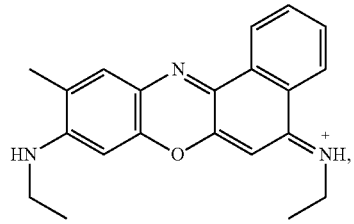
(Oxazine 720)
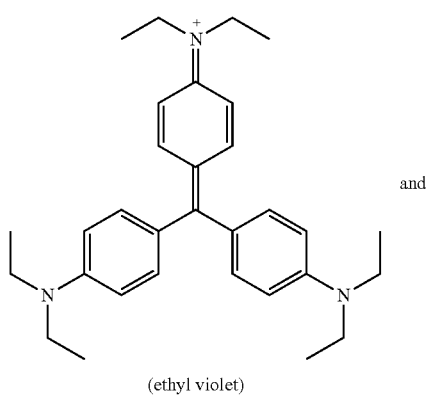
and
(ethyl violet)
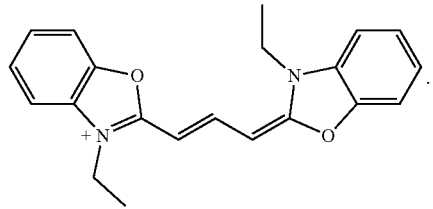
(Cyanine DIOC$_2$)
5. The compound of claim 1, wherein the cationic dye is selected from the group consisting of the following members:
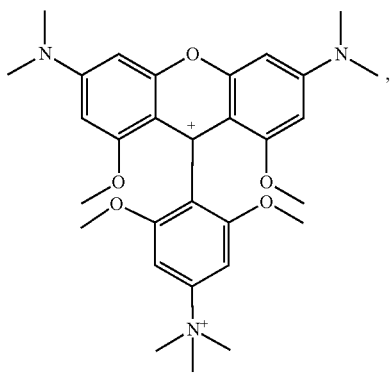
(Tetramethoxy-aminorhodamine)
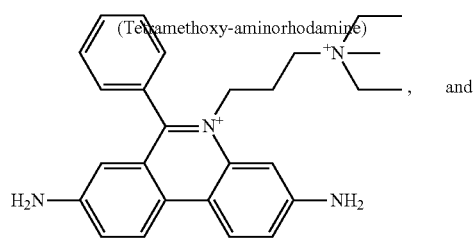
, and
(Propidium)
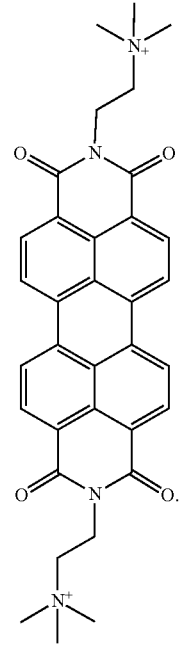
(Perylene diimide)

6. The compound of claim 1, wherein the heteromacrocycle is selected from Formulas (B.1) or (B.2).

7. The compound according to claim 1, wherein the anion is selected from the group consisting of $BF_4^-$, $ClO_4^-$, $PF_6^-$, $N(SO_2CF_3)_2^-$, $N(SO_2C_2F_5)_2^-$, $CH_3SO_3^-$, $CF_3SO_3^-$, $AsO_4^{3-}$, $HAsO_4^{2-}$, $H_2AsO_4^-$, $AsF_6^-$, $AlCl_4^-$, $PO_4^{3-}$, $HPO_4^{2-}$, $H_2PO_4^-$, $SO_4^{-2}$, $HSO_4^-$, $Cl^-$, $Br^-$, $I^-$, cyanide, $BrO_4^-$, $IO_4^-$, $F^-$, $HF_2^-$, $TcO_4^-$, $RPO_4^{2-}$, $R_2PO_4^-$, $RSO_3^-$, $SCN^-$, $N_3^-$, $I_3^-$, $CO_3^{2-}$, $HCO_3^-$, $P_2O_7^{4-}$, $HP_2O_7^{3-}$, $H_2P_2O_7^{2-}$, $H_3P_2O_7^-$, $RBF_3^-$, wherein R comprises a substituent.

8. The compound according to claim 1, provided that the anion is not $F5\text{-}TPB^-$; tetrakis[3,5-bis(trifluoromethyl)phenyl]borate; tetrakis[3,5-bis(1,1,1,3,3,3-hexafluoro-2-methoxy-2-propyl)phenyl]borate; $Ar_4B^-$, wherein Ar is aryl; $TRISPHAT^-$; or $BINPHAT^-$.

9. The compound according to claim 1, wherein the cationic dye comprises a light-absorbing unit.

10. The compound according to claim 9, wherein the cationic dye absorbs light at a wavelength longer than the absorption wavelength of a complex formed between the counterion$^{n-}$ and the counterion receptor.

11. The compound according to claim 9, wherein the compound comprises a light-absorbing unit having light-absorbing properties that reproduce the light absorbing properties (absorption band position and width) of the cationic dye alone under dilute conditions.

12. The compound according to claim 1, wherein the cationic dye comprises a light-absorbing unit and a light emissive unit.

13. The compound according to claim 12, wherein the cationic dye absorbs and emits light at a wavelength longer than the absorption wavelength of a complex formed between the counterion$^{n-}$ and the counterion receptor.

14. The compound according to claim 12, wherein an electronic property of the cationic dye and the counterion receptor complex does not produce partial or full electron transfer, photo induced electron transfer between the cationic dye and the counterion receptor, or does not produce a new absorption or emission band.

15. A formulation comprising a compound of according to claim 1.

16. A method of detecting a substance, comprising:
    contacting the substance with the compound according to claim 1 to form a mixture; and
    measuring a change in at least one spectral property in the compound of the mixture as a result of the contacting step relative to the substance alone or the compound alone,
    wherein the substance is detected by the change in at least one spectral property of the compound as a result of the measuring step with the mixture.

17. The compound according to claim 9, wherein Formula (I) is Formula (I-X1).

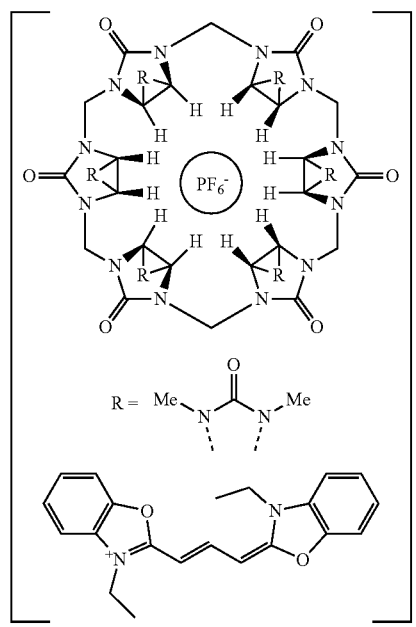

18. The compound according to claim 9, wherein Formula (I) is Formula (I-X2)

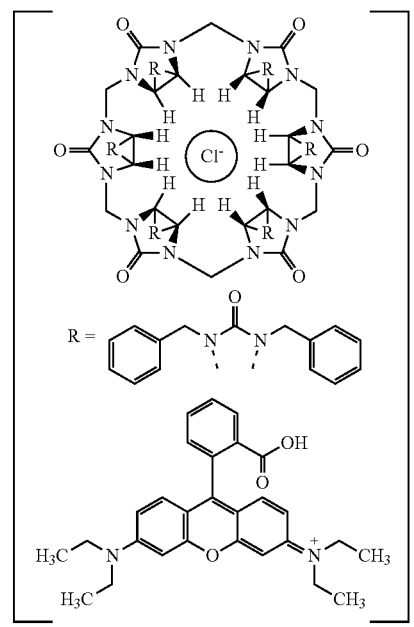

19. The compound according to claim 12, wherein Formula (I) is Formula (I-X1).

(I-X1)
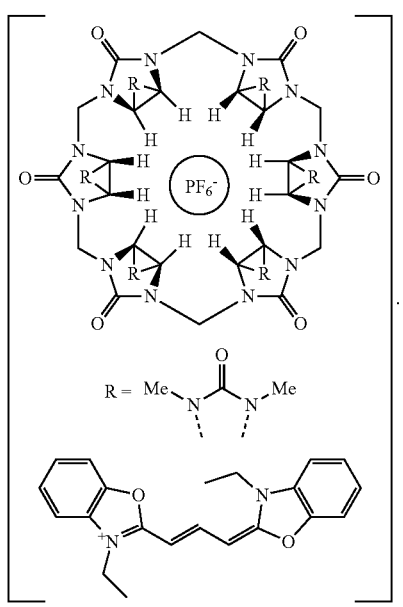
(I-X3)
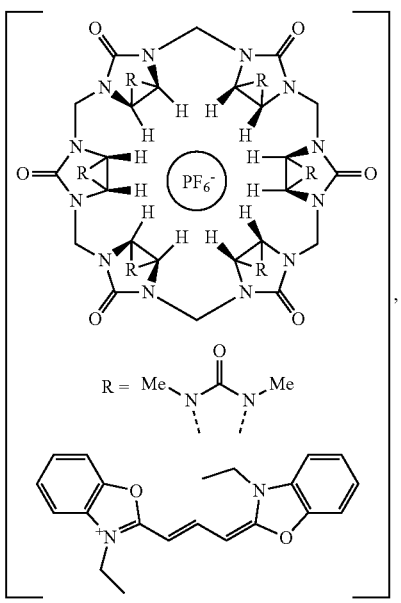
, and
20. The compound according to claim 12, wherein Formula (I) is selected from Formula (I-X2), Formula (I-X3), and Formula (I-X4):
(I-X2)
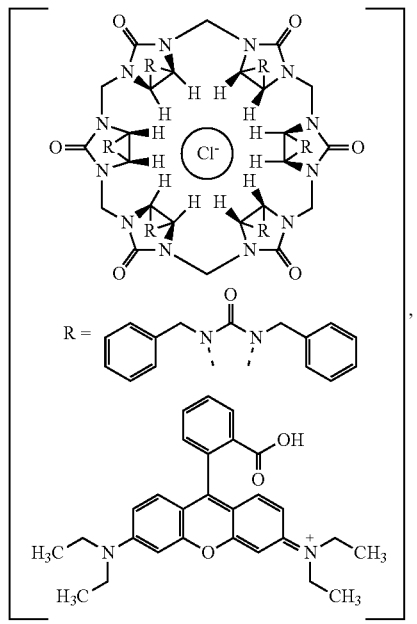
(I-X4)
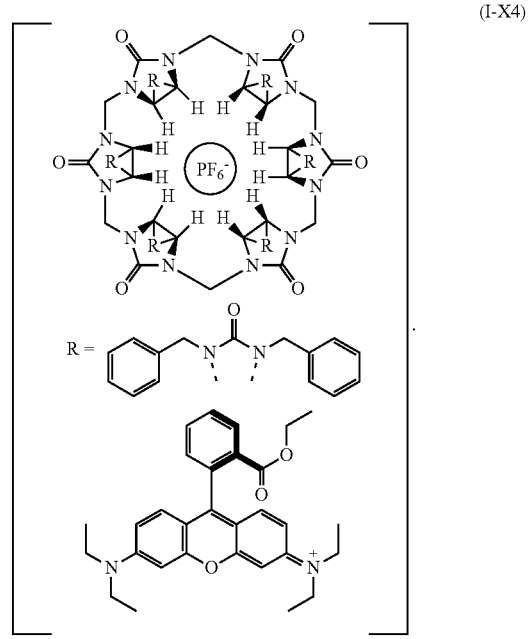
* * * * *